United States Patent
Syed et al.

(10) Patent No.: US 11,148,026 B2
(45) Date of Patent: Oct. 19, 2021

(54) SYSTEM AND METHOD FOR MONITORING PERFORMANCE CHARACTERISTICS ASSOCIATED WITH USER ACTIVITIES INVOLVING SWINGING INSTRUMENTS

(71) Applicant: Arccos Golf, LLC, Stamford, CT (US)

(72) Inventors: Salman Hussain Syed, Stamford, CT (US); Mian Ammad Faisal, New York, NY (US); Fabrice Claude Blanc, Stamford, CT (US); Colin David Phillips, Stratford, CT (US); Joon Hyuk Park, New Haven, CT (US)

(73) Assignee: Arccos Golf, LLC, Stamford, CT (US)

( * ) Notice: Subject to any disclaimer, the term of this patent is extended or adjusted under 35 U.S.C. 154(b) by 0 days.

(21) Appl. No.: 16/588,029

(22) Filed: Sep. 30, 2019

(65) Prior Publication Data
US 2020/0023253 A1 Jan. 23, 2020

Related U.S. Application Data

(63) Continuation of application No. 15/312,500, filed as application No. PCT/US2015/031668 on May 20,
(Continued)

(51) Int. Cl.
*A63F 9/24* (2006.01)
*A63F 11/00* (2006.01)
(Continued)

(52) U.S. Cl.
CPC .......... *A63B 60/46* (2015.10); *A63B 24/0003* (2013.01); *A63B 24/0006* (2013.01); *A63B 53/14* (2013.01); *A63B 60/16* (2015.10); *A63B 60/42* (2015.10); *A63B 69/3632* (2013.01); *G01S 19/19* (2013.01); *A63B 24/0062* (2013.01); *A63B 24/0075* (2013.01); *A63B 71/0622* (2013.01); *A63B 71/0669* (2013.01); *A63B 2024/0068* (2013.01);
(Continued)

(58) Field of Classification Search
USPC ........... 473/200, 223; 463/20, 25, 39, 42, 43
See application file for complete search history.

(56) References Cited

U.S. PATENT DOCUMENTS

| | | | | |
|---|---|---|---|---|
| 5,634,855 A | * | 6/1997 | King | A63B 69/3614 473/219 |
| 8,840,483 B1 | * | 9/2014 | Steusloff | A63B 60/46 473/222 |

(Continued)

*Primary Examiner* — Adetokunbo O Torimiro
(74) *Attorney, Agent, or Firm* — McCarter & English, LLP

(57) ABSTRACT

Exemplary embodiments of the present disclosure are directed to various components of a system for monitoring and/or tracking a user's performance during an activity involving an instrument that is swung. Exemplary embodiments can include a sensor module configured to be secured to the instrument. The sensor module can detect a swing event and/or an impact between the instrument and an object and can implement power management features to limit or manage a power consumption of the sensor module. The sensor module can transmit swing information to an electronic device associated with the user, which can display the swing information, process the swing information, and/or transmit the swing information to a remote system.

20 Claims, 40 Drawing Sheets

Related U.S. Application Data 2015, now Pat. No. 10,427,017, which is a continuation of application No. 14/663,932, filed on Mar. 20, 2015, now Pat. No. 9,339,714.

(60) Provisional application No. 62/000,897, filed on May 20, 2014.

(51) Int. Cl.
*G06F 13/00* (2006.01)
*G06F 17/00* (2019.01)
*A63B 60/46* (2015.01)
*A63B 60/16* (2015.01)
*A63B 53/14* (2015.01)
*G01S 19/19* (2010.01)
*A63B 24/00* (2006.01)
*A63B 69/36* (2006.01)
*A63B 60/42* (2015.01)
*A63B 71/06* (2006.01)

(52) U.S. Cl.
CPC . *A63B 2071/065* (2013.01); *A63B 2071/0691* (2013.01); *A63B 2220/12* (2013.01); *A63B 2220/13* (2013.01); *A63B 2220/14* (2013.01); *A63B 2220/16* (2013.01); *A63B 2220/40* (2013.01); *A63B 2220/53* (2013.01); *A63B 2220/62* (2013.01); *A63B 2220/801* (2013.01); *A63B 2225/50* (2013.01)

(56) References Cited

U.S. PATENT DOCUMENTS

2013/0267335 A1* 10/2013 Boyd ................. A63B 69/3617
 473/222
2014/0277630 A1* 9/2014 Meadows .......... A63B 71/0619
 700/91

\* cited by examiner

SYSTEM AND METHOD FOR MONITORING PERFORMANCE CHARACTERISTICS ASSOCIATED WITH USER ACTIVITIES INVOLVING SWINGING INSTRUMENTS

CROSS-REFERENCE TO RELATED APPLICATIONS

The present application is a continuation application that claims priority benefit to U.S. patent application Ser. No. 15/312,500, filed on Nov. 18, 2016, which is a 35 U.S.C. § 371 National Stage filing of International Application No. PCT/US2015/031668, filed on May 20, 2015, which claims priority to U.S. Provisional Patent Application Ser. No. 62/000,897, filed on May 20, 2014 and U.S. Non-Provisional patent application Ser. No. 14/663,932, filed on Mar. 20, 2015, the disclosures of which are incorporated herein by reference in their entireties.

BACKGROUND

In recent years, there has been efforts to monitor, track, and/or analyze a golfer's performance during a round of golf. Conventional systems have been proposed for this purpose, but generally require some user interaction to monitor and/or track a golfer's performance Additionally, for conventional automated golf monitoring or tracking systems, detection of a golf shot (e.g. when a golf ball is struck by a golf club during a round of golf) has been unreliable. For example, these conventional system can be subject to false detections and can fail to adequately differentiate between practice swings, swings that result in an impact with an object other than a golf ball, and actual swings that result in striking a golf ball. These and other disadvantages of the conventional systems may limit their use and acceptance by golfers.

SUMMARY

Exemplary embodiments of the present disclosure are directed to various components of systems, methods, and/or non-transitory computer-readable media that facilitate monitoring and/or tracking a user's performance during an activity involving a swinging instrument.

In accordance with embodiments of the present disclosure, a sensor module for detecting an impact between an instrument and a ball is disclosed. The sensor module includes an accelerometer and a processing device. The accelerometer is configured to measure an acceleration of an instrument. The processing device is programmed to monitor an output of the accelerometer to determine whether an impact occurred between the instrument and a ball based on the output of the accelerometer and to determine whether the impact is associated with the instrument striking a ball during a swing event.

In accordance with embodiments of the present disclosure, a sensor module for detecting an impact between a swinging instrument and an object is disclosed. The sensor module includes an accelerometer and a processing device. The accelerometer outputs orientation information associated with the sensor module. The processing device is programmed to transition between a first mode of operation and a second mode of operation in response to the orientation information.

In accordance with embodiments of the present disclosure, a sensor module for detecting an impact between a swinging instrument and an object is disclosed. The sensor module includes a shaft and a thread. The shaft has a first diameter at a proximal end and a second diameter at distal end. The thread extends about the shaft from the proximal end to the distal end and has a thread depth of at least one and a half millimeters and a root pitch of at least one and a half millimeters.

In accordance with embodiments of the present disclosure, a system for monitoring a performance of a user associated with a swinging instrument is disclosed. The system includes a sensor module and an electronic device. The sensor module is affixed to the swinging instrument and includes sensor module circuitry to detect an impact between the swinging instrument and an object and to wirelessly transmit swing information in response to detection of the impact. The electronic device is programmed to receive the swing information from the sensor module and display the swing information to a user.

In accordance with embodiments of the present disclosure, a method of monitoring a performance of a user associated with a golf club is disclosed. The method includes executing code on an wireless electronic device to monitor a location of the user, rendering a geographical map of a golf course on a display of the electronic device, receiving swing information from a sensor module secured to the golf club, the swing information indicating a golf shot taken by the user, and overlaying the swing information on the geographical map to indicate a geographic location of the golf shot on the golf course.

In accordance with embodiments of the present disclosure, a method of determining whether a golf shot occurred during a round of golf is disclosed. The method includes receiving, by an electronic device, wireless transmissions from one or more sensor modules operatively coupled to one or more golf clubs; determining, by the electronic device, geographic locations at which the electronic device received the wireless transmissions; and determining, by the electronic device, whether at least one of the wireless transmissions corresponds to a golf shot based on the geographic locations at which the electronic device received the wireless transmissions.

In accordance with embodiments of the present disclosure, a method of determining whether a golf shot occurred during a round of golf is disclosed. The method includes receiving, by an electronic device, wireless transmissions from one or more sensor modules operatively coupled to one or more golf clubs; determining, by the electronic device, a temporal relationship of reception of the wireless transmissions by the electronic device; and determining, by the electronic device, whether at least one of the wireless transmissions corresponds to a golf shot based on the temporal relationship of reception of the wireless transmissions.

In accordance with embodiments of the present disclosure, an electronic device is disclosed. The electronic device includes a global positioning system (GPS) receiver, a radio frequency (RF) receiver, and a processing device operatively coupled to the GPS receiver and the RF receiver. The GPS receiver receives broadcasts of GPS data from a global positioning satellite, and the RF receiver receives wireless transmissions from one or more sensor modules operatively coupled to one or more golf clubs. The processing device being programmed to determine geographic locations at which the electronic device received the wireless transmissions based on the broadcasts of GPS data received by the GPS receiver and to determine whether at least one of the wireless transmissions corresponds to a golf shot based on the geographic locations at which the electronic device received the wireless transmissions.

In accordance with embodiments of the present disclosure, a method of determining whether a golf shot occurred during a round of golf is disclosed. The method includes providing a software application for execution on an electronic device, and in response to providing the software application, the electronic device is programmed to execute the software application to receive wireless transmissions from one or more sensor modules operatively coupled to one or more golf clubs, determine geographic locations at which the electronic device received the wireless transmissions, and determine whether at least one of the wireless transmissions corresponds to a golf shot based on the geographic locations at which the electronic device received the wireless transmissions.

Any combination and permutation of embodiments is envisioned. Other embodiments, objects, and features will become apparent from the following detailed description considered in conjunction with the accompanying drawings. It is to be understood, however, that the drawings are designed as an illustration only and not as a definition of the limits of the present disclosure.

DESCRIPTION OF EXEMPLARY EMBODIMENTS

Exemplary embodiments of the present disclosure are directed to various components of systems, methods, and non-transitory computer-readable media for monitoring and/or tracking a user's performance during an activity involving one or more swinging instruments. Exemplary embodiments can include sensor modules configured to be secured of fixed to the instruments. As a non-limiting example, exemplary embodiments of the present disclosure can detect swing events and/or impacts between the instruments and objects, can identify false positives to distinguish between swing events that should be attributed to a user's performance and swing event that should not be attributed to a user's performance, can implement power management features to limit or manage a power consumption of the sensor module, and/or can implement other features, operations, function, and/or processes described herein. The sensor module can transmit swing information to an electronic device associated with the user, which can display the swing information, process the swing information, and/or transmit the swing information to a remote system.

Figure 1:
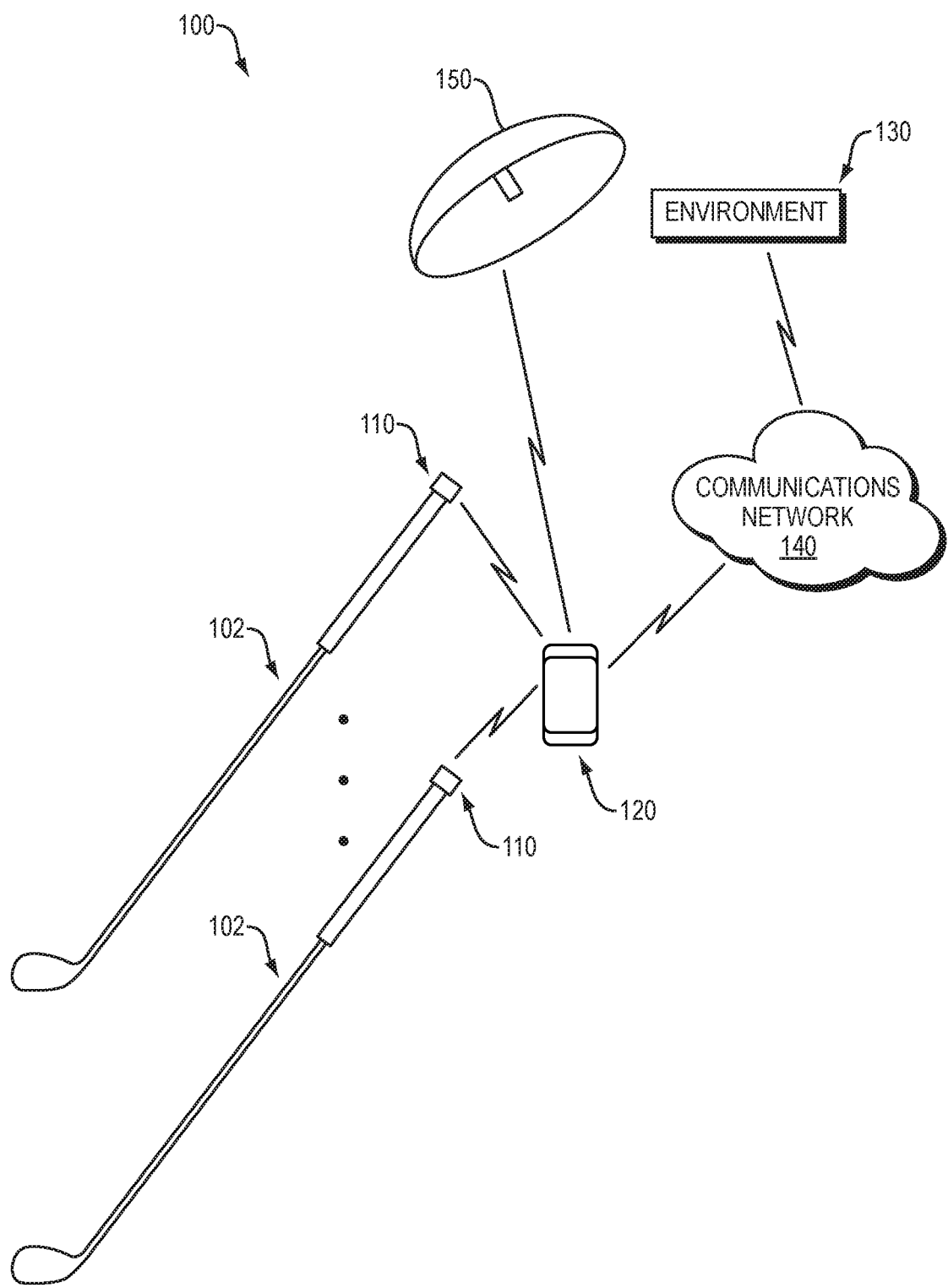
FIG. 1 depicts a performance monitoring system in accordance with exemplary embodiments of the present disclosure.

FIG. 1 depicts an exemplary performance monitoring system 100 that can be implemented using hardware, software, and/or a combination thereof. The system 100 can track and/or analyze user performance associated with a user activity involving one or more instruments 102 (e.g., golf clubs) that are swung by the user during the activity (e.g., a round of golf). The system 100 can include sensor modules 110 secured or fixed to the instruments 102 and electronic devices 120 (e.g., mobile phones, tablets, laptops, etc.) that are configured to communicate with one or more of the sensor modules 110. In some embodiments, the system 100 can include a remote user system 130 that can be accessible by users via a communications network 140 as described in more detail herein.

The one or more instruments 102 can be, for example, golf clubs, bats (e.g., baseball, softball, cricket), hockey sticks (e.g., field and/or ice hockey sticks), racquets (e.g., tennis, squash, racquet ball, badminton, ping pong, and/or any other types of racquets), long handled mallets (e.g., polo, croquet, and/or any other types of mallets), and/or any other suitable instruments that may be swung by a user during a sporting activity, recreational activity, leisure activity, occupational activity, and the like.

In exemplary embodiments, the sensor modules 110 can detect when a user is preparing to swing a respective one of the instruments 102, can detect when the instruments is being swung, and/or can detect when the instrument strikes an object. The sensor module 110 can use this information to compute and/or identify performance characteristics associated with the user's use of the instruments 102. For embodiments in which the sensor modules compute and/or identify the performance characteristics related to the swing, the sensor modules 110 can transmit the performance characteristics, direct or indirectly, to one or more of the electronic devices 120. As one example, in some embodiments, the sensor modules 110 can detect and/or identify performance characteristics including when the instruments 102 are swung, acceleration information associated with the swing, whether the instrument hits another object, and/or whether the swing and impact correspond to a swing that should be counted as a shot (e.g., a golf shot), and can transmit a message to the electronic device(s) including the performance characteristics.

Each sensor module 110 can be associated with a unique identifier. The unique identifier can be included in transmissions by the sensor modules 110 and can be used by the one or more electronic device 120 and/or the remote system 130 to associate the transmissions with the corresponding instruments 102. In exemplary embodiments, the unique identifier can be a sequence or string of alphanumeric characters.

The one or more electronic devices 120 can use the performance characteristics to monitor and/or track the user's performance during an activity, and to render one or more graphical user interfaces to display the performance characteristics as well as other data maintained, generated, and/or received by the one or more electronic devices 120. For example, the one or more electronic devices 120 can be programmed and/or configured to identify a location of the user when one of the instruments 102 is swung and/or contacts an object (e.g., a ball, the ground, or any other object) during a swing. In exemplary embodiments, the location of the electronic devices 120 (e.g., a longitude and latitude) can be determined using a global positioning system (GPS) receiver within the electronic devices 120 that is in communication with a GPS satellite 150.

In exemplary embodiments, the one or more electronic devices 120 can be programmed and/or configured to associate the unique identifiers of each of the sensor modules 110 with a corresponding one of the instruments 102 such that when the one or more electronic devices 120 receives a transmission from one of the sensor modules 110, the one or more electronic devices 120 can determine which of the instruments was used to generate the information included in the transmission (e.g., performance characteristics). For example, in exemplary embodiments, the sensor modules 110 and the electronic device(s) 120 can be configured to be associated such that each of the sensor modules 110 can be recognized and/or paired with the one or more electronic devices 120. During a formation or pairing process, each sensor module 110 can send its unique identifier to the one or more electronic devices 120 and the user(s) can interact with the one or more electronic devices to identify the corresponding instruments 102 to which each of the sensor modules 110 are secured/attached. The electronic devices 120 can store this information for use when it receives subsequent transmissions from the sensor modules 110. In exemplary embodiments, the sensor modules 110 and the electronic device(s) 120 can transmit and/or receive wireless transmissions according to the BlueTooth® communication protocol, Zigbee® communication protocol, the Wi-Fi® communication protocol, and/or any other suitable communication protocols.

The remote system 130 can include one or more computing devices operating as servers to manage data/information regarding a user's profile, account, performance, and/or any other data/information associated with the user. In exemplary embodiments, the electronic device(s) 120 can communicate with the remote system 130 to transmit and receive information. As one example, the remote system 130 can be programmed and/or configured to receive user performance information from the electronic device(s) 120 and to process and/or analyze the performance information to determine statistics regarding the users performance and/or to provide an analysis regarding a user's mechanics (e.g., a swing analysis). Some statistics and swing analysis information that can be determined by the remote system 130 can include a swing tempo, swing velocity, swing force, club face angle, swing plane, and/or impact force with which the instrument strikes or will strike an object, and/or any other swing parameters as well as club consistency (e.g., variations in shot distances), putting stats (e.g., average putts per hole, 2-putt percentage, 3+ putt-percentage, 1 putt per round, etc.), scrambling statistics (e.g., the golfer's ability to get par when hitting the green in regulation is missed), sand saves (e.g., the ability of a golfer to get par when the ball lands in a bunker during a hole), fairway hits (e.g., percentage of times a golfer hits the fairway when the golf ball is hit from the tee), and the like.

Subsequent to determining the statistics and/or providing the analysis, the remote system 130 can transmit the statistics and/or analysis to the electronic devices 120, which can be programmed to display the statistics and/or analysis to the users. As another example, the remote system 130 can be programmed and/or configured to maintain golf course information, such as names of golf courses, geographic maps of golf courses including hole locations, a par for the holes of the golf courses, and/other suitable golf course information. The remote system 130 can transmit the golf course information to the electronic devices 120 upon request and/or can transmit the golf course information automatically. The golf course information can allow the electronic devices 120 to display the golf course information to the users, use the golf course information for automatically determining a user's performance on a golf course, and/or overlay the users performance on the golf course information rendered on a display.

In one exemplary embodiment, the system 100 can be implemented to monitor and/or track a user playing a round of golf. For example, the instruments 102 can be golf clubs associated with a user and each of the golf clubs can have a sensor module 110 affixed thereto and the electronic device(s) 120 can be a mobile phone or any other suitable portable communication device that can be carried by the user that is capable of wireless transmission/reception and that is configured to determine its location (e.g., using GPS). For example, each sensor module 110 can be secured or affixed to a proximal end of a golf club where the handle or grip is disposed. The user can interact with the user's electronic device 120 to set up the system 100 for use with the golf clubs. For example, the electronic device 120 can be programmed and/or configured to prompt the user to enter information about the golf clubs when it receives transmissions from the sensor modules 110. Upon completion of the set up process, the electronic device 120 associates each of the sensor modules 110 with the corresponding golf clubs to which the sensor modules 110 are affixed based on the unique identifiers, such that when the electronic device 120 receives a subsequent transmission from one of the sensor modules 110, the electronic device 120 can be programmed to identify the golf club used by the user to generate the information included in the subsequent transmission.

As the user plays a round of golf, the system 100 can monitor and/or track which golf clubs were used by the golfer for which holes and shots, a distance the golf ball traveled for each shot, a locations of the user, holes that have been completed by the user, holes that the user still has to complete, a golf score of the user, and/or other performance information associated with the round of golf being played by the user.

The electronic device 120 can store the performance information associated with the golf round and/or can render one or more GUIs that can be viewed by the user during and/or after the golf round. In some embodiments, the electronic device 120 can transmit the performance information to the remote system 130 for further processing and/or storage. The user may access the remote system 130 through the electronic device 120 and/or another electronic device (e.g., a laptop, desktop, or personal computer) to review, modify, update, delete, share, and the like, the performance information captured by the system 100.

Figure 2:
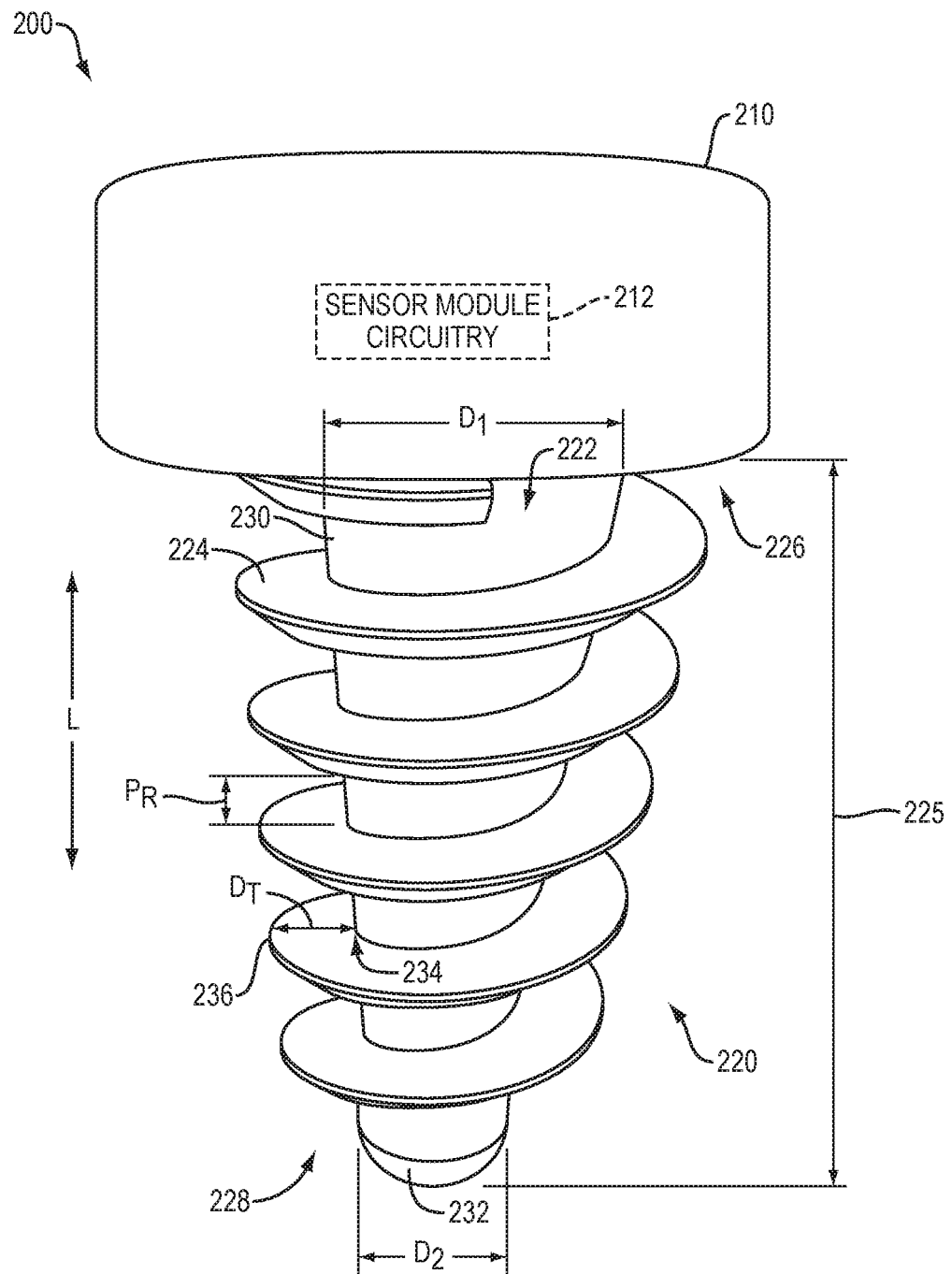
FIG. 2 is an exemplary embodiment of a sensor module that can be implemented in accordance with the present disclosure.

FIG. 2 is an exemplary embodiment of a sensor module 200 that can be implemented in accordance with the present disclosure. For example, the sensor module 200 can be implemented as an embodiment of the sensor modules 110 depicted in FIG. 1. The sensor module 200 can include a housing portion 210 and a fastening portion 220. The housing portion 210 can house sensor module circuitry 212 that can be programmed and/or configured to perform one or more operations, tasks, functions, and/or processes described herein. The fastening portion 220 can be configured to secure or affix the sensor module 200 to an instrument (e.g., instrument 102). For example, the fastening portion 220 can include a shaft 222 having an external thread 224 that can be used to threadingly engage an instrument.

As shown in FIG. 2, in exemplary embodiments of the fastening portion 220, the shaft 222 can extend along a longitudinal axis L from a first proximal end 226 to a second distal end 228 defining a length 225 of the fastening portion 220. In exemplary embodiments the shaft can have a length of approximately ten to approximately thirty millimeters. The first proximal end 228 can be operatively coupled to the housing portion 210 as shown in FIG. 2. An outer surface 230 of the shaft 222 can have a diameter $D_1$ at the first proximal end 226 and a diameter $D_2$ at the second distal end 228 of the shaft 220. The diameters $D_1$ and $D_2$ can be measured perpendicularly to the longitudinal axis L and between opposing portions of the outer surface 230. The diameter $D_1$ is larger than the diameter $D_2$. For example, in exemplary embodiments the diameter $D_1$ can be approximately one and half to approximately three times larger than the diameter $D_2$. In some embodiments, the diameter $D_1$ can be approximately two to approximately six millimeters and the diameter $D_2$ can be approximately one to approximately three millimeters. The shaft 222 can have a generally conical configuration for which the outer surface 230 of the shaft 222 generally tapers inwardly along the longitudinal axis L from the first proximal end 226 to the second distal end 228. The outer surface 230 of the shaft 222 can terminate at the second distal end 228 to form a rounded edge 232.

The external thread 224 can be disposed circumferentially about the outer surface 230 of the shaft 222 along the longitudinal axis to form a helical or spiral ridge around the shaft 222. The external thread 224 can have a trapezoidal thread form (i.e., the thread 224 can have a trapezoidal cross-sectional shape), a triangular thread form (i.e., the thread 224 can have a triangular cross-sectional shape), and/or can take any other suitable form or shape. The thread 224 can generally extend radially outward from the outer surface 230 of the shaft 220 from a root 234 of the thread 224 to a crest 236 of the thread 224. A thread depth $D_T$ can be measured perpendicularly to the longitudinal axis L (e.g., along a radial axis of the shaft 220) from the root 234 to the crest 236. In exemplary embodiments, the thread depth can be approximately one and half to approximately two millimeters. A root pitch $P_R$ of the thread 224 can be a distance between adjacent portions of the root 240 of the thread 224 measured along the longitudinal axis L. In exemplary embodiments the root pitch can be approximately one and half millimeters to approximately two and half millimeters.

While the fastening portion 220 has been illustrated as including thread 224, exemplary embodiments of the present disclosure can be implemented using other fastening structures in conjunction with the threads 224 or instead of the threads 224. For example, in some embodiments, the fastening portion 220 can include one or more barbs, hooks, spikes, or any other suitable structures that protrude from the outer surface 230 and are operable to generally secure the sensor module 200 to a swinging instrument (e.g., to the grip of a golf club).

Figure 3:
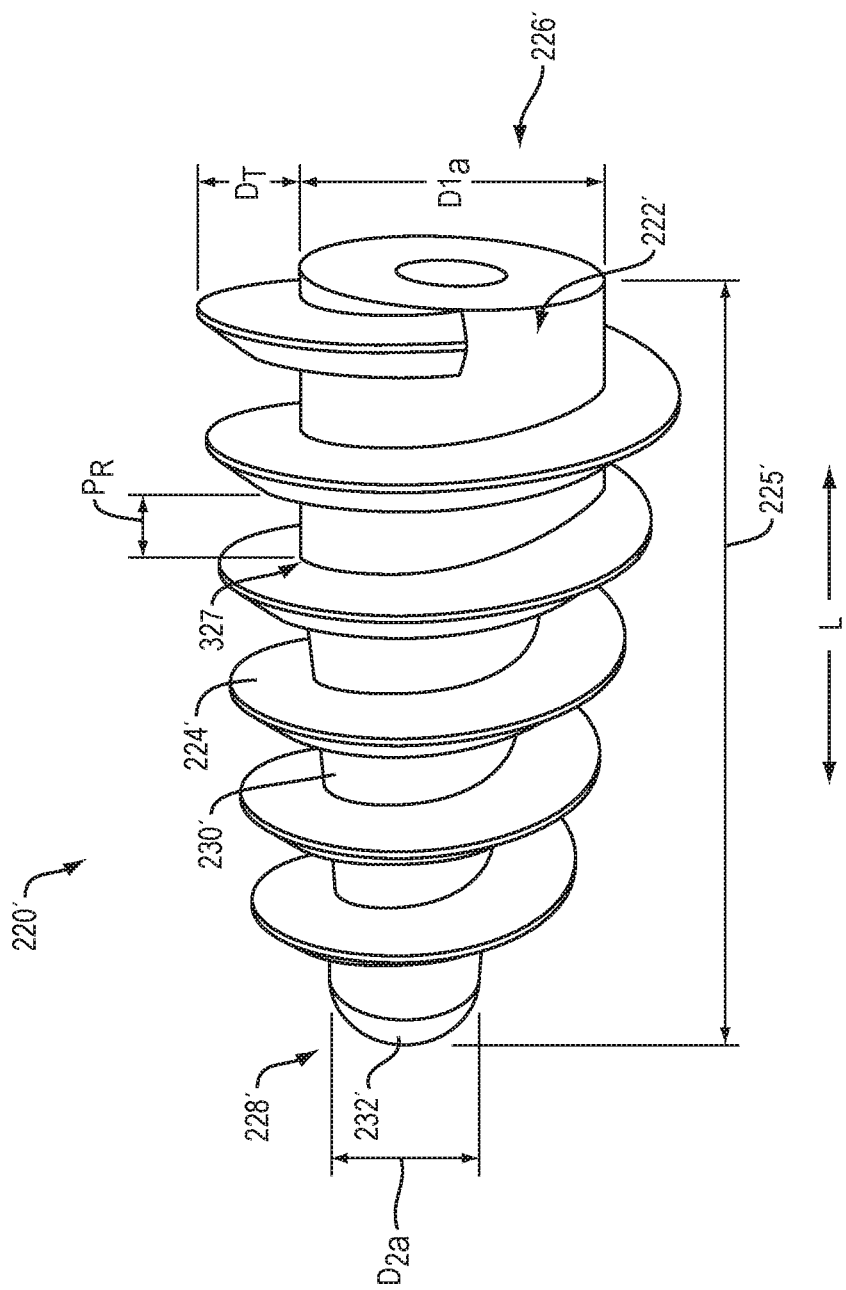
FIG. 3 is another exemplary embodiment of a fastening portion of a sensor module that can be implemented in accordance with the present disclosure.

FIG. 3 is another exemplary embodiment of a fastening portion 220' that can be used to fasten the sensor module to an instrument. As shown in FIG. 3, in exemplary embodiments of the fastening portion 220', a shaft 222' can extend along a longitudinal axis L from a first proximal end 226' to a second distal end 228' defining a length 225' of the fastening portion 220'. The thread 224' can extend around the shaft 222'. In exemplary embodiments the shaft 220' can have a length of approximately ten to approximately thirty millimeters. The first proximal end 228' can be operatively coupled to the housing portion 210 shown in FIG. 2. An outer surface 230' of the shaft 222' can have a diameter $D_{1a}$ at the first proximal end 226' and a diameter $D_{2a}$ at the second distal end 228' of the shaft 222'. The diameters $D_{1a}$ and $D_{2a}$ can be measured perpendicularly to the longitudinal axis L and between opposing portions of the outer surface 230'. The diameter $D_{ia}$ is larger than the diameter $D_{2a}$. For example, in exemplary embodiments the diameter $D_{1a}$ can be one and half to three times larger than the diameter $D_{2a}$. In some embodiments, the diameter $D_{1a}$ can be approximately two millimeters to approximately six millimeters, and the diameter $D_{2a}$ can be approximately one millimeter to approximately three millimeters. The diameter $D_{1a}$ of shaft 222' can be generally uniform along a portion of the length of the shaft 222' from the first proximal end 226' to a transition region 327 (i.e. the outer surface 230' is cylindrical and extends substantially parallel to the longitudinal axis L), after which the shaft 222' have a generally conical configuration for which the outer surface 230' of the shaft 222' generally tapers inwardly along the longitudinal axis L from the transition region 327 to the second distal end 228'. The outer surface 230' of the shaft 220' can terminate at the second distal end 228' to form a rounded edge 232'. In some embodiments, the cylindrical portion between the first proximal end 226' and the transition region 327 can have a length of approximately two millimeter to approximately eight millimeters, or approximately four millimeters to approximately six millimeters.

Exemplary embodiments of the fastening portion (e.g., 220 and 220') can advantageously provide pull-out resistances of greater than approximately ten newtons of force. The pull-out resistance can be the force required to pull the sensor out of an end portion of the grip of a golf club. The pull-out resistance of the fastening portion can be determined based on the diameter of the fastening portion, the root pitch of the fastening portion, and/or the thread depth of the fastening portion. As one example, exemplary embodiments of the fastening portion can advantageously deform the rubber grip of a golf club to radially pre-stress the rubber grip to increase the density of the rubber at the bottom of the thread so that the rubber at the bottom of the thread is less likely to be prone to deformation induced by axial compression force and so that radial resistance can be increased. As another example, a root pitch as approximately one and half millimeters to approximately two and half millimeters can be used to advantageously improve the resistance of the rubber grip at the root of the thread so that the rubber grip resists deformation. As yet another example, a thread depth of approximately one and half to approximately two millimeters can be used to advantageously increase the force required to deform the rubber grip beyond the crest of the thread on the fastening device.

Figure 4:
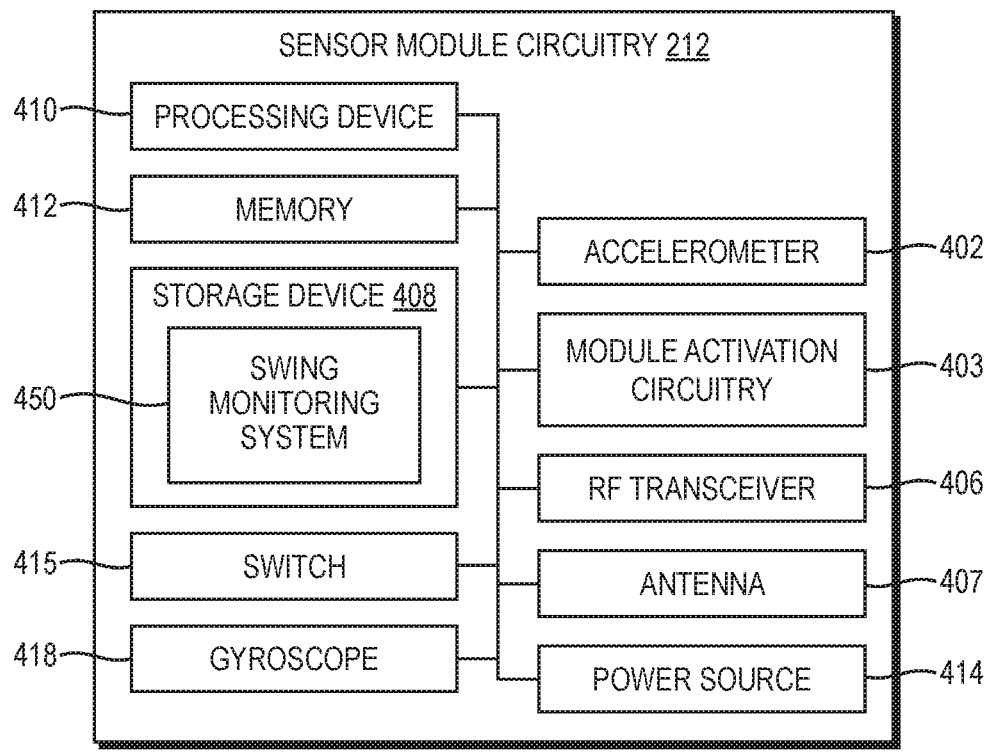
FIG. 4 is a block diagram of an exemplary embodiment of the sensor module circuitry that can be disposed with the sensor module shown in FIG. 2.

FIG. 4 is a block diagram of an exemplary embodiment of the sensor module circuitry 212 that can be disposed within the housing portion 210 of the sensor module 200 shown in FIG. 2. The sensor module circuitry 212 can include a multi-axis accelerometer 402, module activation circuitry 403, a radio frequency (RF) transceiver 406, a storage device 408, a processing device 410, memory 412 (e.g., RAM), a power source 414, and a switch 415. In some embodiments, the sensor module circuitry 212 can include a gyroscope 418 in addition to, or in the alternative to, the multi-axis accelerometer 402.

The multi-axis accelerometer 402 can include three or more axes of measurement and can output one or more signals corresponding to each axes of measurement and/or can output one or more signals corresponding to an aggregate or combination of the three axes of measurement. For example, in some embodiments, the accelerometer 402 can be a three-axis or three-dimensional accelerometer that includes three outputs (e.g., the accelerometer can output X, Y, and Z data). The accelerometer 402 can detect and monitor a magnitude and direction of acceleration, e.g., as a vector quantity, and/or can sense an orientation, vibration, and/or shock. For example, in exemplary embodiments, the accelerometer 402 can be used by the sensor module circuitry 212 determine an orientation and/or acceleration of an instrument to which the sensor module including the sensor module circuitry 212 is affixed. In some embodiments, the gyroscope 418 can be used instead or in addition to the accelerometer 402, to determine an orientation of an instrument to which the sensor module including the sensor module circuitry 212 is affixed. The orientation of the instrument can be used to determine when the user is preparing to swing the instrument and/or to identify and discriminate between different phases of a swing (e.g., back swing, forward swing). The acceleration can be used to determine when an impact occurs during a swing, a speed of the swing, a tempo of the swing, and/or any other motion parameters associated with swinging the instrument.

The acceleration and/or velocity can be used to identify and discriminate between different phases of a swing and determine whether an impact between the instrument and an object constitutes a shot. For example, during the backswing phase, a positive linear acceleration can be detected by the accelerometer. Approximately midway through the backswing, the velocity curve changes direction when the club slows down as it reaches the top of the backswing. When the curve changes direction, the acceleration is zero and linear velocity begins to decrease resulting in deceleration. At the end of the backswing phase, the club is temporarily static as the golf club changes direction, and therefore, no velocity is detected based on an output of the accelerometer 302. The downswing begins from the top of the backswing and as the club begins to move in a positive direction towards the ball, the linear acceleration increases. As the velocity approaches a constant value the rate of acceleration slowly begins to decrease and the downswing phase ends when an initial discontinuity in motion is detected by the accelerometer. This discontinuity marks the impact phase of the golf swing and the beginning of the follow through phase of the golf swing.

The module activation circuitry 403 can receive one or more output signals (e.g., X, Y, Z data) from the accelerometer 402 (or gryroscope 418) as inputs to the module activation circuitry 403 and can process the signals to determine whether the instrument to which the sensor module is affixed is within a specified addressing range for a specified period of time. In exemplary embodiments, the module activity circuitry can output one or more signals to the processing device 410 in response to the processing of the signals from the accelerometer 403 (or gyroscope 418). The processing device 410 can use the signals from the module activation circuitry to change a mode of operation of the sensor module circuitry (e.g., from a sleep mode of operation to a normal mode of operation or vice versa). While exemplary embodiments have been illustrated to include module activation circuitry, those skilled in the art will recognize that, in exemplary embodiments, the processing device 410 may be programmed and/or configured to process the output signals of the accelerometer 402 (or gyroscope 418) to determine when to change the mode of operation of the sensor module circuitry.

The RF transceiver 406 can be configured to transmit (e.g., via a transmitter of the RF transceiver) and/or receive (e.g., via a receiver of the RF transceiver) wireless transmissions via an antenna 407. For example, the RF transceiver 406 can be configured to transmit one or more messages, directly or indirectly, to one or more electronic devices (e.g., electronic devices 120) and/or to receive one or more messages, directly or indirectly, from one or more electronic devices. The RF transceiver 406 can be configured to transmit and/or receive messages having at a specified frequency and/or according to a specified sequence and/or packet arrangement. As one example, the RF transceiver 406 can be a BlueTooth® transceiver configured to conform to a BlueTooth® wireless standard for transmitting and/or receiving short-wavelength radio transmissions typically in the frequency range of approximately 2.4 gigahertz (GHz) to approximately 2.48 GHz. As another example, the RF transceiver 406 can be a Wi-Fi transceiver (e.g., as defined IEEE 802.11 standards), which may operate in an identical or similar frequency range as BlueTooth®, but with higher power transmissions. Some other types of RF transceivers 406 that can be implemented by the sensor module circuitry includes RF transceivers configured to transmit and/or receive transmissions according to the Zigbee® communication protocol, and/or any other suitable communication protocol.

The storage device 408 can include any suitable, non-transitory computer-readable storage medium, e.g., read-only memory (ROM), erasable programmable ROM (EPROM), electrically-erasable programmable ROM (EEPROM), flash memory, and the like. In exemplary embodiments, a swing monitoring system 450 can be embodied as computer-readable/executable program code stored on the non-transitory computer-readable storage device 408 and implemented using any suitable, high or low level computing language and/or platform, such as, e.g., Java, C, C++, C#, assembly code, machine readable language, and the like.

The memory 412 can include any suitable non-transitory computer-readable storage medium (e.g., random access memory (RAM), such as, e.g., static RAM (SRAM), dynamic RAM (DRAM), and the like). In some embodiments, the data/information and/or executable code for implementing the system 450 can be retrieved from the storage device 408 and copied to memory 412 during and/or upon implementation of the processes described herein. Once the data/information has be used, updated, modified, replaced, and the like, the data/information may be copied from memory 412 to the storage device 408.

The processing device 410 can include any suitable single- or multiple-core microprocessor of any suitable architecture that is capable of implementing and/or executing the system 450. The processing device 410 can be programmed and/or configured to execute the system 450 to implement one or more processes for monitoring and/or tracking usage of instruments by a user and communicating (e.g., via the RF transceiver 406) information corresponding to the usage of the instruments with other devices (e.g., the electronic device 120). The processing device 410 can retrieve information/data from, and store information/data to, the storage device 408 and/or memory 412. For example, user performance information, golf course information, performance statistics, user profiles, performance analysis, and/or any other suitable information/data for implemented the system 450 or that may be used by the system 450 may be stored on the storage device 408 and/or a memory 412. Some examples of performance information and/or performance analysis can include, for example, data output by the accelerometer 402 (or gyroscope 418), an indication of a detected impact (e.g., a determined based on the data output by the accelerometer 402 or gyroscope 418), a golf shot (e.g., a determined based on the data output by the accelerometer 402 or gyroscope 418), a golf score, a swing tempo, swing velocity, swing force, club face angle, swing plane, and/or impact force with which the instrument strikes or will strike an object, and/or any other swing parameters as well as club consistency (e.g., variations in shot distances), putting stats (e.g., average putts per hole, 2-putt percentage, 3+ putt-percentage, 1 putt per round, etc.), scrambling statistics (e.g., the golfer's ability to get par when hitting the green in regulation is missed), sand saves (e.g., the ability of a golfer to get par when the ball lands in a bunker during a hole), fairway hits (e.g., percentage of times a golfer hits the fairway when the golf ball is hit from the tee), and the like.

In exemplary embodiments, the processing device 410 can be programmed to execute the system 450 to receive and process information/data from the accelerometer 402 (e.g. X, Y, Z data), RF transceiver 406, storage device 408, and/or memory 412 and/or can be programmed to output information/data to the RF transceiver 406, the storage device 408, and/or the memory 412 based on the execution of the system 450. As one example, the processing device 410 can receive information/data from the accelerometer 402 corresponding to a direction force along one or more of the axes of the accelerometer 402, and can transmit the information data to the electronic device via the RF transceiver 406. As another example, the processing device 410 can receive information/data from the accelerometer 402 corresponding to a direction force along one or more of the axes of the accelerometer 402, can process the information/data to generate an indicator associated with an impact between the instrument to which the sensor module is secured and an object, and can transmit the indicator to the electronic device via the RF transceiver 406.

The power source 414 can be implemented as a battery or capacitive elements configured to store an electric charge. As one example, in some embodiments, the power source can be a button cell lithium battery, such as a CR2032 battery or a CR2354 battery. In some embodiments, the battery may be replaceable by the user. As another example, in some embodiments, the power source 414 can be a rechargeable power source, such as a battery or one or more capacitive elements configured to be recharged via a connection to an external power supply and/or to be recharged by an energy harvesting device. As one example, the rechargeable power source can be recharged using solar energy (e.g., by incorporating photovoltaic or solar cells on the housing on the sensor module), through physical movement (e.g., by incorporating a piezo-electric elements in the sensor module), and/or through any other suitable energy harvesting techniques using any suitable energy harvesting devices.

The switch 415 can be operatively coupled to the processing device 410 to trigger one or more operations by the processing device 410. In some embodiments, the switch 415 can be implemented as a momentary push button, rocker, and/or toggle switch that can be activated by a user. For example, in exemplary embodiments, the switch 415 can be activated by the user to instruct the processing device 410 to transmit an association or initial setup message via the RF transceiver 406. The association or initial setup message can be used to pair the sensor module with an electronic device. In some embodiments, the association or initial setup message can be transmitted according to a BlueTooth® pairing scheme or protocol.

Figure 5:
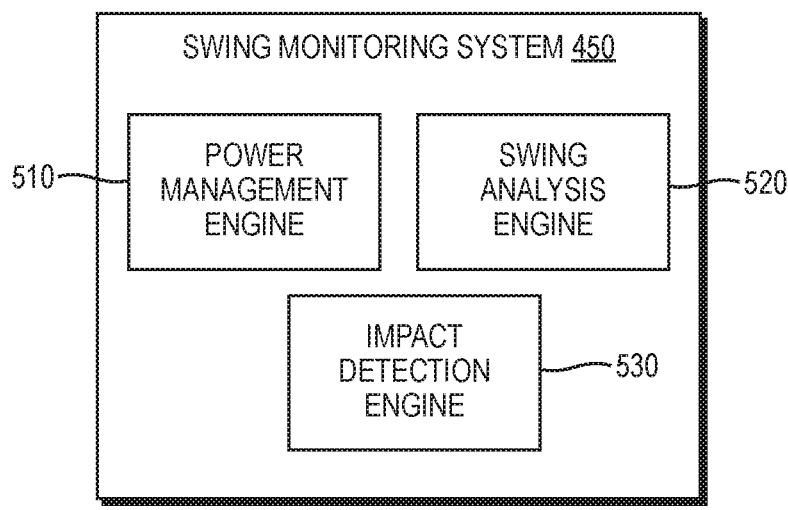
FIG. 5 is a block diagram of an exemplary embodiment of a swing monitoring system in accordance with the present disclosure.

FIG. 5 is a block diagram of an exemplary embodiment of the swing monitoring system 450 that can be executed to facilitate monitoring and/or detecting swing events and/or impacts between an instrument and an object. The system 450 can include a power management engine 510, a swing analysis engine 520, and an impact detection engine 530.

The power management engine 510 can be programmed and/or configured to monitor and/or manage power consumption of the sensor module circuitry 212. For example, exemplary embodiments of the power management engine 410 can be configured control an operational state of the sensor module circuitry 212 so that the circuitry 212 can have different modes of operation, such as a sleep mode of operation and/or a normal mode of operation. In the sleep mode of operation, the circuitry 212 can consume a small electrical current (e.g., less than approximately fifteen micro-amperes) from the power source 414. For example, in the sleep mode of operation, the electrical current consumed by the accelerometer can be less than approximately ten micro-amperes, the electrical current consumed by the storage device, memory, and processing device can be less than approximately five micro-amperes (e.g., a micro-controller including the storage device, the memory, and the processing device), and/or the electrical current consumed by the RF transceiver can be approximately zero amperes (e.g., less than one micro-ampere). The normal mode of operation can be the primary mode of operation in which information/data is generated, processed, and/or analyzed by the circuitry 212. In the normal mode of operation, the circuitry 212 can consume the greatest amount of power. For example, the electrical current consumed by the accelerometer can be approximately tens or approximately hundreds of micro-amperes, the electrical current consumed by the storage device, memory, and processing device (e.g., a microcontroller) can be approximately mill-amperes or approximately tens of milli-amperes. The electrical current consumed by the RF transceiver in the normal mode of operation can be approximately zero when the RF transceiver is not transmitting or receiving information/data or can be approximately milli-ampere or approximately tens of milli-amperes when the RF transceiver is transmitting or receiving information/data.

The power management engine 510 can be programmed and/or configured to switch the operational state of the circuitry 212 between the different operation modes based on, for example, an orientation of the sensor module, acceleration of the sensor, impact between the instrument and an object, and/or a specified time period after an occurrence of one or more events, as determine by the circuitry 212 disposed within a sensor module. In exemplary embodiments, the power management engine 510 can place the circuitry in the sleep mode of operation until the instrument to which the sensor module, including the circuitry 212, is affixed has a specified orientation, as detected by the accelerometer (and/or gyroscope). For example, for embodiments in which the sensor module is affixed to a golf club, the accelerometer (and/or gyroscope) can be configured to detect when the golf club is oriented in an initial swing position by a user (e.g., the addressing phase of a golf swing). The accelerometer (and/or gyroscope) can output a mode signal corresponding to the processing device when instrument has the specified orientation. In response to the mode signal from the accelerometer (and/or the gyroscope), the power management engine 510 can be executed by the processing device to transition the circuitry 212 from the sleep mode to the normal mode of operation, at which time the swing analysis engine 520 and impact detection engine 530 can be executed. The power management engine 510 can be executed by the processing device to transition from the normal mode to the sleep mode based on, for example, an amount of time that elapsed since the circuitry 212 entered the normal mode of operation, an amount of time that elapsed after a completed swing has been detected, an amount of time that elapsed after the circuitry 212 transmits information/data related to the swing event or receives acknowledgement of a successful transmission, an amount of time that elapsed since a transmission of the information/data related to the swing event, and the like.

The swing analysis engine 520 can be programmed and/or configured to monitor a swing event associated with the instrument to which the sensor module is affixed and can be executed by the processing device to capture and/or store information/data related to a swing of the instrument by a user upon detection by the circuitry 212 that the instrument has an initial swing orientation (e.g., the addressing phase of the golf swing). For example, the accelerometer can output one or more signals (e.g., X, Y, Z data) to the processing device as the instrument is being swung that correspond to a position, orientation, and acceleration of the instrument and the processing device can execute the swing analysis engine 520 to capture the position, orientation, acceleration, and direction of acceleration of the instrument during the swing event. The swing analysis engine 520 can be executed by the processing device to determine and/or discriminate between different phases of the swing (e.g., addressing, back swing, down swing, impact, and follow through), a swing tempo, swing velocity, swing force, club face angle, swing plane, and/or impact force with which the instrument strikes or will strike an object, and/or any other swing parameters.

The impact detection engine 530 can be programmed and/or configured to monitoring and/or determine when the instrument strikes an object, e.g., during a swing event. In exemplary embodiments, the impact detection engine 530 can be executed by the processing device to specify a valid window of a swing event over which an impact can be detected and/or can process one or more signals output by the accelerometer 402 and received by the processing device. For example, in some embodiments, the impact detection engine 530 can be programmed and/or configured to detect impacts between the instrument and an object during the downswing phase, the impact phase, and/or the follow-through phase of a golf swing. If an impact detection does not occur within the window defined by the impact detection engine 530, the impact detection engine 530 can ignore the impact.

In some embodiments, the impact detection engine 530 can be programmed and/or configured to determine when an impact occurs based on an output from the accelerometer. In some embodiments, the engine 530 can analyze a movement (e.g. acceleration) of the instrument for a predetermined time before the impact and a predetermined time after the impact. Based on this analysis, in some embodiments, the impact detection engine 530 can determine whether a golf shot occurred or whether there was a false detection. For example, the acceleration characteristics of the downswing phase and follow-through phase immediately before and immediately after impact, respectively, can be defined and the impact detection engine 530 can be executed by the processing device 410 to determine whether the measured accelerations during the predetermined time periods correspond to the acceleration characteristics of a golf swing.

In exemplary embodiments of the present disclosure, the impact detection engine 530 can be programmed and/or configured to suppress or ignore detection of false positive golf shots based on one or more criteria. The criteria can be used in aggregate and/or combination to detect false positive different circumstances or events to provide for robust and accurate detection of golf shots.

In some embodiments, the impact detection engine 530 can be executed by the processing device to suppress detection of a false positive golf shot when, for example, a golf club is dropped (e.g., into a golf bag) by analyzing the x, y and z accelerometer output values before a detected impact (e.g., motion criteria). If the x, y, z accelerometer values are sufficiently small, the impact detection engine 530 can be programmed to assume that the club was dropped (e.g., into a bag). If the "wakeup" or "sleep" states are triggered (which can mean that the golf club was turned upright after the shot, the false positive suppression can be canceled and the shot can be recognized. This approach advantageously allows for the recognition of very small swings (e.g. such as chip shots).

In some embodiments, detection of a false positive golf shot can be detected by the impact detection engine 530 based on motion by sampling and/or analyzing the accelerometer data for a predetermined time period after the impact (e.g., time criteria). For example, in some embodiments, the seconds between approximately the 3rd second after impact and the 11th second after impact can be sampled and analyzed. If the values output by the accelerometer are sufficiently small, the impact detection engine 530 can be programmed to determine, for example, that the club was thrown on the ground and the detected impact can be suppressed or ignored.

In some embodiments, a false positive can be suppressed or ignored based on a time between detected impacts (e.g., time criteria). As an example, the time criteria can be a time period that begins when a first impact is detected. In some embodiments, one of the detected impacts can be counted as the golf shot and the other detected impacts can during the time period can be ignored. As another example, the time criteria can be a frequency are rate between consecutive detected impacts such that if impacts occur at a frequency or rate that exceeds a threshold frequency or rate, all but one of the impacts can be counted and the other impacts can be ignored.

For embodiments in which the impact detection engine 530 suppresses or ignores false positive golf shots, the processing device 410 of the sensor module circuitry 212 can execute the impact detection engine 530 to transmit detection of a golf shot. For example, in some embodiments, the processing device can be programmed and/or configured to transmit a message indicating that a golf shot occurred without transmitting information regarding the swing or the accelerations detected by the accelerometer during the swing. In some embodiments, the processing device can be programmed and/or configured to transmit the accelerometer data and/or other swing information to an electronic device associated with the circuitry 212 and/or can transmit information that indicates that golf shot occurred. In some embodiments, when the electronic device receives a transmission including acceleration data and/or swing information, the electronic device can be programmed to automatically associate the received data/information with a golf shot such that the message from the circuitry does not require a specific indicator that a golf shot was detected. In the event that an impact processed by the impact detection engine 530 is determined to be a false positive, in some embodiments, the processing device can execute the engine 530 to delete, ignore, or otherwise disregard the impact such that no information is transmitted to an electronic device associated with the circuitry 212. In some embodiments, the circuitry 212 can be programmed to transmit the acceleration information to the electronic device with an indication that the detected impact was a false positive so that the electronic device can process or ignore the received data/information based on the indication.

While an exemplary embodiment of the system 450 has been illustrated with the power management engine 510, the swing analysis engine 520, and the impact detection engine 530, those skilled in the art will recognize that engines 510, 520, and/or 530 can be integrated with each other to form a single engine. Furthermore, while an exemplary embodiment of the system 450 includes the engines 510, 520, and 530, those skilled in the art will recognize that each of the engines 510, 520, and 530 can be implemented as several different engines such that the operation of the each of the engines 510, 520, and 530 can be performed by a combination of engines.

While the engines 510, 520, and 530 are illustrated as being resident in the sensor module, exemplary embodiments of the present are not limited to this configuration. For example, in exemplary embodiments, the operation, functionality, and/or processes of the engines 510, 520, and/or 530 can be resident on and/or implemented by the electronic device.

Figure 6:
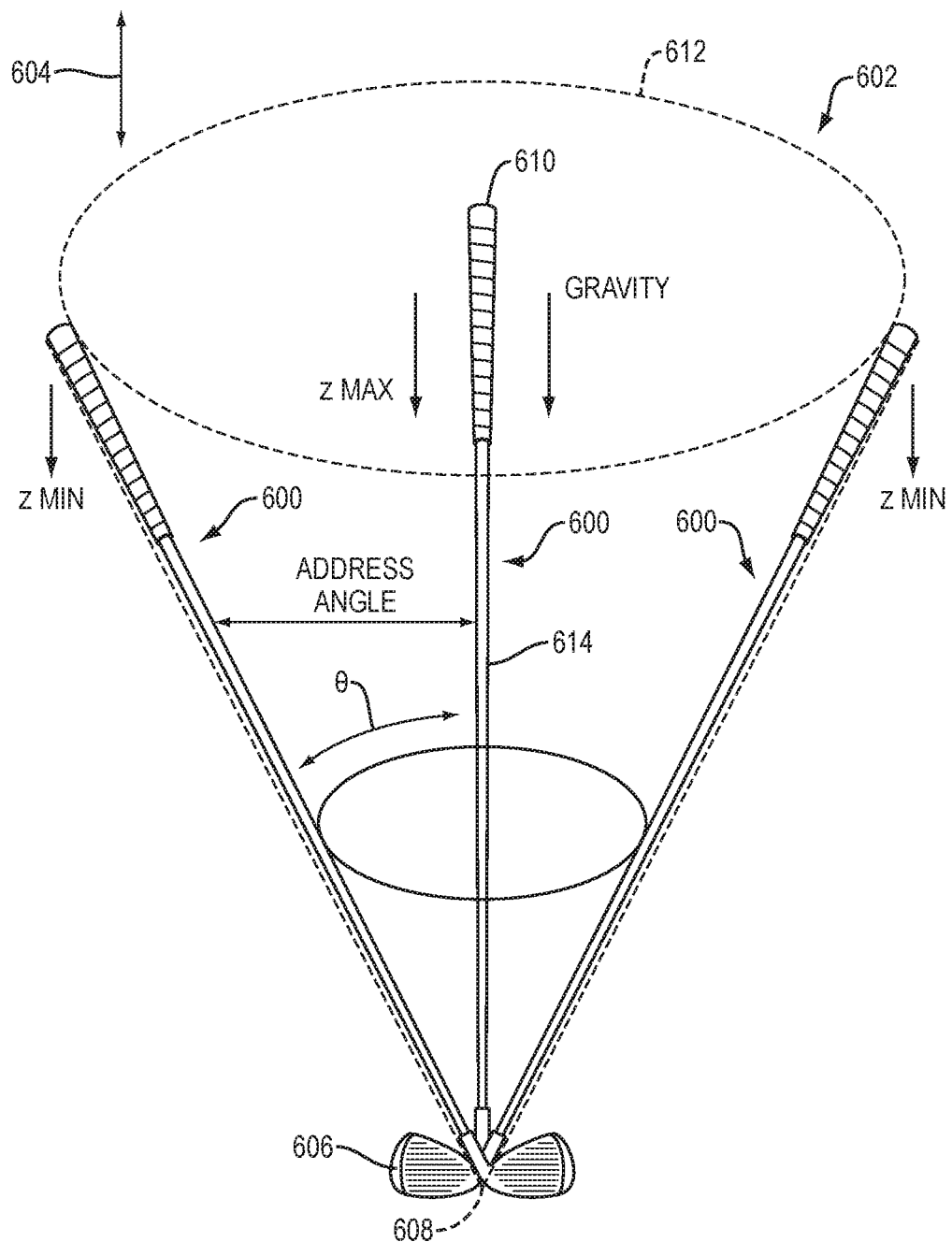
FIG. 6 depicts an exemplary range of orientations of a swinging instrument that facilitate a change in the operational mode of the sensor module circuitry in accordance with exemplary embodiments of the present disclosure.

FIG. 6 depicts an exemplary range of orientations of a golf club 600 (e.g., an embodiment of the instruments 102) that can be identified by embodiments of the circuitry 212 as an initial swing position of the golf club 600 (e.g., the addressing phase of a golf swing) and can be utilized by the circuitry to transition from the sleep mode of operation to the normal mode of operation. To reduce overall power consumption and/or extend the useable life of a nonrenewable power source that can be utilized by the circuitry 212, the range of orientations can be defined to ensure that the circuitry 212 operates in the normal mode of operations for as little time as possible by making the transition from the sleep mode to the normal conditional upon detection of the orientation of the instrument within the defined range of orientations. In the present embodiment, the range of orientations of the golf club 600 can be an acceptance cone 602 such that when the golf club has an orientation that is within the acceptance cone 602, the golf club satisfies a condition for transitioning between the sleep mode of operation and the normal mode of operation.

As described herein, the accelerometer (and/or gyroscope) of embodiments of the circuitry 212 can include three or more axes of measurement and can output one or more signals corresponding to each axes of measurement and/or can output one or more signals corresponding to an aggregate of combination of the three axes of measurement. The acceptance cone 602 can be defined by specifying a minimum directional force (z min) (e.g., having a magnitude and a direction) sensed by the accelerometer (due to gravity) along a z-axis 604 (i.e. the vertical axis) when the head 606 of the golf club 600 is oriented downwardly at an apex 608 of the acceptance cone 602 and a grip 610 of the golf club 600 is oriented above the head and at a base 612 of the acceptance cone. A maximum directional force along the z-axis (z max) can be measured when a shaft 614 of the golf club 600 is parallel to the z-axis (e.g., perpendicular to an x-axis and a y-axis). The minimum direction force (z min) can correspond to an angle $\theta$ of the golf club relative to the z-axis 604. In exemplary embodiments, the angle $\theta$ can be referred to as an addressing angle and can be approximately 25 degrees to approximately 80 degrees relative to the z-axis 604 (e.g., measured from perpendicular to the ground).

When the orientation of the head 606 and the grip 610 are inversed such that the grip is disposed downwardly at the apex of the acceptance cone 602 and the head 606 is disposed above the grip 610 and at the base 612, the directional force along the z-axis 604 can have an identical magnitude, but a different directional component as the original orientation. Embodiments of the circuitry 212 can be configured such that this inverse orientation does not satisfy the conditions of the acceptance cone 602. In exemplary embodiments, the parameters of the acceptance cone 602 (e.g., minimum directional force along the z-axis) can be implemented using software (e.g., the battery management engine 410) and/or hardware components (e.g., the activation circuitry 403).

Figure 7:
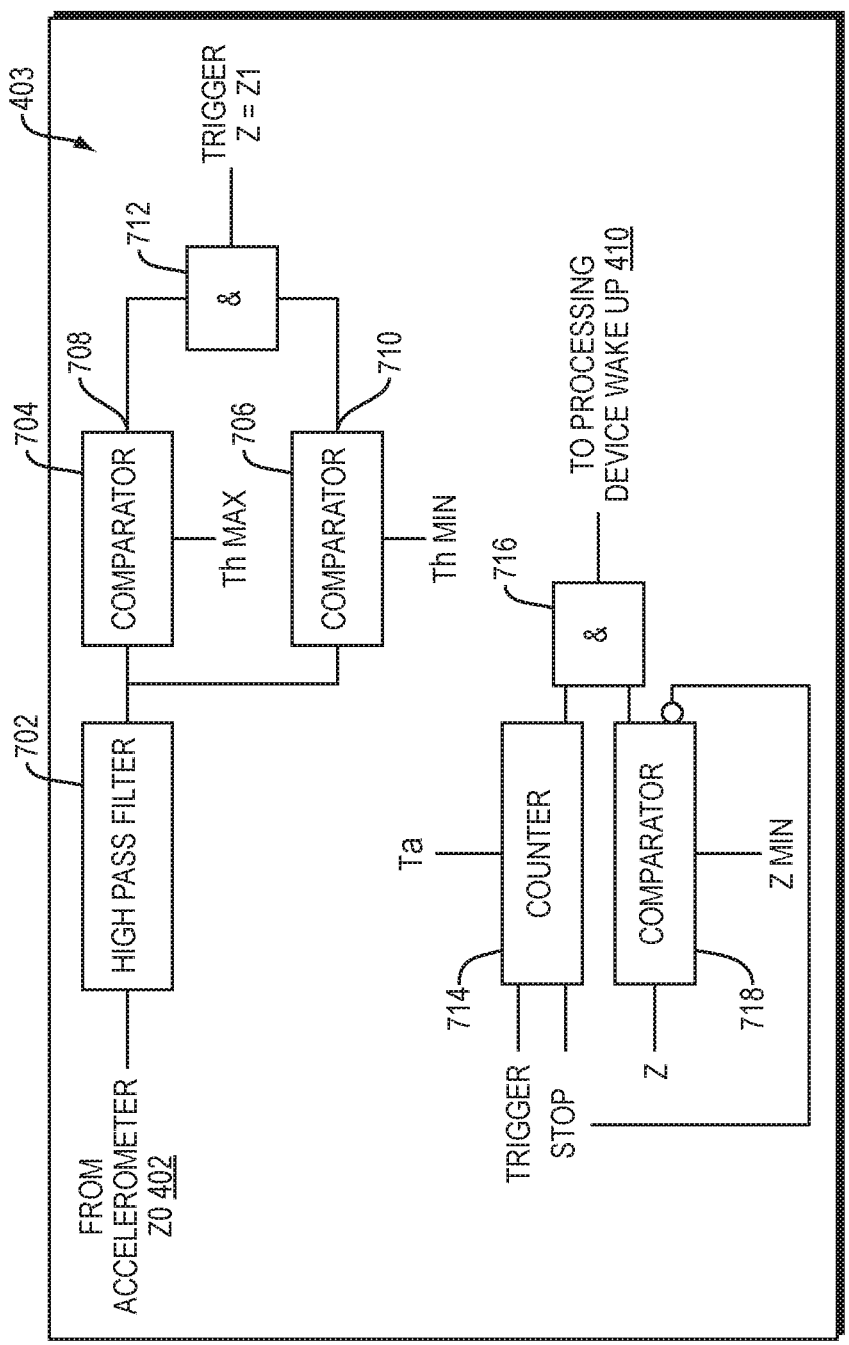
FIG. 7 is a block diagram of an exemplary hardware implementation of module activation circuitry in accordance with exemplary embodiments of the present disclosure.

FIG. 7 is a block diagram of an exemplary hardware implementation of the module activation circuitry 403 in accordance with exemplary embodiments of the present disclosure. As described herein, the sensor module can remain in a sleep mode until the sensor module detects that an instrument to which the sensor module is attached is oriented within an acceptance cone. The circuitry 403 can be used by the sensor module to determine whether the instrument is within the acceptance cone and can output a signal to the processing device of the sensor module circuitry, which can be programmed and/or configured to transition from a sleep mode of operation to a normal mode of operation.

As shown in FIG. 7, the activation circuitry 403 can receive an output signal $Z_O$ from the accelerometer 402 corresponding to a sensed force along the z-axis of the accelerometer included in the sensor module circuitry. The output signal $Z_O$ can be passed through a high pass filter 702, and can subsequently be received as an input by comparators 704 and 706. The comparator 704 can compare the filtered output signal to a maximum threshold value (Th max) and the comparator 706 can compare the output signal $Z_O$ to a minimum threshold value (Th min). The outputs 708 and 710 of the comparators 704 and 706, respectively, can be input to an AND gate 712. If the outputs 708 and 710 of the comparators 704 and 706, respectively, are both a Boolean one (e.g., if the outputs 708 and 710 have voltage above a specified threshold voltage), the AND gate 712 can output a trigger. Otherwise, the AND gate 712 does not output a trigger.

When the trigger is output by the AND gate 712 it is received as an input by a counter 714 to initiate and start the counter 714. The counter 714 can be programmed and/or configured to increment a counter value until the counter value reaches a threshold counter value $T_a$ and/or until the counter receives a stop signal. If the counter 714 reaches the threshold counter value $T_a$, the counter 714 outputs a Boolean one (e.g., the output from the counter 714 has voltage above a specified threshold voltage). Otherwise, the counter 714 outputs a Boolean zero (e.g., the output from the counter 714 has voltage below a specified threshold voltage). The output of the counter 714 is received as a first input to an AND gate 716 and an output of a comparator 718 is received by the AND gate 716 is a second input.

The comparator 718 compares the output of the accelerometer associated with the sensed force along the z-axis with the specified minimum directional force (z min) to determine whether the instrument (e.g., golf club) remains within the acceptance cone for the duration of the time period defined by the threshold counter value $T_a$. When the sensed force along the z-axis is greater than the specified minimum directional force (z min), the comparator 718 outputs a Boolean one to the AND gate 716 and outputs a Boolean zero to an input of the counter 714 corresponding to a control input for stopping the counter 714. When the sensed force along the z-axis is greater than the specified minimum directional force (z min), the comparator 718 outputs a Boolean one to the AND gate 716 and outputs a Boolean zero to an input of the counter 714 corresponding to a control input for stopping the counter 714. A Boolean one output from the comparator 718 to the control input of the counter 714 stops the counter from incrementing the counter value, and in some embodiments, can reset the counter value to an initial value (e.g., zero). The counter 714 may not restart until the counter 714 receives another trigger signal and the control input of the counter 714 is a Boolean zero. The AND gate 716 can output a wake signal to the processing device of the sensor module circuitry in response to simultaneously receiving a Boolean one from the output of the counter and a Boolean one from the output of the comparator. The processing device can execute the power management engine to transition the mode of operation of the sensor module circuitry from the sleep mode to the normal mode of operation. After the sensor module circuitry transitions to the normal mode of operation, the processing device executing the power management engine can determine whether the instrument (e.g., a golf club) is swung within a specified time period. If not, the processing device executing the power management engine can transition the sensor module circuitry from the normal mode of operation to the sleep mode of operation.

Figure 8:
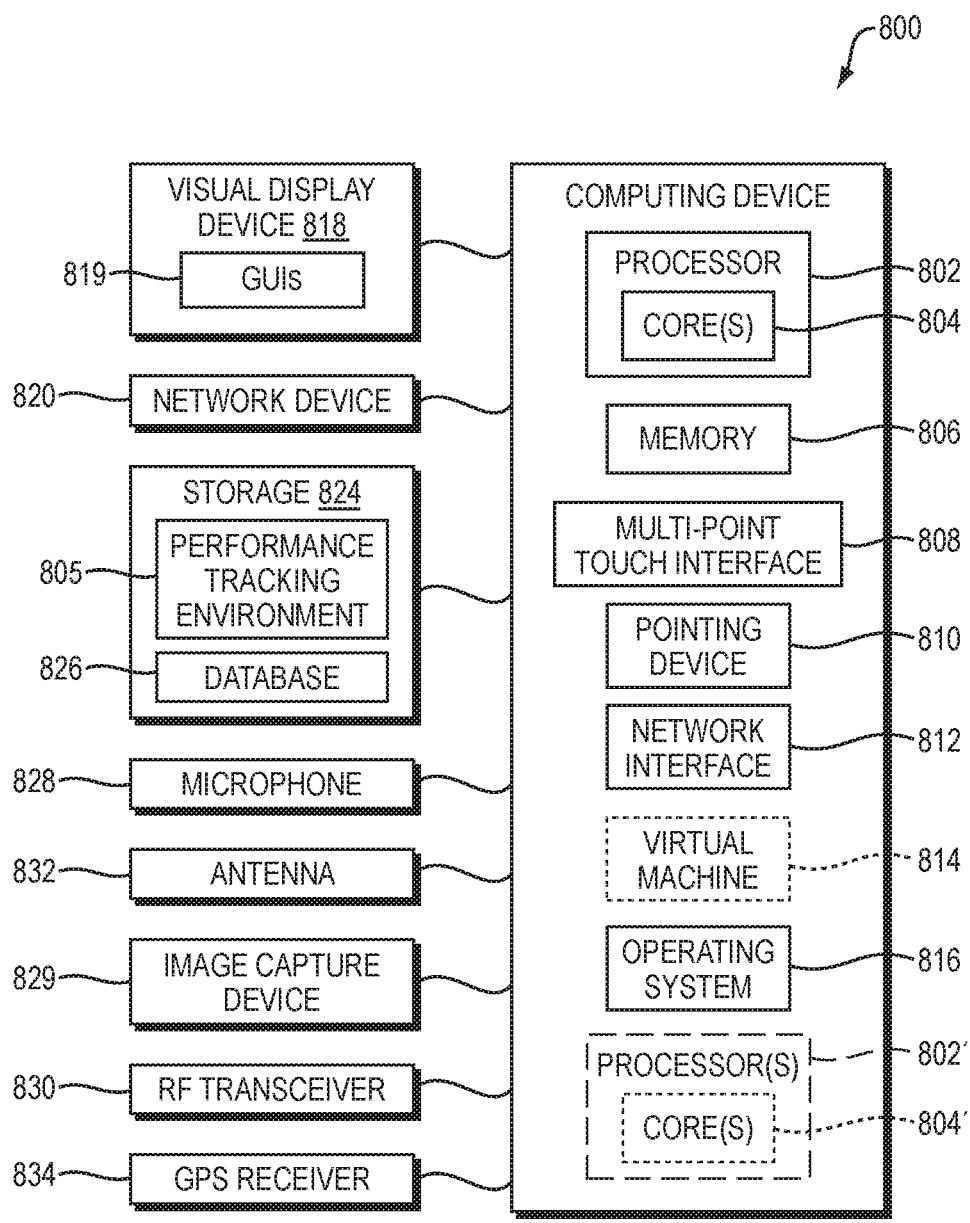
FIG. 8 is a block diagram of an electronic device that can be implemented in the performance monitoring system in accordance with exemplary embodiments of the present disclosure.

FIG. 8 is a block diagram of an exemplary electronic device 800 that may be used to implement exemplary embodiments of the electronic device 120 described herein. The electronic device 800 can include a computing device that includes one or more non-transitory computer-readable media for storing computer-executable instructions, code, or software for implementing a performance tracking and/or monitoring environment 805. The non-transitory computer-readable media may include, but are not limited to, one or more types of hardware memory, non-transitory tangible media (for example, one or more magnetic storage disks, one or more optical disks, one or more flash drives), and the like. For example, memory 806 included in the electronic device 800 may store computer-readable and computer-executable instructions or software for implementing exemplary embodiments of the environment 805. The computing device 800 also includes configurable and/or programmable processing device, e.g., a processor 802 and associated core 804, and optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for controlling system hardware. Processor 802 and processor(s) 802' may each be a single core processor or multiple core (804 and 804') processor.

Virtualization may be employed in the electronic device 800 so that infrastructure and resources in the electronic device 800 may be shared dynamically. A virtual machine 814 may be provided to handle a process running on multiple processors so that the process appears to be using only one computing resource rather than multiple computing resources. Multiple virtual machines may also be used with one processor.

Memory 806 may include a computer system memory or random access memory, such as DRAM, SRAM, EDO RAM, and the like. Memory 806 may include other types of memory as well, or combinations thereof.

A user may interact with the electronic device 800 through a visual display device 818, such as a touch screen, which may display one or more graphical user interfaces 819 render upon execution of the computer readable instructions, code, or software corresponding to the environment 805. The electronic device 800 may include other I/O devices for receiving input from a user, for example, a keyboard (virtual or physical) or any suitable multi-point touch interface 808, a pointing device 810 (e.g., a mouse or stylus), a microphone 828, and/or an image capturing device 829 (e.g., a camera or scanner). The computing device 800 may include other suitable conventional I/O peripherals.

The electronic device 800 may also include one or more storage devices 824, such as a hard-drive, CD-ROM, or other computer readable media, for storing data and computer-readable instructions and/or software that implement exemplary embodiments of the environment 805 described herein. Exemplary storage device 824 may also store one or more databases for storing any suitable information required to implement exemplary embodiments. For example, exemplary storage device 824 can store one or more databases 826 for storing information, such as user performance information, golf course information, performance statistics, user profiles, performance analysis, and/or any other information to be used by embodiments of the environment 805. The databases may be updated manually or automatically at any suitable time to add, delete, and/or update one or more items in the databases.

The electronic device 800 can include a network interface 812 configured to interface via one or more network devices 820 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 812 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

In exemplary embodiments, the electronic device 800 can include a RF transceiver 830. The RF transceiver 830 can be configured to transmit and/or receive wireless transmissions via an antenna 832. For example, the RF transceiver can be configured to transmit one or more messages, directly or indirectly, to one or more sensor modules (e.g., sensor modules 110 shown in FIG. 1) and/or to a remote system (e.g., remote system 130 shown in FIG. 1) and/or can be configured to receive one or more messages, directly or indirectly, from one or more sensor modules and/or the remote system. The RF transceiver 830 can be configured to transmit and/or receive messages having a specified frequency and/or according to a specified sequence and/or packet arrangement. As one example, the RF transceiver 830 can be a BlueTooth® transceiver configured to conform to a BlueTooth® wireless standard for transmitting and/or receiving short-wavelength radio transmissions typically in the frequency range of approximately 2.4 gigahertz (GHz) to approximately 2.48 GHz. As another example, the RF transceiver 830 can be a Wi-Fi transceiver (e.g., as defined IEEE 802.11 standards), which may operate in an identical or similar frequency range as BlueTooth®, but with higher power transmissions. Some other types of RF transceivers that can be implemented by the sensor module circuitry includes RF transceivers configured to transmit and/or receive transmissions according to the Zigbee® communication protocol, and/or any other suitable communication protocol.

The electronic device can include a GPS receiver 834. The GPS receiver 834 can be configured to receive GPS satellite transmissions including GPS data, which can be used by the environment 805 being executed by the processor 802 of the electronic device 800 to monitor and/or track a geographic location of the electronic device 800 (e.g., a longitude and latitude of the electronic device). For example, for embodiments implemented in a golfing environment, the electronic device 800 can receive a broadcast signal from a GPS satellite and can process the GPS data included in broadcast signal to determine a geographic location of the electronic device 800, which can be utilized by the environment 805 to determine a geographic location of the electronic device 800 on a golf course, relative to a hole on the golf course, a distance the electronic device 800 travelled between consecutive golf shots, and/or any other location based information.

The electronic device 800 may be any computer system, such as a laptop, handheld computer, tablet computer (e.g., the iPad™ tablet computer), mobile computing or communication device (e.g., the iPhone™ communication device or an Android™ communication device), or other form of computing or telecommunications device that is capable of communication and that has sufficient processor power and memory capacity to perform the operations described herein. The electronic device 800 may run any operating system 816, such as any of the versions of the Microsoft® Windows® operating systems, the different releases of the Unix and Linux operating systems, any version of the MacOS® for Macintosh computers, any version of the Android operating system, any version of the iOS operating system for the Apple iPhone and/or iPAd, any embedded operating system, any real-time operating system, any open source operating system, any proprietary operating system, or any other operating system capable of running on the computing device and performing the operations described herein. In exemplary embodiments, the operating system 816 may be run in native mode or emulated mode. In an exemplary embodiment, the operating system 816 may be run on one or more cloud machine instances.

In some embodiments, the electronic device 800 can receive transmissions from a sensor module including acceleration information, other swing information, an indication that the sensor module detected an impact between the instrument and an object, and/or an indication of a golf shot. In response to the receipt of the information/data included in the transmission, the processing device 802 of the electronic device 800 can execute the environment 805 to determine whether the impact associated with the received transmission is a false positive golf shot. If the electronic device 800 determines that the impact is a false positive golf shot, the environment 805 can be executed by the processing device 802 to suppress or ignore the data/information included in the transmission or can be programmed to process the data/information included in the transmission as a false positive.

In exemplary embodiments, the environment 805 can be programmed and/or configured to suppress or ignore false positive golf shots based on one or more criteria. The criteria can be used in aggregate and/or combination to detect false positive different circumstances or events to provide for robust and accurate detection of golf shots. In some embodiments, the criteria can be used in conjunction with any criteria implemented by the sensor modules. For example, for embodiments in which the sensor modules are configured to process the accelerometer output to identify golf shots, if the sensor module determines that a detected impact constitutes a golf shot based on criteria used by the sensor module and transmits a message to the electronic device 800 indicative of a detected golf shot, the electronic device executing the environment 805 can apply its criteria to determine whether the detected impact is a golf shot or is a false positive. In some embodiments, the electronic device 800 can receive acceleration information from the sensor module and can determine whether the acceleration information corresponds a golf shot or a false positive.

In some embodiments, the environment 805 can be programmed and/or configured to suppress or ignore false positives when a club is dropped (e.g., into a bag) by processing x, y and z accelerometer output values (e.g., accelerometer criteria) obtained before, after, and/or when the impact is detected, which can be received by the electronic device in a transmission from a sensor module. If the x, y and z accelerometer output values are sufficiently small, the processing device 802 can execute the environment 805 to assume that the club was dropped (e.g., into a bag) and to identify the impact as a false positive. If a "wakeup" or "sleep" state is triggered in the sensor module subsequent to impact (which means that the club was turned upright after the shot), the sensor module can transmit this information to the electronic device 800 and the electronic device 800 can cancel the false positive suppression and recognize the detected impact as a shot. This advantageously allows the environment 805 executed in the electronic device to recognize very small swings (e.g., such as chip shots).

In some embodiments, a false positive golf shot can be suppressed or ignored based on a motion of the golf club before, during, or after an impact is detected. For example, after a shot, the accelerometer output values are sampled and processed for a predetermined amount of time and transmitted to the electronic device. In some embodiments, the seconds between approximately the third second after impact and the eleventh second after impact can be processed and analyzed. If the values in the accelerometer are sufficiently small, the environment 805 can be programmed and/or configured to assume, for example, that the club was thrown on the ground and can suppress or processor 802 can execute the environment 805 to ignore the detected impact.

In some embodiments, a false positive impact/golf shot can be suppressed or ignored based on distances between detected impacts. For example, the environment 805 can be programmed and/or configured to recognize only one detected impact within a certain geographic radius (e.g., to form a geographic boundary) as a golf shot and can ignore other detected transmissions associated with acceleration information or impacts within the geographic radius. The geographic radius can be different for different golf clubs and/or for different distances to a specified location on the golf course, such as a center point of the green of the current hole being played by the user. As one example, the geographic radius associated with a driver can be larger than the geographic radius associated with a long iron, which can be larger than the geographic radius of a short iron. The geographic radius can be defined based on GPS coordinates (e.g., longitude and latitude coordinates) and the distance can be measured using global positioning information processed by the electronic device 800 such that if multiple impacts are detected within the geographic radius only one of the detected impacts is counted as a golf shot. In some embodiments, the first, intermediate, or last detected impact can be counted as the golf shot and the first detected impact can define a center point of the geographic radius. The geographic radius criteria can be used to advantageously eliminate false positives from practice shots (as well as from banging a golf club on the ground after a shot in frustration or any other impacts detected within the radius).

As a non-limiting example, during a round of golf, the user can begin a new golf hole such that no golf shots have been recorded for the golf hole. Before striking the golf ball, the user may take a series of practice swings near the tee site with the driver. In some embodiments, information related to these practice swings can be transmitted to the electronic device at the time the practice swings occur. In some embodiments, only those practice swings for which the sensor module secured to the driver detects an impact are transmitted to the electronic device. The first transmission received by the electronic device (or the first transmission for which an impact is detected) can be used to establish a geographic boundary based on the type of club used to generated the transmission and/or a distance of the electronic device to the a specified location on the golf course (e.g., a distance to the center of the green for the current golf hole being played) determined based on golf course information and GPS data. For example, the first transmission (or the first transmission for which an impact is detected) or can be set to a center point of the geographic boundary and a geographic radius can be set to a specified geographic radius associated with the driver when the distance between the center point of the geographic boundary and the center of the green exceeds a threshold value.

Once the golfer is ready take an actual golf shot, the user can strike the ball with the driver and can move to the location at which the golf landed after being struck by the driver (i.e., the new location). The user can select one or more clubs at the new location and can take a series of practice swings and/or can strike the golf ball with the golf club, each of which can generate a transmission from the sensor modules corresponding to the golf clubs used to by the user. If the new location at which the electronic device is positioned for the first transmission (or the first transmission for which an impact is detected) exceeds the geographic radius set by the electronic device, the electronic device identifies that a golf shot occurred based on one of the swings of the driver and resets the center point and geographic radius of the boundary based on the practice swings and/or a swing that strikes the golf ball. For example, if the user selects a nine iron and swings the nine iron such that the sensor module secured to the nine iron transmits a message to the electronic device (e.g., that is indicative of an impact between the nine iron and an object), the electronic device can set the location of the electronic device at which the transmission was received to be the center point of the geographic boundary and can set the geographic radius to be a geographic radius associated with the nine iron. The geographic radius can be different depending on whether a distance for the location to a selected location of the golf course (e.g., a center point of the green for the golf hole currently being played) exceeds a threshold value. When the distance does not exceed the threshold, a first value can be used for the geographic radius, and when the distance does exceed the threshold, a second value can be used for the geographic radius. The threshold value can be specific to the type of golf club being used such that the threshold can be different, for example, if the user uses a driver or a nine iron.

While exemplary embodiments of the geographic boundary have been described as including a center point and a radius to form a circular geographic boundary, exemplary embodiments of the geographic boundary can have any suitable shape. For example, in exemplary embodiments of the present disclosure, the geographic boundary can be an ellipse, a rectangle, a triangle, a trapezoid, and/or any other suitable shape. Furthermore, the shape of the geographic boundary can be different for different types of golf clubs.

In some embodiments, a false positive can be suppressed or ignored based on a time between detected impacts. The time criteria can be different for different golf clubs. As one example, the time period associated with a driver can be longer than the time period associated with a long iron, which can be longer than the time period associated with a short iron. In some embodiments, the first, intermediate, or last detected impact can be counted as the golf shot and the first detected impact can start the time period. The time period criteria can be used to advantageously eliminate false positives from practice shots (as well as from banging a golf club on the ground after a shot in frustration).

In some embodiments, a false positive can be suppressed or ignored based on a motion of the user. For example motion data of the electronic device in conjunction with GPS information can be used to determine if a user is moving when an impact is detected. Since it may take several seconds for the electronic device to receive a transmitted message from the sensor module after an impact, a history of motion data and location data can be maintained by the electronic device to allow the processing device to execute the environment to determine if the user was moving at the time of the impact. In order to accomplish, the number of seconds since the impact occurred can be encoded in a message transmitted by the sensor module. If it is determined that the user was moving at the time of the detected impact, the processing device 802 can be programmed to suppress or ignore the detected impact.

In some embodiments, a false positive can be suppressed or ignored based on criteria associated with an appropriateness of a golf club used for a given circumstance. The circumstance can take into account a location of the user with respect to the current hole or the next hole, a distance from the tee to the hole, and an appropriateness of the golf club can include an average distance a golf ball is hit by the user using a golf club, an intended use of the golf club (e.g., for long shots or short shots). As one example, if a user has putted on the current hole, and an impact is detected from a club that is not appropriate for another a golf shot on the current hole or a tee shot on the next hole, the detected impact can be suppressed or ignored. For example, if the user hits their pitching wedge 110 yards on average and the next hole is a 175 yard par 3, any impacts detected from the sensor module associated with the pitching wedge suppressed or ignored until after the next tee shot.

Figure 9:
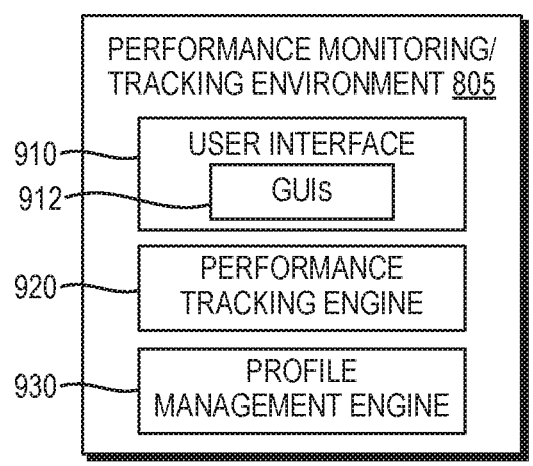
FIG. 9 is a block diagram of an exemplary embodiment of the performance monitoring and/or tracking environment that can be implemented in accordance with the present disclosure.

FIG. 9 is a block diagram of an exemplary embodiment of the performance monitoring and/or tracking environment 805 that can be implemented by embodiments of the electronic device 800 to monitor and/or track a user's golfing performance. The environment 805 can include a user interface 910, a profile management engine 920, and a performance tracking engine 930.

In exemplary embodiments, the user interface 910 can be programmed and/or include executable code to provide one or more graphical user interfaces (GUIs) 912 through which a user can interact with the environment 805. The GUIs 912 displayed to users can include data entry areas to receive information from the user and/or can include data outputs to display information to the user. Some examples of data entry fields include, but are not limited to text boxes, check boxes, buttons, dropdown menus, and/or any other suitable data entry fields.

The profile management engine 920 can be programmed and/or configured to receive, maintain, modify, and/or update a user profile. In exemplary embodiments, the user profile can be created by the user upon an initial execution of the environment 805. As one example, the processing device can execute the engine 920 to request user information including, for example, a user name, gender, weight, height, golf handicap, stance (e.g., right or left), an experience level (e.g., number of years playing, a number of rounds played in the previous year), and/or any other suitable user information. As another example, the processing device can execute the engine 920 to collect and/or setup instrument information including, for example, an identity of the instruments (e.g., different golf clubs) to which the sensor modules are or will be affixed, an association between the sensor modules and their corresponding instruments (e.g., golf clubs), an estimated distance an object (e.g., a golf ball) will likely travel when the user strikes it with each instrument, and/or any other suitable instrument information that can be utilized by the environment 805 to facilitate tracking and/or monitoring a user's performance during an activity (e.g., a round of golf). In exemplary embodiments, the user profile can be maintained, modified, and/or updated to include statistic information related to the user's past performance In exemplary embodiments, the statistic information can include an average score, a handicap, an average distance an object travels for each of the instruments, a user performance on specific golf courses, and/or any other statistic information that can be utilized, maintained, and/or created based on the tracking and/or monitoring of a user's performance during an activity (e.g., a round of golf).

In exemplary embodiments, the performance tracking engine 920 can be programmed and/or configured to receive and/or maintain information corresponding to specific golf courses and/or holes at a specific golf course. For example, the engine 920 can receive and/or maintain a geographic map of the golf course including information related to the terrain of the golf course, a location of the holes on the golf course, a par for the holes on the golf course, and/or any other suitable information related to golf courses. In some embodiments, the golf course information can be maintained in a database of the remote system and the electronic device can request the golf course information from the database in response to an input from the user. In some embodiments, the golf course information can be stored on the electronic device executing the environment 805.

The performance tracking engine 930 can be executed by the processing device to monitor transmissions from sensor modules affixed to the golf clubs and to process the transmissions. For example, in exemplary embodiments, transmissions from the sensor modules can include information corresponding to accelerometer information of the golf club, an indication of an impact between a golf club and an object (e.g., a golf ball or the earth), an indication of a golf shot, swing analysis information (e.g., a swing speed, a swing tempo, swing force, club face angle, swing plane, etc., represented via accelerometer output information), and/or any other suitable information related to an operation of the sensor module and/or a utilization of the instrument. The information received by the electronic device can be utilized upon execution of the engine 930 to identify a location at which a golf shot occurred, identify a number of golf shots that occurred for a particular hole, identify a golf score for a particular hole or course, provide a swing analysis, identify false positive impacts/golf shots (e.g., using criteria described herein), and the like. The information received from the transmissions can also be provided to the engine 920 to create, update, and/or modify statistic information in the user profile.

FIGS. 10-32 provide exemplary GUIs that can be rendered on a display of an electronic device in response to an execution of the environment 805 by the electronic device 800 shown in FIG. 8.

Figure 10:
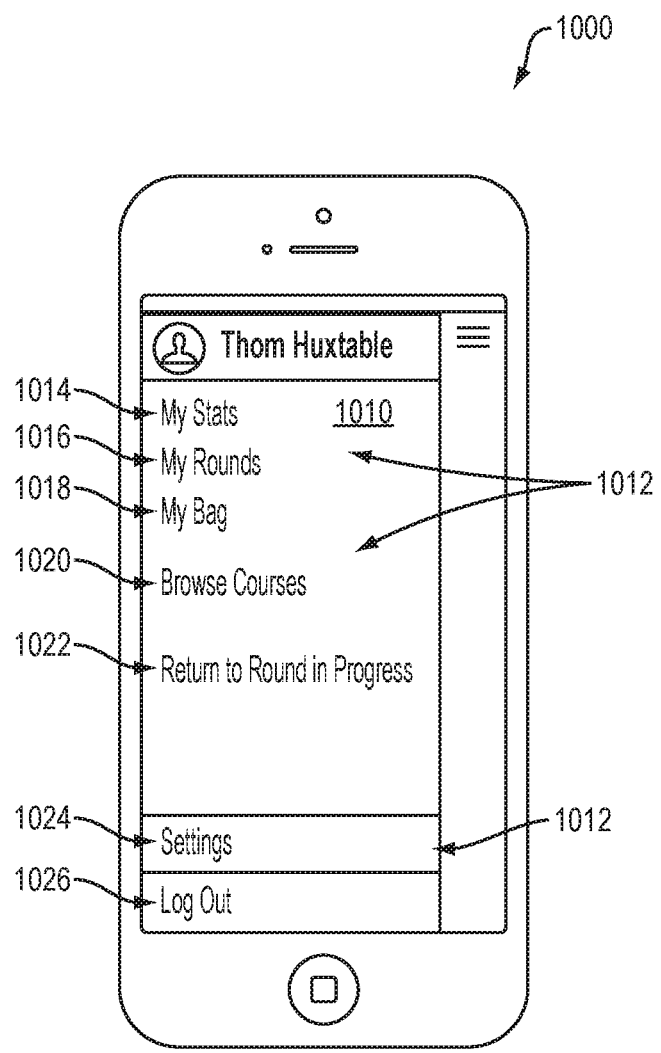
FIGS. 10-32 show exemplary graphical user interfaces that can be provided in accordance with exemplary embodiments of the present disclosure.

FIG. 10 shows an exemplary GUI 1000 that can be provided by an exemplary embodiment of the environment 805. The GUI 1000 can be programmed and/or configured to provide a main or home screen 1010 to a user. The home screen can include display a user name associated with a user profile being accessed by the environment 805 and can include links 1012 that can be selected by the user to navigate through various GUIs that can be rendered by the environment 805. For example, in the present embodiment, the links 1012 can include a "My Stats" link 1014, a "My Rounds" link 1016, a "My Bag" link 1018, a "Browse Courses" link 1020, a "Return to Round in Progress" link 1022, a "Settings" link 1024, and a "Log Out" link 1026. The link 1014 can be selected by the user to navigate to a GUI that display statistic information corresponding to the user's golf performance that is received and/or maintained by the environment 805. The link 1016 can be selected by the user to navigate to a GUI that display previous rounds of golf that were played by the user and tracked by the environment 805. The link 1018 can be selected by the user to navigate to a GUI that identifies which golf clubs a user has registered with the environment. The link 1020 can be selected by the user to navigate to a GUI that allows the user to view and select golf courses on which the environment 805 can track and/or monitor the user's performance. The link 1022 can be selected by the user to navigate to a GUI that corresponds to a round of golf that is currently being tracked and/or monitored by the environment 805. The link 1024 can be selected by the user to navigate to a GUI that allows the user to view and/or edit various settings of the environment 805. The link 1026 can be selected by the user to log out of the user's current session in the environment 805.

Figure 11:
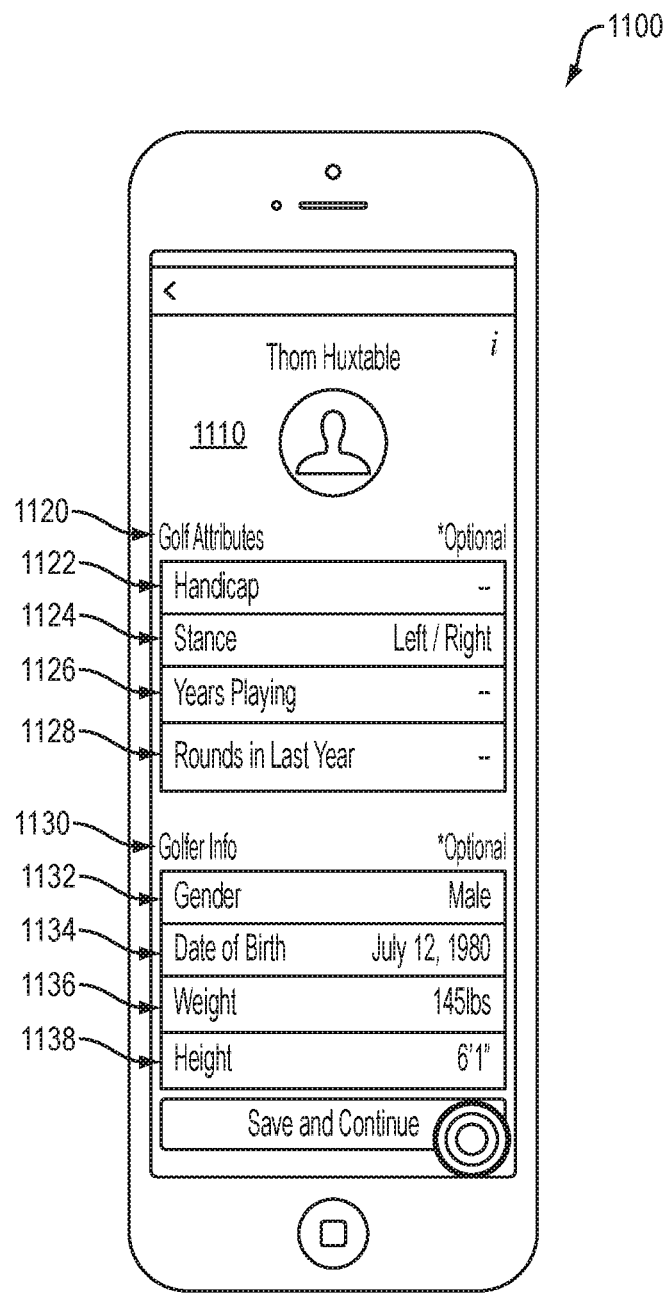

FIG. 11 shows an exemplary GUI 1100 that can be provided by an exemplary embodiment of the environment 805 to display user profile screen 1110. The user profile screen 1110 can include user profile information include golf attributes 1120 and golfer information 1130. The golf attributes 1120 can include a handicap attribute 1122, a stance attribute 1124, a number of years playing golf attribute 1126, an a rounds played in the last year attribute 1128. The golfer information 1130 can include a gender 1132, date of birth or age 1134, weight 1136, and height 1138. In exemplary embodiments, the user can input the golf attributes 1120 and the golfer information 1130 via the user profile screen 1110.

Figure 12:
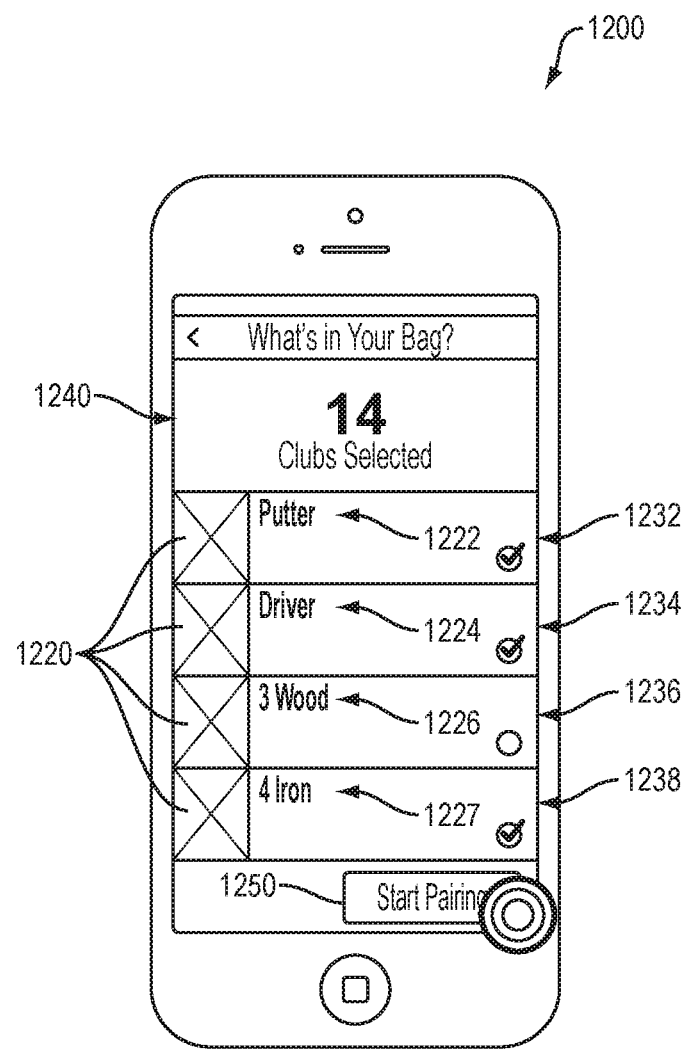

FIG. 12 shows a portion of an exemplary GUI 1200 that can be provided by an exemplary embodiments of the environment 805 to display a golf club selection screen 1210. The golf club selection screen can list different types of golf clubs 1220 and can allow the user to identify which of the golf clubs 1220 the user has. For example, some of the different types of golf clubs that can be included in the list are a putter 1222, a driver 1224, a 3-wood 1226, and a 4-iron 1228. The user can identify which of the golf clubs the user has by selecting a radial button associated with a respective one of the clubs. For example, radial buttons 1232, 1234, 1236, and 1238 can be used to select the golf clubs 1222, 1224, 1226, and 1228, respectively. As shown in FIG. 12, the user has selected the radial button 1232 to indicate that the user has the putter 1232, the radial button 1234 to indicate that the user has the driver 1224, and the radial button 1238 to indicate that the user has the 4-iron 1228. The screen 1210 can display a total number 1240 of golf clubs selected by the user. After the user has identified which of the golf clubs the user has, the user can select the "Start Pairing" button 1250 to navigate to another GUI that can be used to begin pairing sensor modules with golf clubs.

Figure 13:
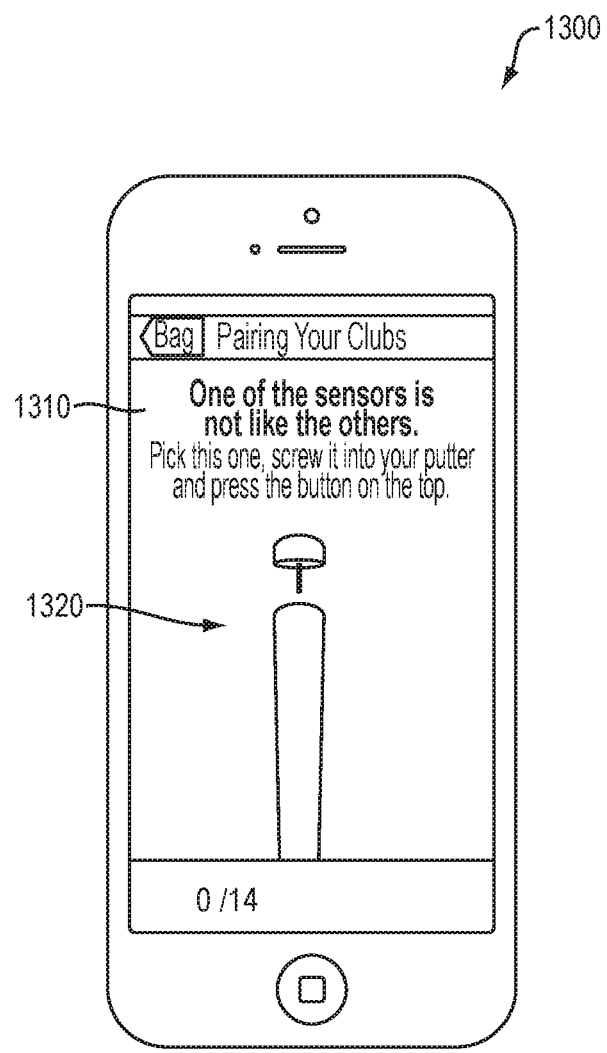

FIG. 13 shows an exemplary GUI 1300 that can be provided by exemplary embodiments of the environment 805 to facilitate a pairing process between the golf clubs and the sensor modules. The GUI 1300 displays an instructional screen 1310 indicating that the putter is ready to be paired with a sensor module. In exemplary embodiments, the housing of the sensor module can be different for the putter than the remaining housings for sensor modules that can be used for other golf clubs. The screen 1310 can instruct the user of this different and can display a graphic or animation illustrating how to affix the sensor module to the golf club. The screen 1310 can also instruct the user to initiate the pairing process by depressing the push button on the sensor module, which causes the sensor module to broadcast a transmission that can be received by the user's electronic device (e.g., smart phone) to pair the sensor module with the electronic device. The electronic device can associate a unique identifier corresponding to the sensor module that is received in the transmission with the putter in the environment 805. In exemplary embodiments, a BlueTooth® pairing process can be used to pair the sensor module with the electronic device.

Figure 14:
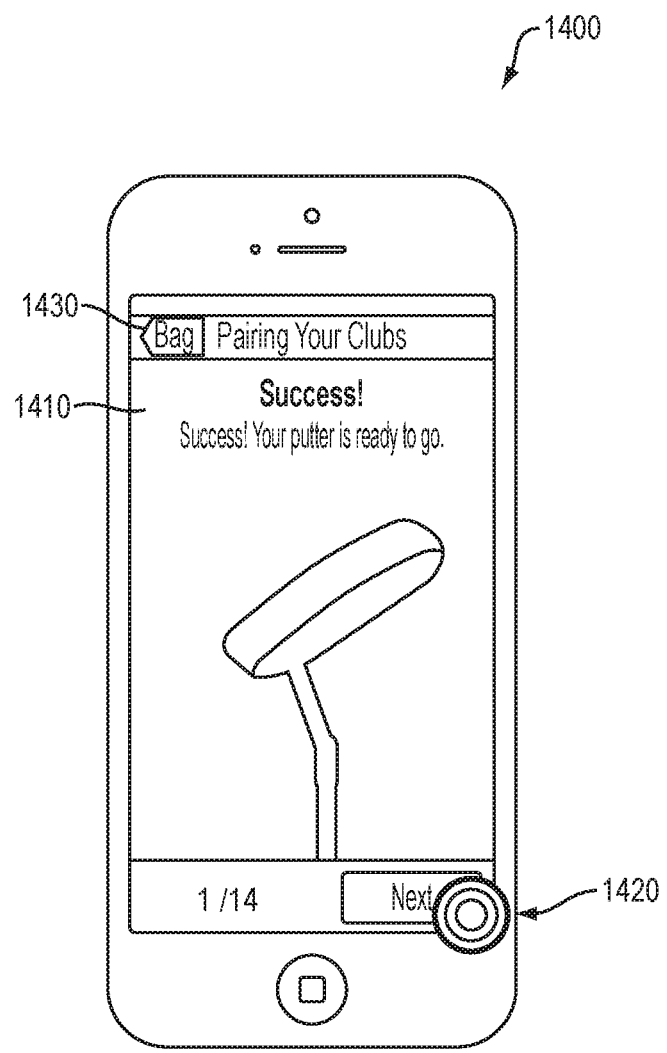

FIG. 14 shows an exemplary GUI 1400 that can be provided by exemplary embodiments of the environment 805 to display a pairing complete screen 1410. The pairing complete screen 1410 can display a message to the user indicating that the sensor module and the electronic device have been paired and that the sensor module has been associated with the putter. The screen 1410 can include a "Next" button 1420 that can be selected by the user to associate another sensor with another golf club and pair the other sensor with the electronic device and can include a "Bag" button 1430 that can be selected by the user to navigate to a GUI that display a list of the golf clubs that the user has.

Figure 15:
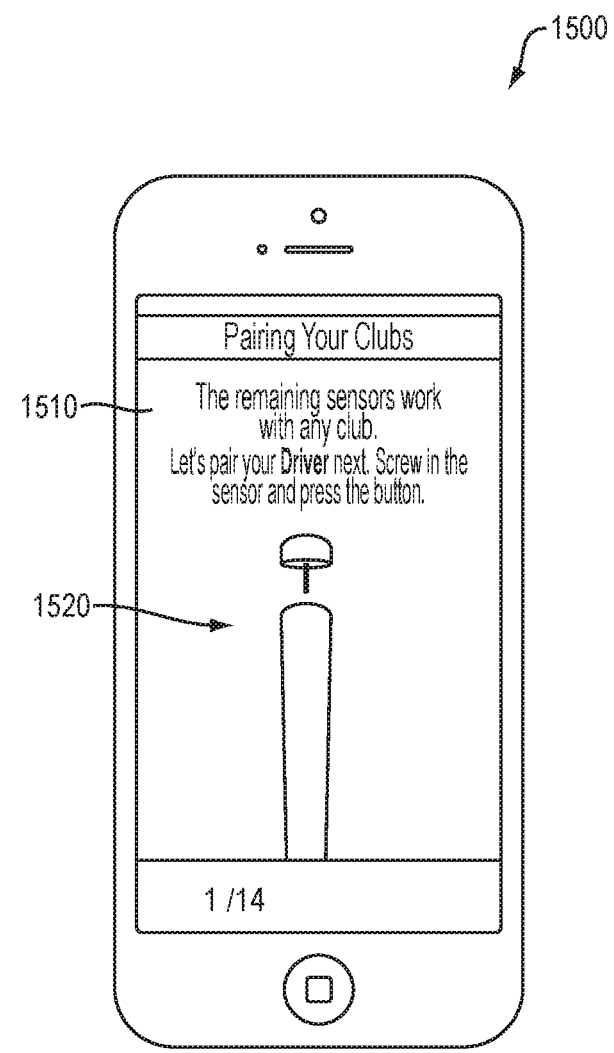

FIG. 15 shows an exemplary GUI 1500 that can be provided by exemplary embodiments of the environment 805 to facilitate a pairing process between the golf clubs and the sensor modules. The GUI 1500 displays an instructional screen 1510 indicating that the another golf club (e.g., other than the putter) is ready to be paired with a sensor module. The screen 1510 can display a graphic or animation illustrating how to affix the sensor module to the golf club and can instruct the user to initiate the pairing process by depressing the push button on the sensor module, which causes the sensor module to broadcast a transmission that can be received by the user's electronic device (e.g., smart phone) to pair the sensor module with the electronic device. The electronic device can associate a unique identifier corresponding to the sensor module that is received in the transmission with the golf club in the environment 805. In exemplary embodiments, a BlueTooth® pairing process can be used to pair the sensor module with the electronic device.

Figure 16:
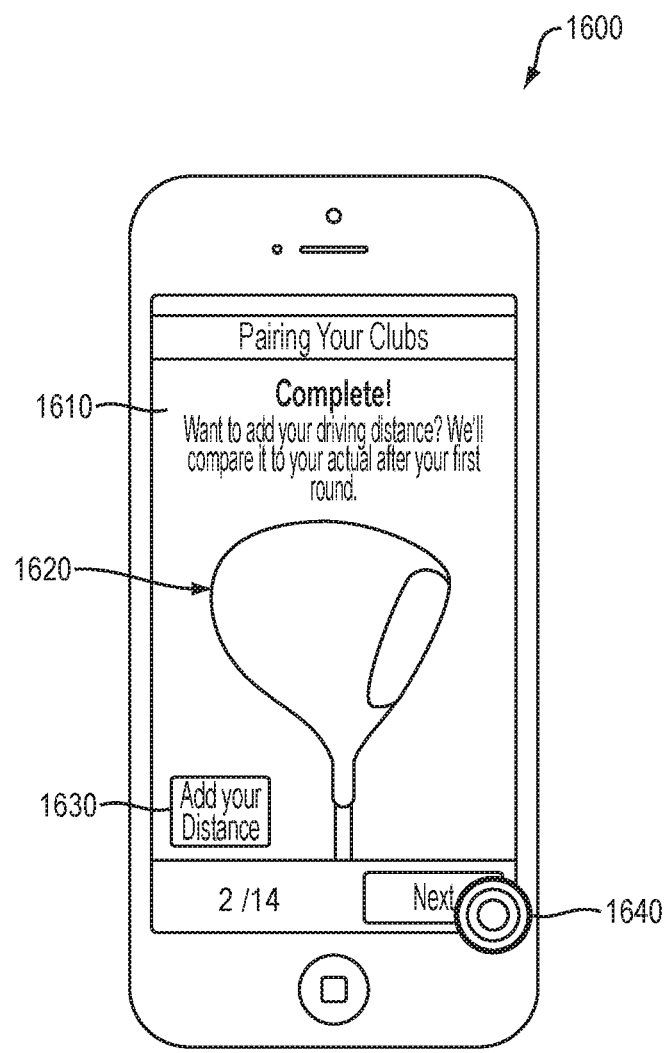

FIG. 16 shows an exemplary GUI 1600 that can be provided by exemplary embodiments of the environment 805 to display a pairing complete screen 1610. The pairing complete screen 1610 can display a message 1620 to the user indicating that the sensor module and the electronic device have been paired and that the sensor module has been associated with the golf club. The screen can include a button 1630 that can be selected by the user to allow the user to enter an estimated distance the user can hit the golf ball using the corresponding golf club and can include a "Next" button 1640 that can be selected by the user to associate another sensor with another golf club and pair the other sensor with the electronic device.

Figure 17:
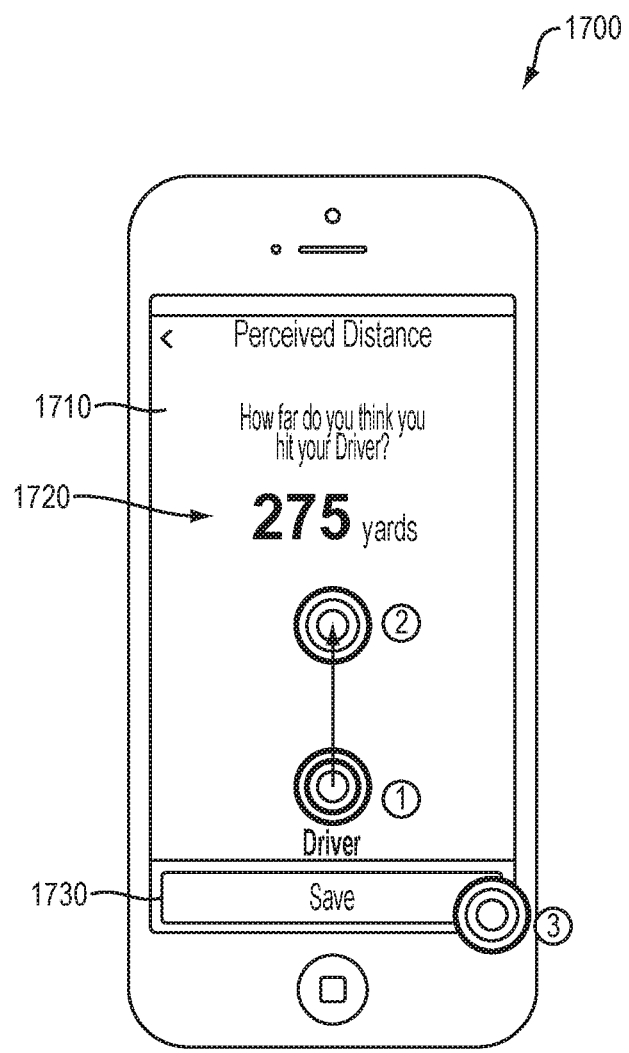

FIG. 17 shows an exemplary GUI 1700 that can be provided by exemplary embodiments of the environment 805 to display a screen 1710 to request an estimated distance the user can hit a golf ball using the identified golf club. As shown in FIG. 17, the screen 1710 can request the estimated distance the user can hit a golf ball using the driver golf club and can allow the user to enter the estimated distance 1720 (e.g., 275 yards). A "Save" button 1730 can be provided to allow the user to save the estimated distance 1720 and to associated the estimated distance 1720 with the driver club.

Figure 18:
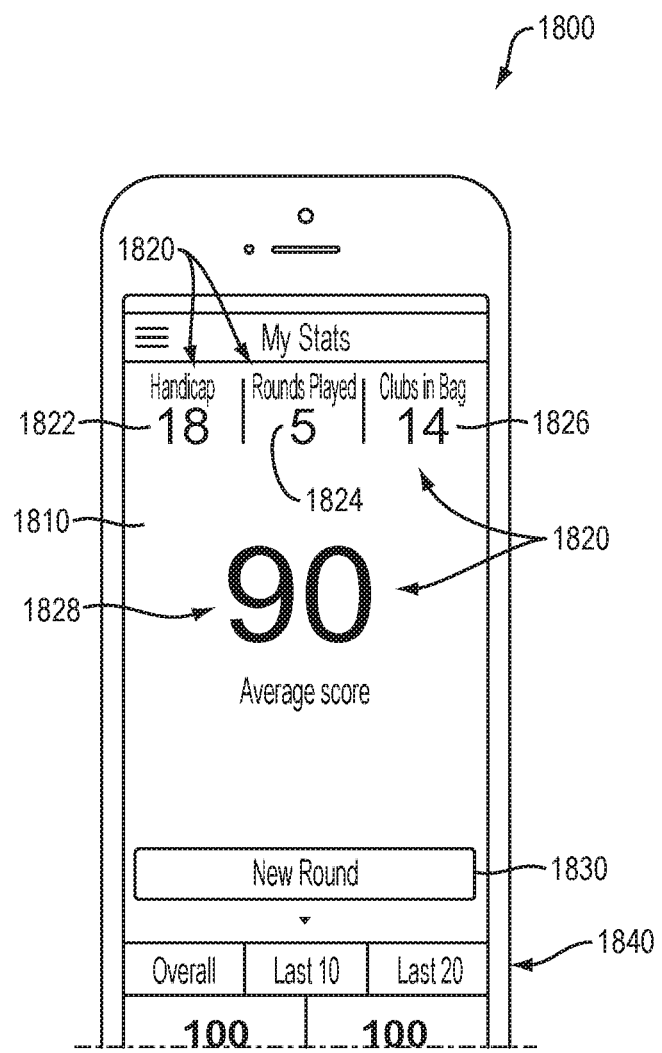

FIG. 18 shows an exemplary GUI 1800 that can be provided by exemplary embodiments of the environment 805 to display a screen 1810 including statistical information 1820 received and/or maintained by the environment 805. The statistical information can include a handicap

1822, a number of rounds played 1824, a number of golf clubs the user has 1826, and an average golf score 1828. The screen 1810 can include a "New Round" button 1830 that can be selected by the user to initiate a new golf round. In some embodiments, the screen 1810 can display other statistical information, such as statistical information 1840 on a per round basis.

Figure 19:
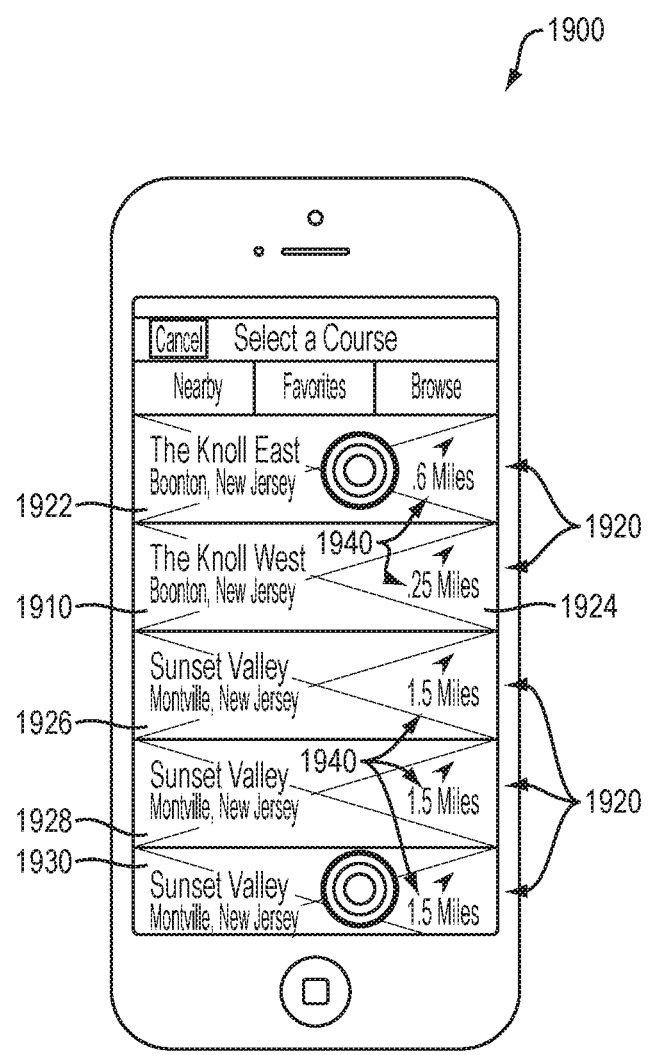

FIG. 19 shows an exemplary GUI 1900 that can be provided by exemplary embodiments of the environment 805 to display a screen 1910 that includes a list 1920 of golf courses on which the environment 805 can be used. For example, the list can include a golf courses 1922, 1924, 1926, 1928, and 1930. As shown in FIG. 19, a distance 1940 to each of the golf courses 1922, 1924, 1926, 1928, and 1930 from the user current location (as determined by the user's electronic device executing the environment 805) can be displayed. In some embodiments, the screen can allow the user to search or browse for golf courses and/or to order and/or filter the golf courses based on a distance to the golf course and/or a list of favorite golf courses. The GUI 1900 can be programmed and/or configured to allow the user to select a golf course from the list 1920 to navigate to another GUI from which the user can initiate monitoring and/or tracking of a round of golf at the selected golf course.

Figure 20:
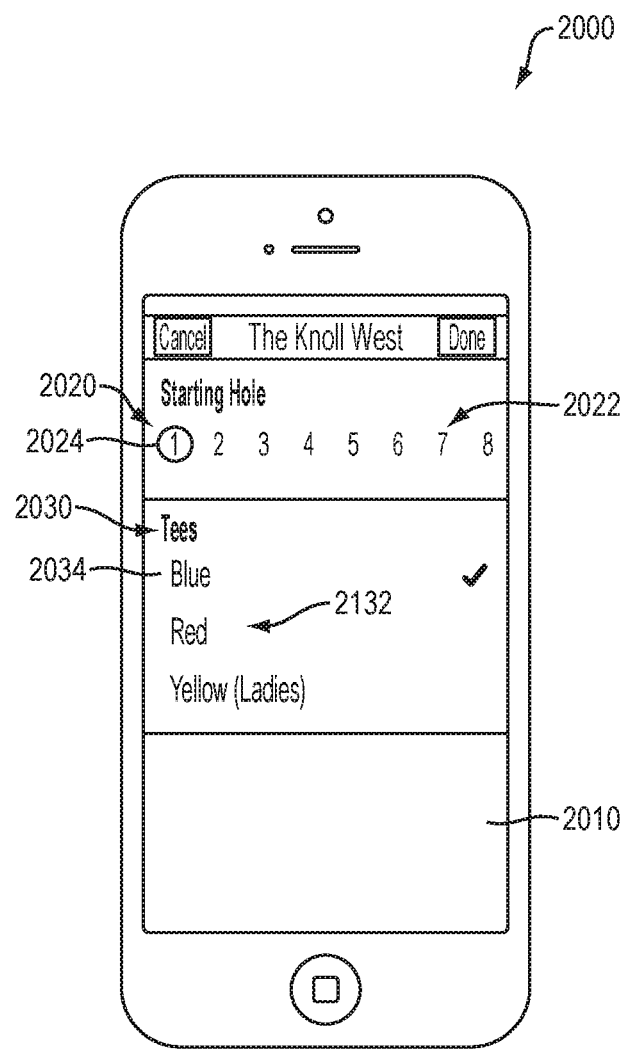

FIG. 20 shows an exemplary GUI 2000 that can be provided by exemplary embodiments of the environment 805 to display a screen 2010 in response to a selection of a golf course (e.g., selection of golf course 1924 in GUI 1900) on which the user may play a round of golf. The screen can include user-selectable information for a starting hole selector area 2020 and a tee type selector area 2030. The starting hole selector area 2020 can include hole numbers 2022 that can be selected by the user to indicate which hole the user intends to start a round of golf with. For example, as shown in FIG. 20, the user can select hole one 2024 as the starting hole for the user's round of golf. The tee type selector area 2030 can include different tee types 2032 that can be selected by the user to indicate which type of tee the user intends to use during the round of golf. For example, as shown in FIG. 20, the user can select the blue tee type as the type of tee the user intends to use of the round of golf.

Figure 21:
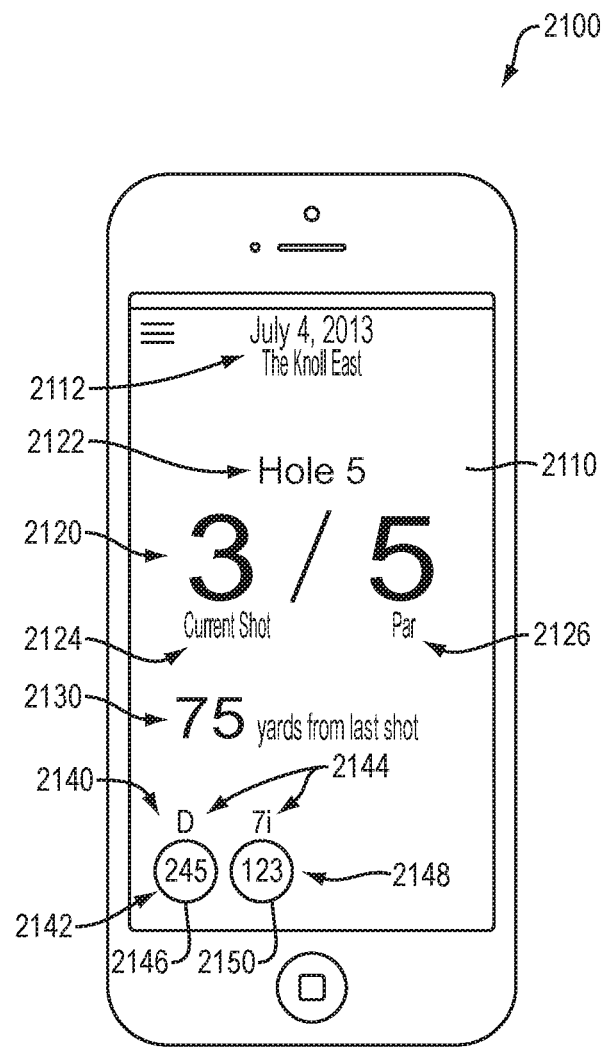

FIG. 21 shows an exemplary GUI 2100 that can be provided by exemplary embodiments of the environment 805 to display a screen 2110 related to the monitoring and/or tracking of the user's performance during a round of golf. The screen 2110 can identify a date 2112 on which the round is being played, current hole information 2120, a distance 2130 from the last golf shot by the user, and previous shot information 2140. The current hole information 2120 can identify the current hole 2122 being played, a number of golf shots 2124 taken by the user on the hole, and a number of shots 2126 corresponding to par for the hole. As one example, as shown in FIG. 21, information about the user's first shot 2142 on the current hole 2122 can be graphically depicted to indicate a type 2144 of golf club used by the user to take the first shot, which is shown as a "D" to indicate that the driver was used to take the first shot, and can include a distance 2146 in yards that the first shot travelled. As another example, as shown in FIG. 21, information about the user's second shot 2148 on the current hole 2122 can be graphically depicted to indicate the type 2144 of golf club used by the user to take the second shot, which is shown as "7i" to indicate that the seven iron was used to take the second shot, and can include a distance 2150 in yards that the second shot travelled.

As described herein, the number of golf shots taken by the user can be determined based on transmissions received by the user's electronic device from a sensor module affixed to the golf club used to take the shot and configured to detect the shot using outputs of the accelerometer. The current hole 2120 can be determined by the users geographic location on the golf course compared to golf course information including a geographic layout of the golf course, which can used by the environment 805 to automatically update the current hole information and the par information for the current hole. The distance 2130 from the last shot can be determined, using the user's GPS enabled electronic device, based on a location of the user's electronic device during the impact portion of the user's last shot and the current geographic location of the user's electronic device or the geographic location of the user's electronic device when the user strikes the golf ball on the shot after the last shot.

Figure 22:
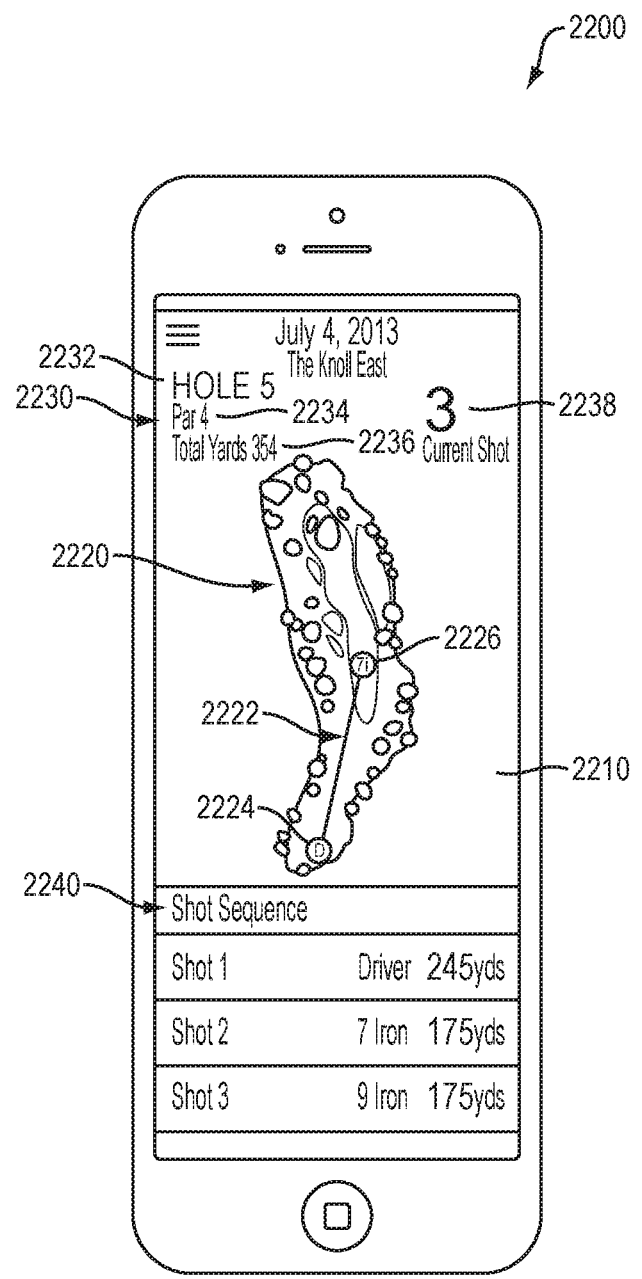

FIG. 22 shows an exemplary GUI 2200 that can be provided by exemplary embodiments of the environment 805 to display a screen 2210 related to the monitoring and/or tracking of the user's performance during a round of golf. The screen 2210 can display a geographic map 2220 of the hole, current hole information 2230, and a shot sequence 2240. The geographic map 2220 can display a terrain of the golf course. A user's shot performance 2222 for the hole can be overlaid on the geographic map 2220. For example, the shot performance 2222 can include a marker 2224 overlaid on the geographic map 2220 at a first location to indicate the first shot taken by the user for the hole and the type of golf club used by the user for the first shot (e.g., shown as a "D" to indicate that the driver was used) and a marker 2226 overlaid on the geographic map 2220 at a second location to indicate the second shot taken by the user for the hole and the type of golf club used by the user for the first shot (e.g., shown as a "7i" to indicate that the seven iron was used) The current hole information 2230 can include a current hole number 2232, par for the hole 2234, a total number of yards for the hole 2236, and the current number of shots taken by the user 2238. The shot sequence information can list the shots taken by the user for the hole and can identify the type of golf club used to take the shots and the distance that the shots traveled.

Figure 23:
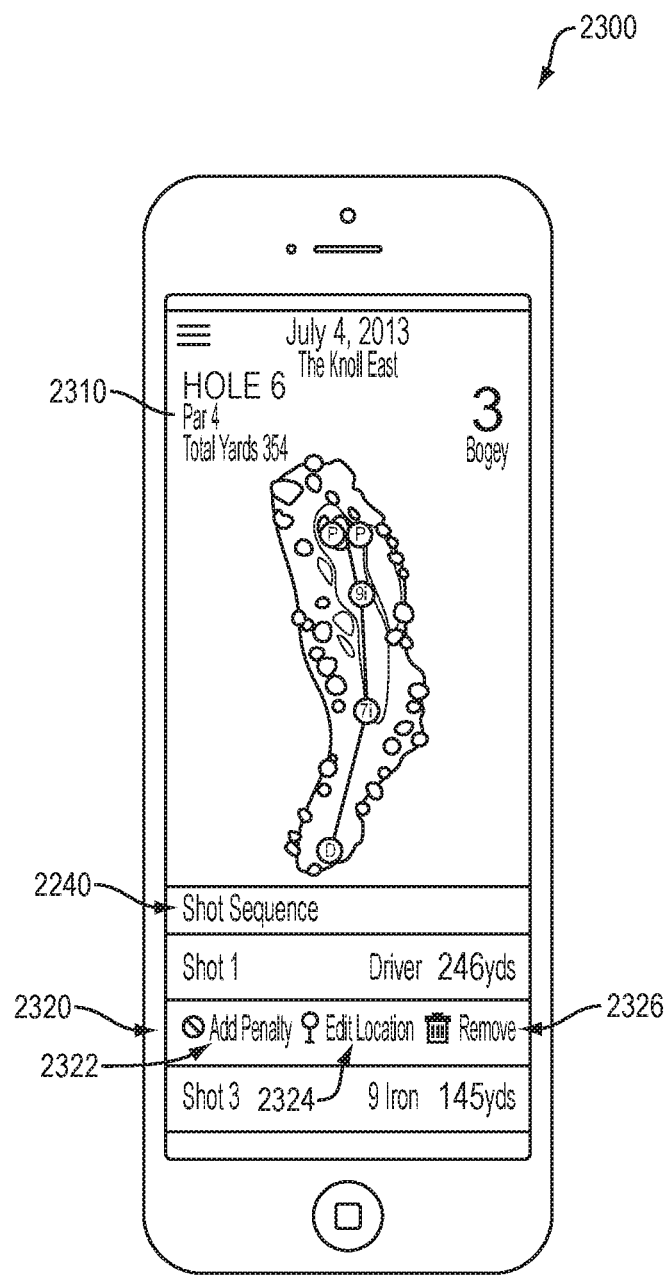

FIG. 23 shows an exemplary GUI 2300 that can be provided by exemplary embodiments of the environment 805 to facilitate editing of previous shot information 2240. In response to an interaction between the user and the GUI 2300 (e.g., the user can swipe across a shot listed in the previous shot information), the GUI 2300 can display a shot modification menu 2320 for a second shot included in the previous shot information 2240. The menu 2320 can include a first selectable option 2322 to allow the user to add a penalty to the shot, a second selectable option 2324 to allow the user to edit location of the shot, and/or a third selectable option 2326 to allow the user to remove the shot for the previous shot information. Selection of any of the options 2322, 2324, and 2326 by the user can cause the user's electronic device to display any GUI.

Figure 24:
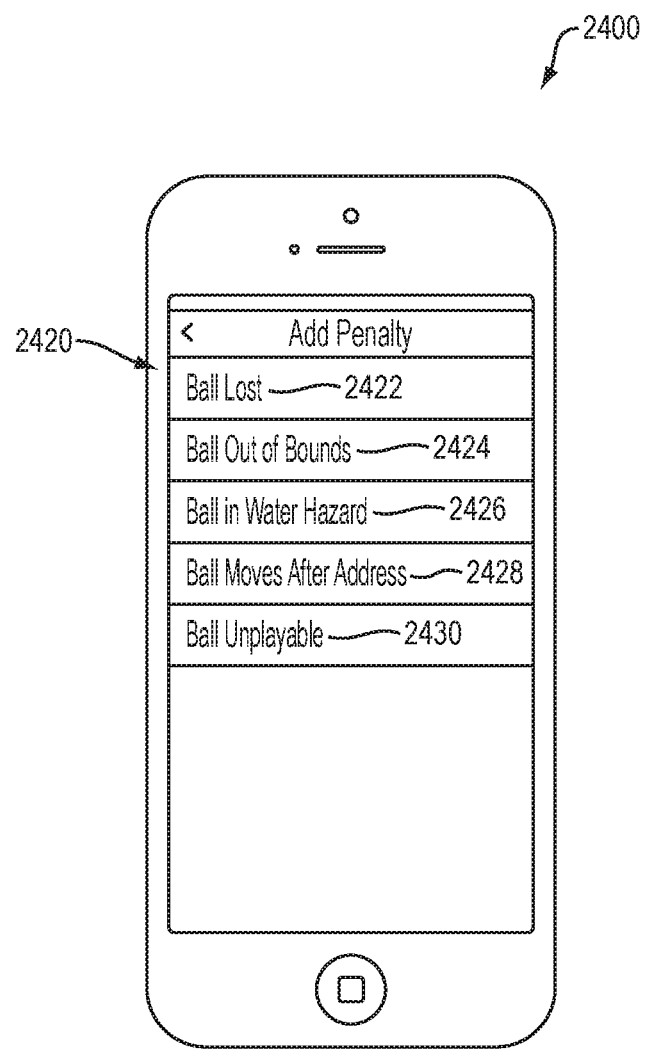

FIG. 24 shows an exemplary GUI 2400 that can be provided by exemplary embodiments of the environment 805 in response to a selection by a user to add a penalty to a hole (e.g., the user selects option 2322 in GUI 2300 of FIG. 23). The GUI 2400 can include a list 2420 of selectable penalties that can be applied to the hole including, for example, a "Ball Lost" penalty 2422, a "Ball Out of Bounds" penalty 2424, a "Ball in Water Hazard" penalty 2426, a "Ball Moves After Address" penalty 2428, and a "Ball Unplayable" penalty 2430, each of which can be selected to add a penalty to the hole.

Figure 25:
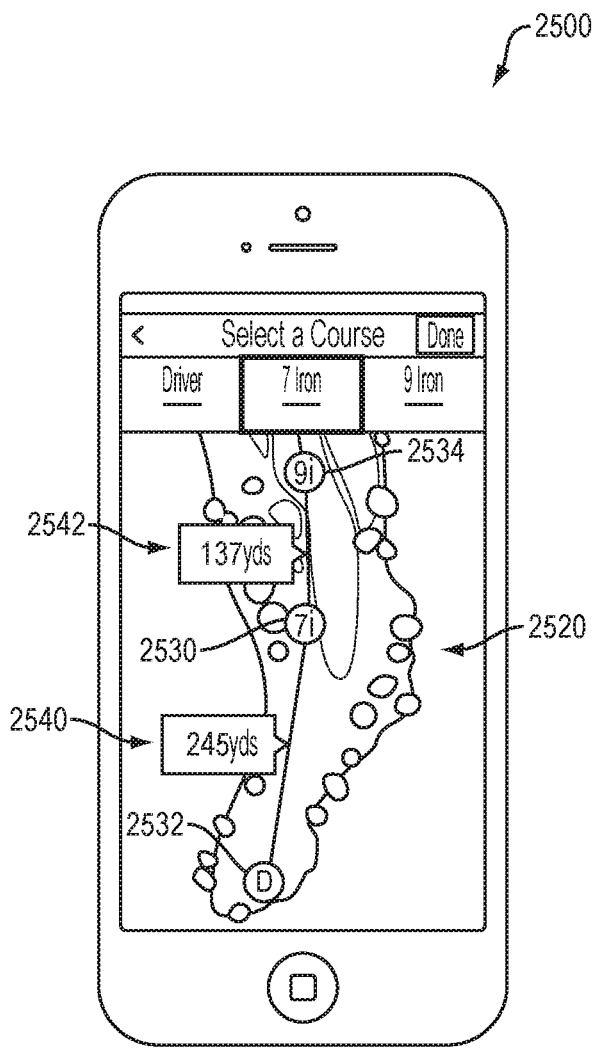

FIG. 25 shows an exemplary GUI 2500 that can be provided by exemplary embodiments of the environment 805 in response to a selection by a user to edit the location of a shot in a hole of golf (e.g., the user selects option 2424 in GUI 2400 of FIG. 24). The GUI 2500 can include a geographic map 2520 of the hole for which the user requested to edit a location of a shot. The user can select a marker 2530 overlaying the map 2520 and corresponding to a shot recorded by the environment 805 and can move the marker 2530 with respect to the map 2520 to adjust the location of the shot represented by the marker 2530. When the position of the marker 2530 is moved, the environment 805 can recalculate a distance 2540 between the modified shot represented by the marker 2530 and the immediately previous shot represented by a marker 2532 and can recalculate a distance 2542 between the modified shot represented by the marker 2530 and the immediately subsequent shot represented by a marker 2534.

Figure 26:
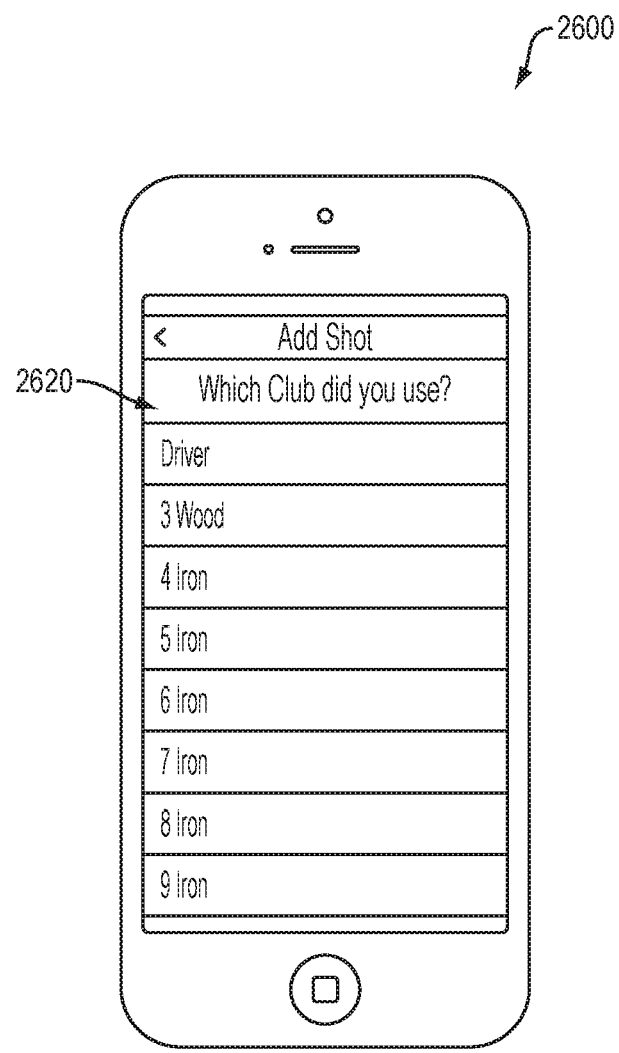

FIG. 26 shows an exemplary GUI 2600 that can be provided by exemplary embodiments of the environment 805 in response to a selection by the user to add a shot taken to a hole of golf. The GUI 2600 can provide a list 2620 of golf clubs used to take the shot to be added to allow the user to select the type of golf club used to take the shot. After the user selects the type of golf used for the added shot, the environment can display another GUI on the user's electronic device to allow the user to specify a location of the shot with respect to other shots taken by the user for the hole and with respect to the geographic map of the hole.

Figure 27:
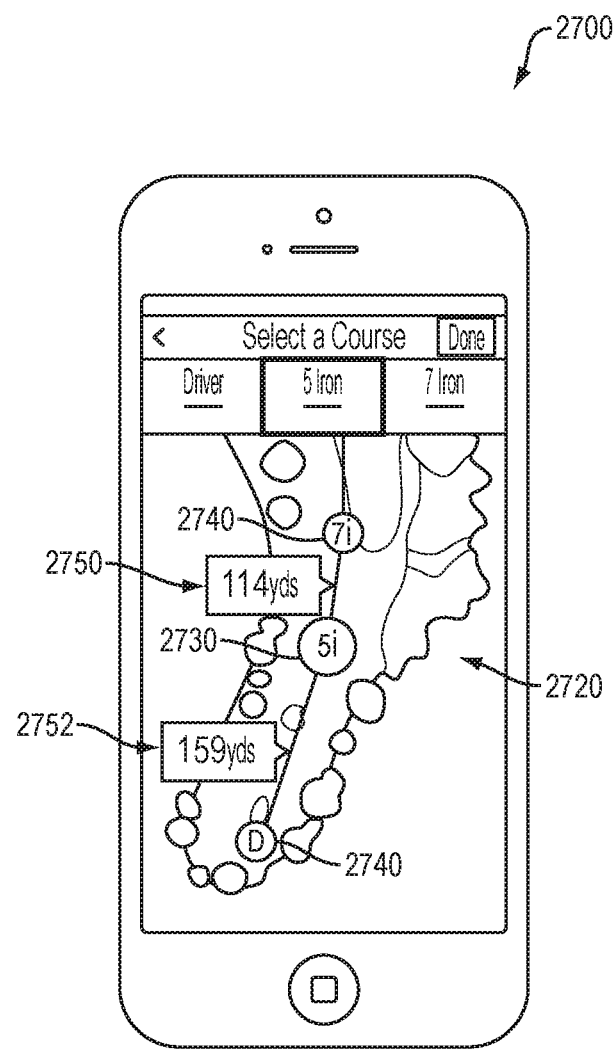

FIG. 27 shows an exemplary GUI 2700 that can be provided by exemplary embodiments of the environment 805 upon selection of a type of golf club that was used for a shot to be added (e.g., upon selection of a golf club from the list 2620 in GUI 2600 of FIG. 26). As shown in FIG. 27, the added shot can appear on a geographic map 2720 of the hole of golf using a marker 2730. The marker 2730 can be positioned with respect to the other shots to insert the added shot according in a position in a sequence of shots as specified by the user. The user can adjust the location of the marker 2730 with respect to the map 2720 and other markers 2740 to specify a location of the shot to be added and a distance 2750 from an immediately previous shot to the shot to be added and a distance 2752 from the shot to be added to an immediately subsequent shot.

Figure 28:
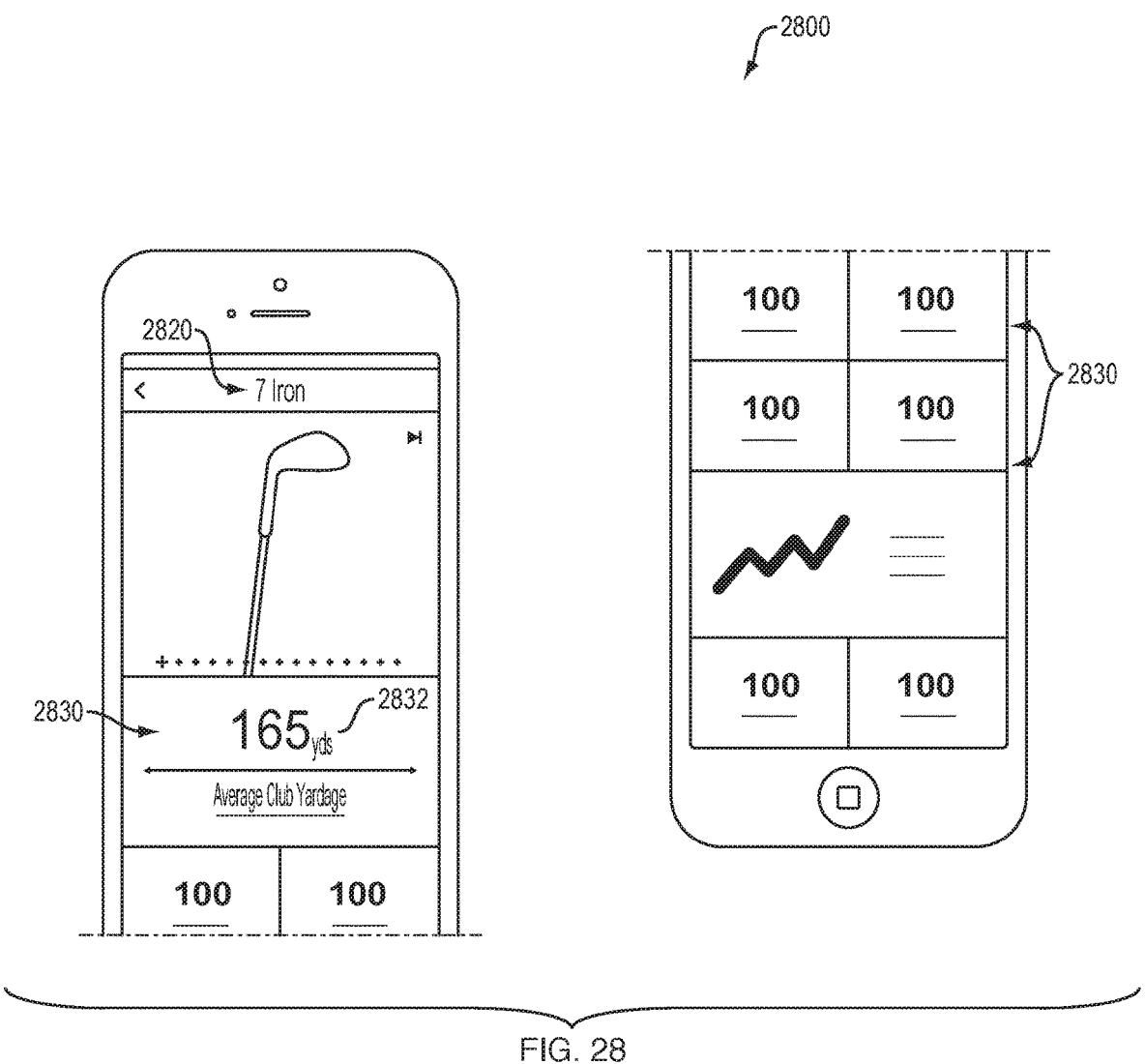

FIG. 28 shows an exemplary GUI 2800 that can be provided by exemplary embodiments of the environment 805 to display performance information 2830 of individual golf clubs used by the user during rounds of golf. The GUI 2800 can identify the golf club selected by the user, which as shown in FIG. 28 is the 7 iron denoted as 2820. The performance information 2830 can include statistics regarding the use of the golf club 2820 including, for example, an average distance 2832 that golf balls travels after the user strikes the golf balls with the golf club 2820.

Figure 29:
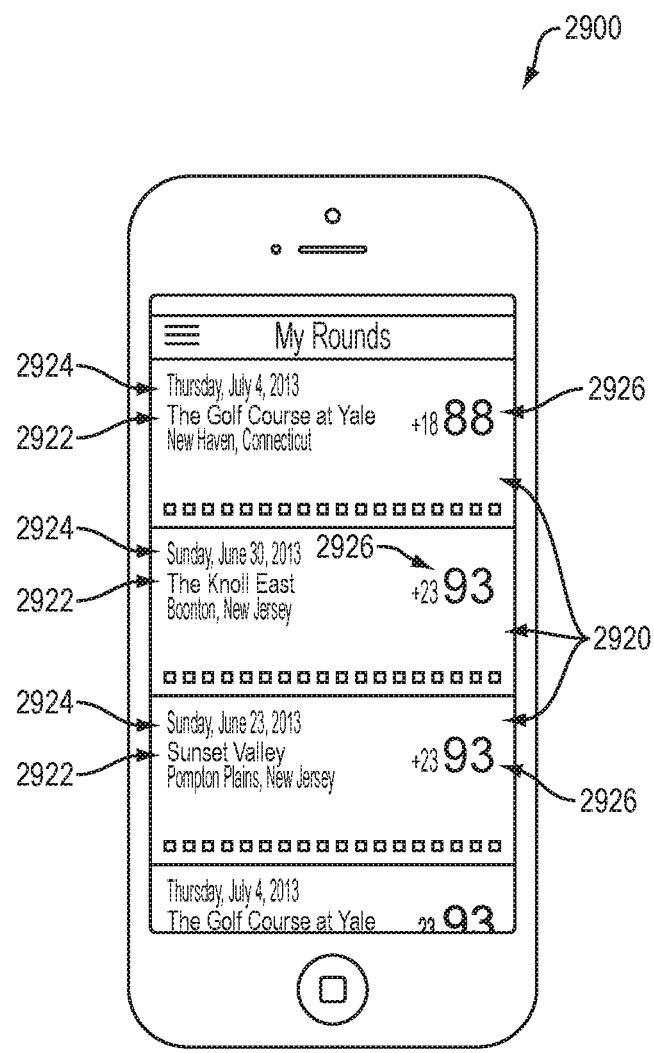

FIG. 29 show an exemplary GUI 2900 that can be provided by exemplary embodiments of the environment 805 to that allows users to view previous rounds 2920 of golf that were monitored and/or tracked by the environment 805. The GUI 2900 can display a name 2922 of the golf course at which each round of golf was played by the user, a date 2924 when each round of golf was played by the user, and a golf score 2926 for each round of golf played by the user. The user can select the previous rounds 2920 to view more details about the rounds 2920, which can be displayed in another GUI.

Figure 30:
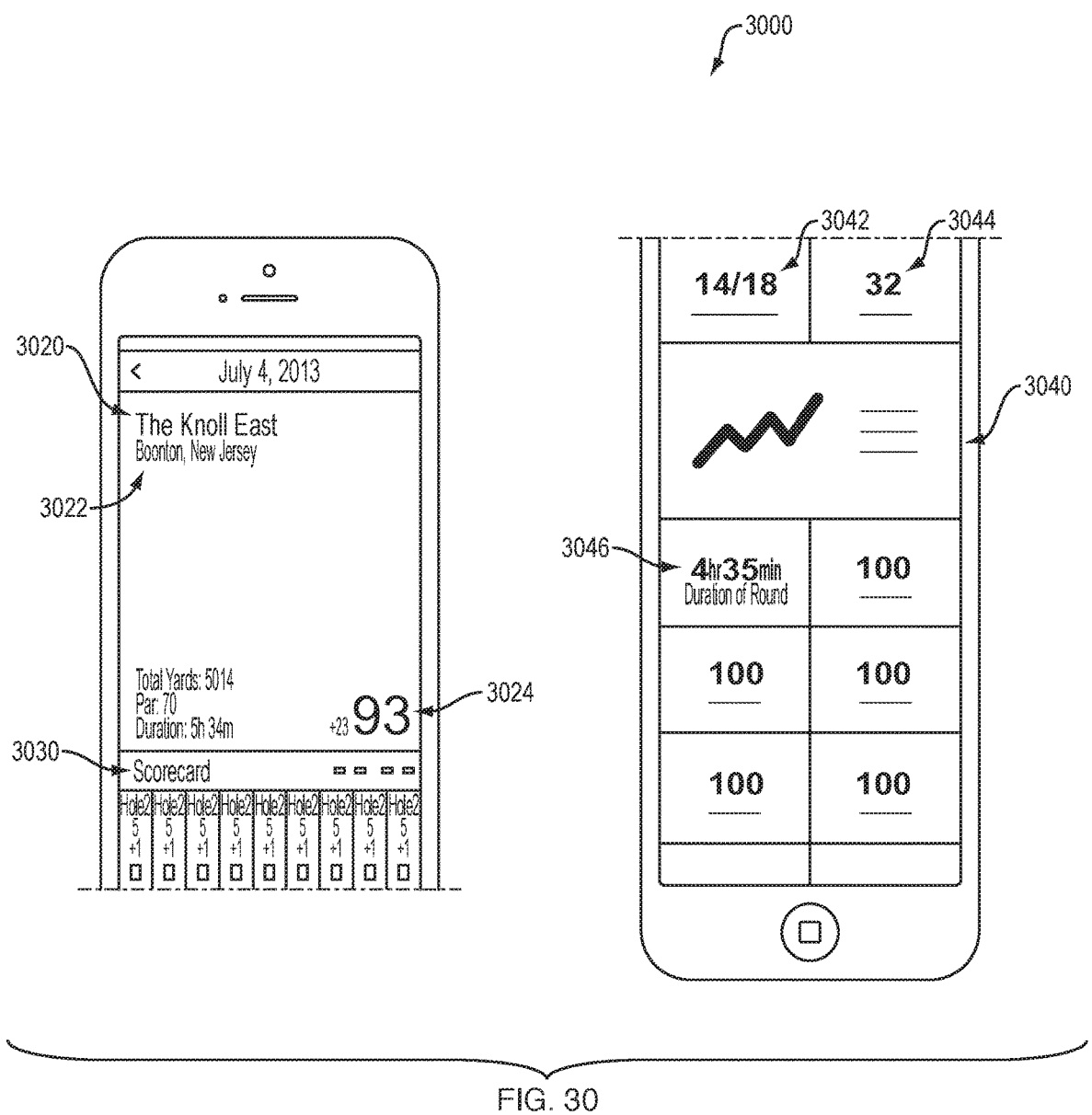

FIG. 30 shows an exemplary GUI 3000 that can be provided by exemplary embodiments of the environment 805 to display round information 3020 for a selected round of golf monitored and/or tracked by the environment 805 (e.g., the user can select one of the rounds 2920 in GUI 2900 of FIG. 29). The round information 3020 can include a name 3022 of the golf course, a golf score 3024 for the round, a scorecard 3030 for the round, and statistical information 3040 about the round. The scorecard 3030 can provide the user with information about scoring information for each hole including the par of the hole and the number of shots taken by the user for the hole. The statistical information 3040 can include, for example, a number of greens in regulation 3042, a total number of putts taken in the round 3044, and a total duration of the round 3046. Other information that can determined and displayed to the user can include club consistency (e.g., variations in shot distances), putting stats (e.g., average putts per hole, 2-putt percentage, 3+ putt-percentage, 1 putt per round, etc.), scrambling statistics (e.g., the golfer's ability to get par when hitting the green in regulation is missed), sand saves (e.g., the ability of a golfer to get par when the ball lands in a bunker during a hole), fairway hits (e.g., percentage of times a golfer hits the fairway when the golf ball is hit from the tee), and the like.

Figure 31:
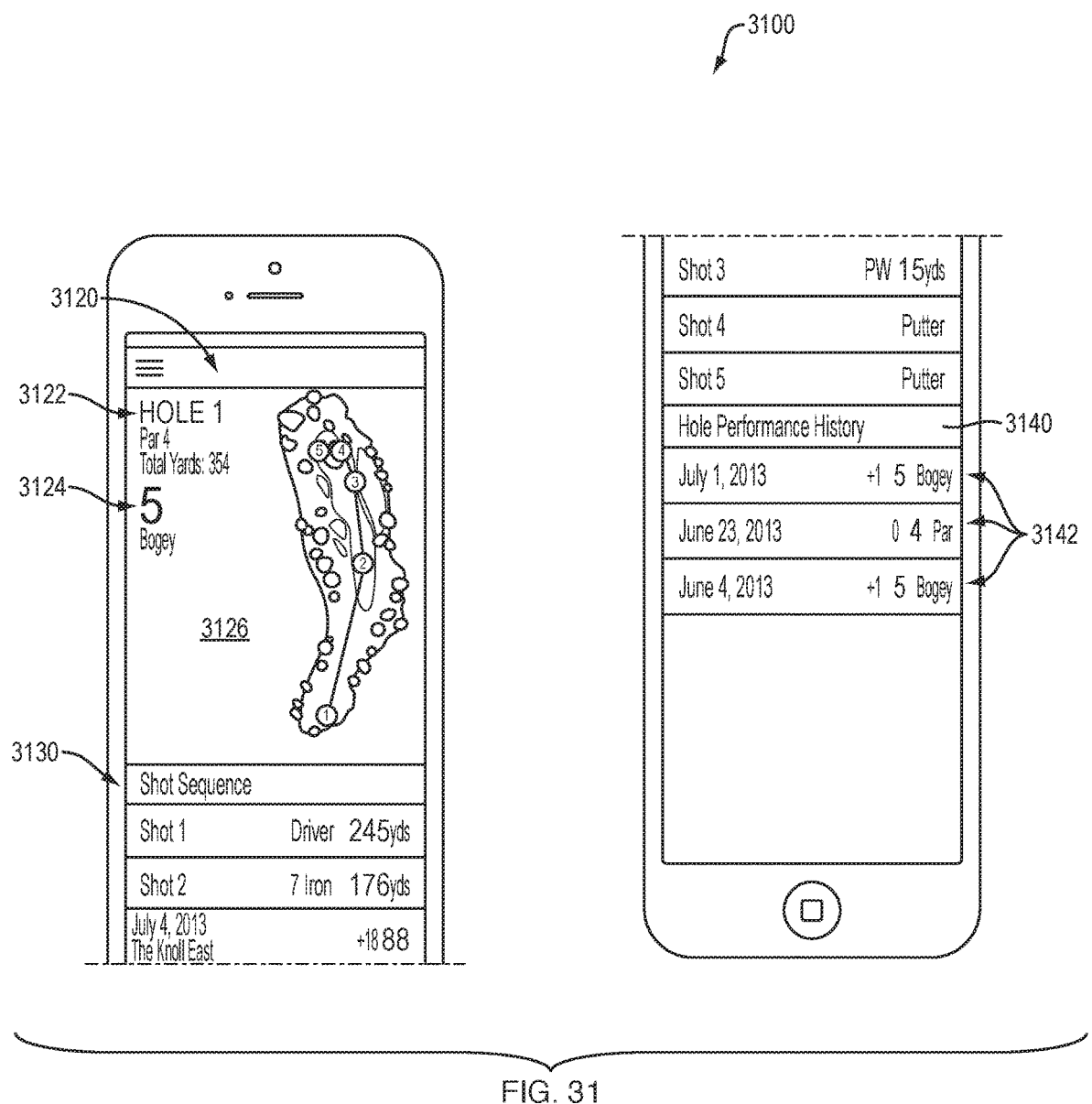

FIG. 31 shows an exemplary GUI 3100 that can be provided by exemplary embodiments of the environment 805 to display hole information 3120 for a selected hole in a selected round of golf monitored and/or tracked by the environment 805. The hole information 3120 can include course specified information 3122 (e.g., a hole number, par, and distance), a number of shots 3124 the user took for the hole, a geographic map 3126 for the hole overlaid with the golf shots taken by the user for the hole, a shot sequence 3130, and a hole performance history 3140. The hole performance history 3140 can include a list 3142 of dates for which the hole was played by the user and a number golf shots taken by the user on the hole for each date.

Figure 32:
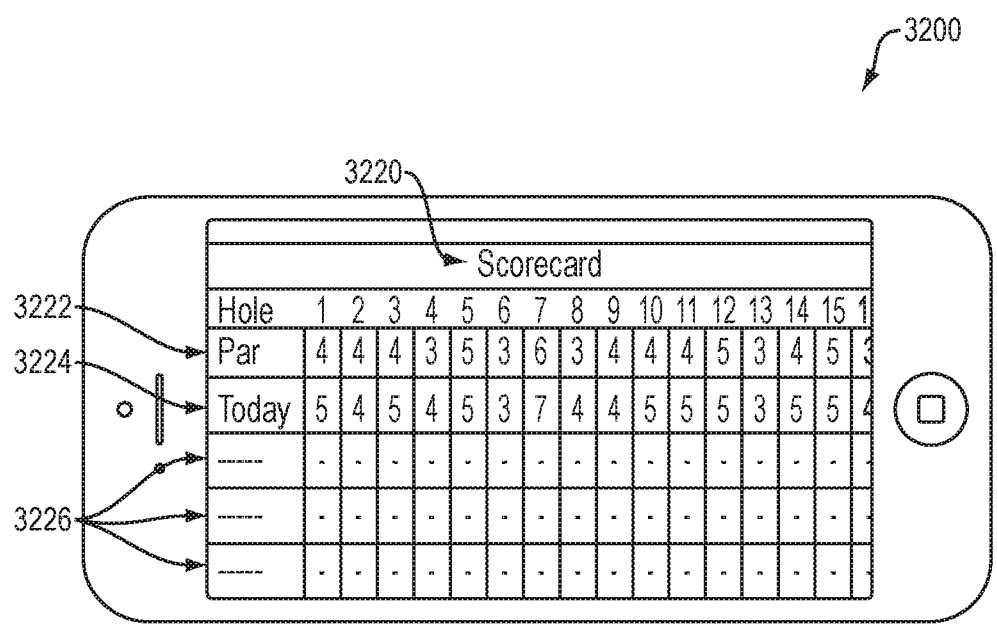

FIG. 32 shows an exemplary GUI 3200 that can be provided by exemplary embodiments of the environment 805 to display a golf score history 3220 can a selected golf course. The golf score history 3220 can be in the form of a scorecard that provides the par 3222 for each hole, the number of golf shots 3224 taken by the user for each hole during the most recent round of golf, and the number of golf shots 3226 taken by the user for additional rounds of golf played by the user in the past.

Figure 33:
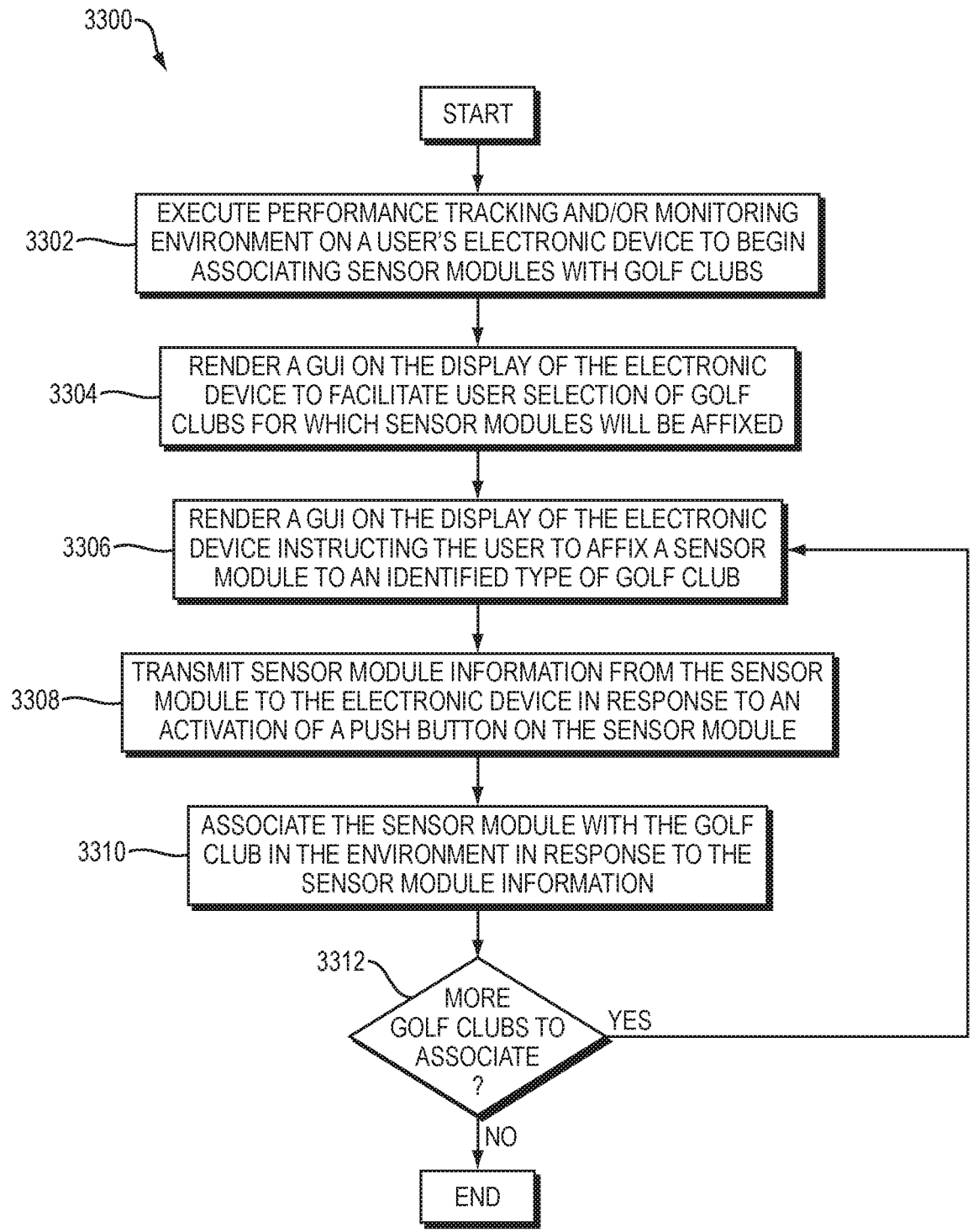
FIG. 33 is a flowchart illustrating a process for associating a golf club with a sensor module by exemplary embodiments of the environment.

FIG. 33 is a flowchart illustrating a process 3300 for associating a golf club with a sensor module by exemplary embodiments of the environment 805. To begin, the electronic device can execute an embodiment of the performance tracking and/or monitoring environment 805 to initiate the association process at step 3302. In response to the initiation of the association process, at step 3304, the environment 805 can be executed by the electronic device to render a GUI on the display of the electronic device to facilitate user selection of golf clubs for which sensor modules will be affixed from a list of golf clubs. At step 3306, after a user has selected the golf clubs from the list, the environment 805 can be executed by the electronic device to render a GUI on the display of the electronic device instructing the user to affix a sensor module to a golf club identified by the GUI (e.g., via text and/or graphics) that was selected from the list by the user. The GUI can also instruct the user to actuate a button on the sensor module to associate the sensor module with the electronic device and/or to associate the sensor module with the golf club in the environment 805. At step 3308, the sensor module can transmit sensor module information including at least a unique identifier in response to actuation of the button on the sensor module.

At step 3310, the electronic device can receive the sensor module information from the sensor module and can execute the environment 805 to store the sensor module information (e.g., including the unique identifier) in a list of devices recognized by the electronic device as being authorized to communicate with the electronic device to associate the sensor module with the electronic device and/or can execute the environment to associate the sensor module with the identified golf club (e.g., store an associate between the sensor module's unique identifier and the golf club displayed at step 3306). At step 3312, the electronic device can execute the environment 805 to determine whether the user selected additional golf clubs to be associated. If so, the process 3300 repeats from step 3306. If not, the process 3300 ends.

Figure 34:
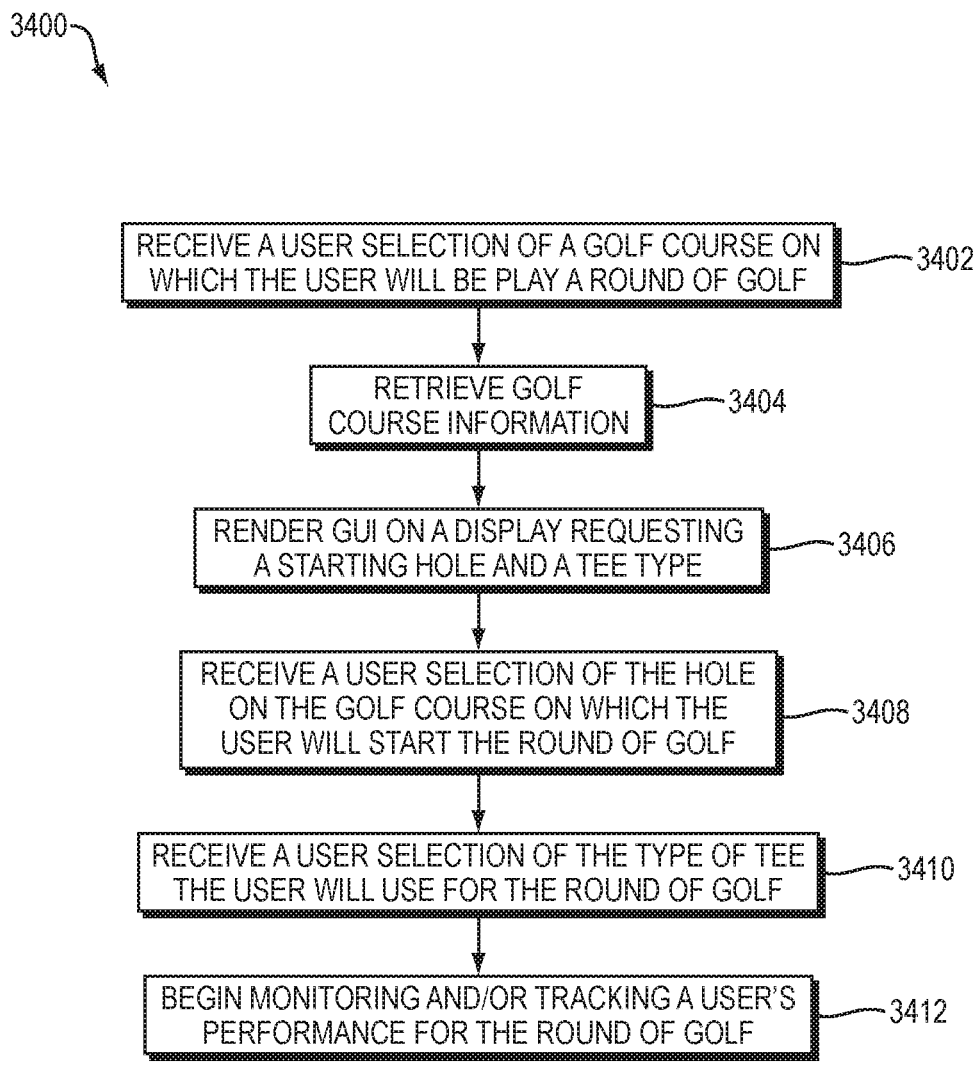
FIG. 34 is a flowchart illustrating a process for utilizing exemplary embodiments of the monitoring and/or tracking environment to initiate the tracking and/or monitoring of a round golf.

FIG. 34 is a flowchart illustrating a process 3400 for utilizing exemplary embodiments of the monitoring and/or tracking environment 805 to initiate the tracking and/or monitoring of a round golf. At step 3402, the environment 805 being executed by the user's electronic device can receive a user selection of a golf course on which the user will play a round of golf. In response to the user selection, the electronic device can retrieve golf course information from storage at step 3404. As one example, the electronic device can execute the environment 805 to retrieve the golf course information corresponding to the selected golf course from a storage device included in the electronic device. As another example, the electronic device can execute the environment 805 to request the golf course information from a remote storage device. In exemplary embodiments, the remote storage device can be part of a remote system (e.g., the remote system 130). The electronic device can retrieve the golf course information by transmitting the request to the remote system and the remote system can query a database for the golf course information to retrieve the golf course information from a database. After the remote system retrieves the golf course information, the remote system can transmit a response to the electronic device including the golf course information.

Using the golf course information, the environment 805 can be executed by the electronic device to render a GUI on a display of the electronic device at step 3406 requesting the user to select a starting hole for the golf course and a type of tee to be used. At step 3408, the environment 805 can receive the user's selection of the hole on the golf course at which the user will start the round of golf and at step 3410, the environment 805 can receive the user's selection of the type of tee the user will use for the round of golf. At step 3412, the environment can be executed to begin monitoring and/or tracking the user's performance for the round of golf.

Figure 35:
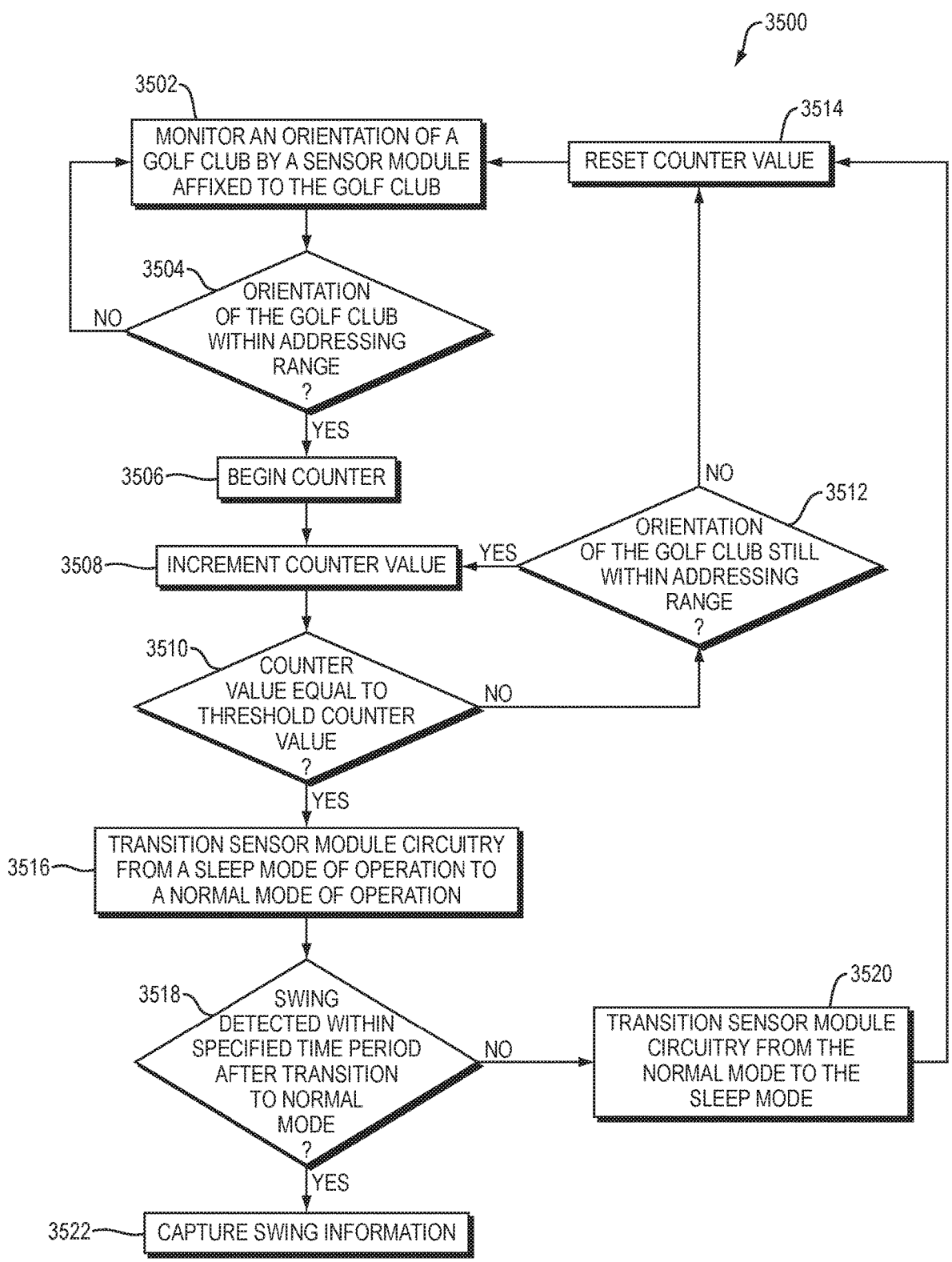
FIG. 35 is a flowchart illustrating a power management process that can be implemented by exemplary embodiments of the sensor module circuitry.

FIG. 35 is a flowchart illustrating a power management process 3500 that can be implemented by exemplary embodiments of the sensor module circuitry 212. To begin, the sensor module circuitry can monitor an orientation of a golf club to which the sensor module housing the sensor module circuitry is affixed at step 3502. For example, the accelerometer and/or gyroscope can be operational to monitor the orientation of the golf club and output signals corresponding to the orientation of the golf club. At step 3504, the sensor module circuitry 212 can determine with the orientation of the golf club is within an addressing range (e.g., by processing the output signals from the accelerometer and/or gyroscope). If the orientation of the golf club is not within the addressing range, the process 3500 repeats from step 3502. If the orientation of the golf club is within the addressing range, the sensor module circuitry initiates a counter or timer at step 3506, which increments a counter value at a periodic frequency (e.g., every millisecond). At step 3508, the counter value is incremented based on the periodic frequency and at step 3510, the sensor module circuitry determines whether the counter value is equal to a threshold counter value (e.g., determines whether a specified amount of time has elapsed after detecting that the orientation of the golf club was within the addressing range).

If the counter value is not equal to the threshold value, the sensor module circuitry determines whether the golf club still has an orientation that is within the addressing range at step 3512. If the golf club orientation is not within the addressing range, the counter is stopped and the counter value is reset at step 3514. Otherwise, the counter value continues to increment according to the periodic frequency at step 3508. If the counter value is equal to the threshold counter value (step 3510), the sensor module circuitry can transition from a sleep mode of operation to a normal mode of operation at step 3516 and can determine whether a swing is detected within a specified time period after transitioning to the normal mode at step 3518. If a swing is not detected within the specified time period, the sensor module circuitry can transition from the normal mode of operation to the sleep mode of operation at step 3520, the counter can be reset at step 3514, and the orientation of the golf club can be monitored at step 3502 such that if the orientation of the golf club is within the addressing range the counter is restarted. Otherwise, if a swing is detected, the sensor module circuitry can capture and/or transmit swing information at 3522.

In some embodiments, the orientation of the golf club can remain within the addressing range even if a swing is not detected, but the sensor module circuitry can determine that the counter should not be restarted until another condition is met. For example, in addition to determining whether the orientation of the golf club is within the addressing range, the sensor module circuitry can determine whether an accelerations (e.g., movement) is detected. If no acceleration is detected, the sensor module circuitry can continue to monitor the orientation and acceleration of the golf club. If acceleration is detected and the orientation of the golf club remains in the addressing range, the sensor module circuitry restarts the counter. Thus, if a user rests or holds the golf club with an orientation satisfying the addressing range for an extended period of such that the sensor module circuitry transitions to the normal mode and back to the sleep mode, the sensor module circuitry can prevent repetitive cycling of the operation mode of the sensor module circuitry by restarting the counter after the user moves the golf club from its resting position and after such movement, the orientation of the golf club is within the addressing range. In some embodiments, if the sensor module circuitry cycles between the sleep mode and the normal mode at specified number of times within a specified period of time, the sensor module circuitry can be configured to reduce the addressing range to prevent transitions from the sleep mode to the normal mode that are generally not related to a swing event (e.g., by reducing the addressing angle associated with the acceptance cone.

Figure 36:
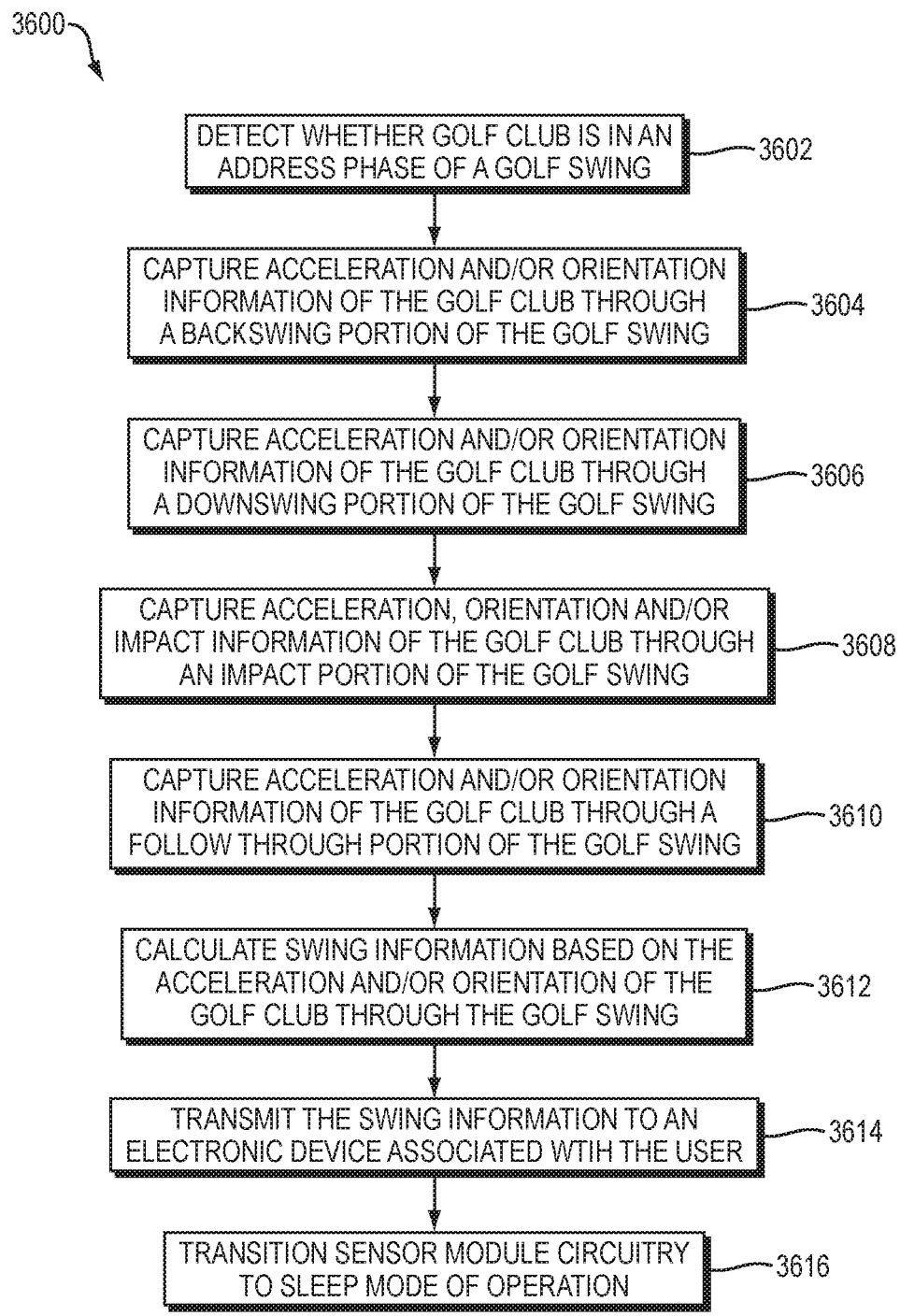
FIG. 36 is a flowchart illustrating a process that can be implemented by exemplary embodiments of the sensor module circuitry during a swing event.

FIG. 36 is a flowchart illustrating a process 3600 that can be implemented by exemplary embodiments of the sensor module circuitry 212 during a swing event. At step 3602, the sensor module circuitry can detect that the golf club is in an address phase of a golf swing. For example, the accelerometer and/or gyroscope of the sensor module circuitry can output signals that can be processed by the sensor module circuitry to determine that the golf club has an orientation that is within the addressing range. At step 3604, the sensor module circuitry can capture acceleration and/or orientation information of the golf club (e.g., based on an acceleration and/orientation of the sensor module affixed to the golf club) through a backswing portion of the golf swing. At step 3606, the sensor module circuitry can capture acceleration and/or orientation information of the golf club through a downswing portion of the golf swing. At step 3608, the sensor module circuitry can capture acceleration, orientation, and/ or impact information of the golf club through a backswing portion of the golf swing. In exemplary embodiments, the impact information can be captured as descried herein. At step 3610, the sensor module circuitry can capture acceleration and/or orientation information of the golf club through a follow-through portion of the golf swing.

At step 3612, the sensor module circuitry can calculate, derive, and/or identify swing information utilizing the acceleration, orientation, and/or impact information captured during the golf swing. For example, the processing device of the sensor module circuitry can execute the swing monitoring system to calculate a swing tempo, swing velocity, swing force, club face angle, swing plane, impact force, and/or any other swing parameters or other swing analysis parameters and/or to identify a golf shot based on the impact information. At step 3614, the sensor module circuitry can transmit the swing information to an electronic device associated with the user and at step 3616, the sensor module circuitry can transition from a normal mode of operation to a sleep mode of operation. In some embodiments, the sensor module circuitry can expect an acknowledgment transmission from the electronic device. If an acknowledgment transmission is not received, the sensor module circuitry can be configured to reattempt the transmission of swing information until the expiration of a specified time period. For example, in some embodiments the sensor module circuitry can attempt to retransmit the swing information for five second before transitioning to the sleep mode of operation.

Figure 37:
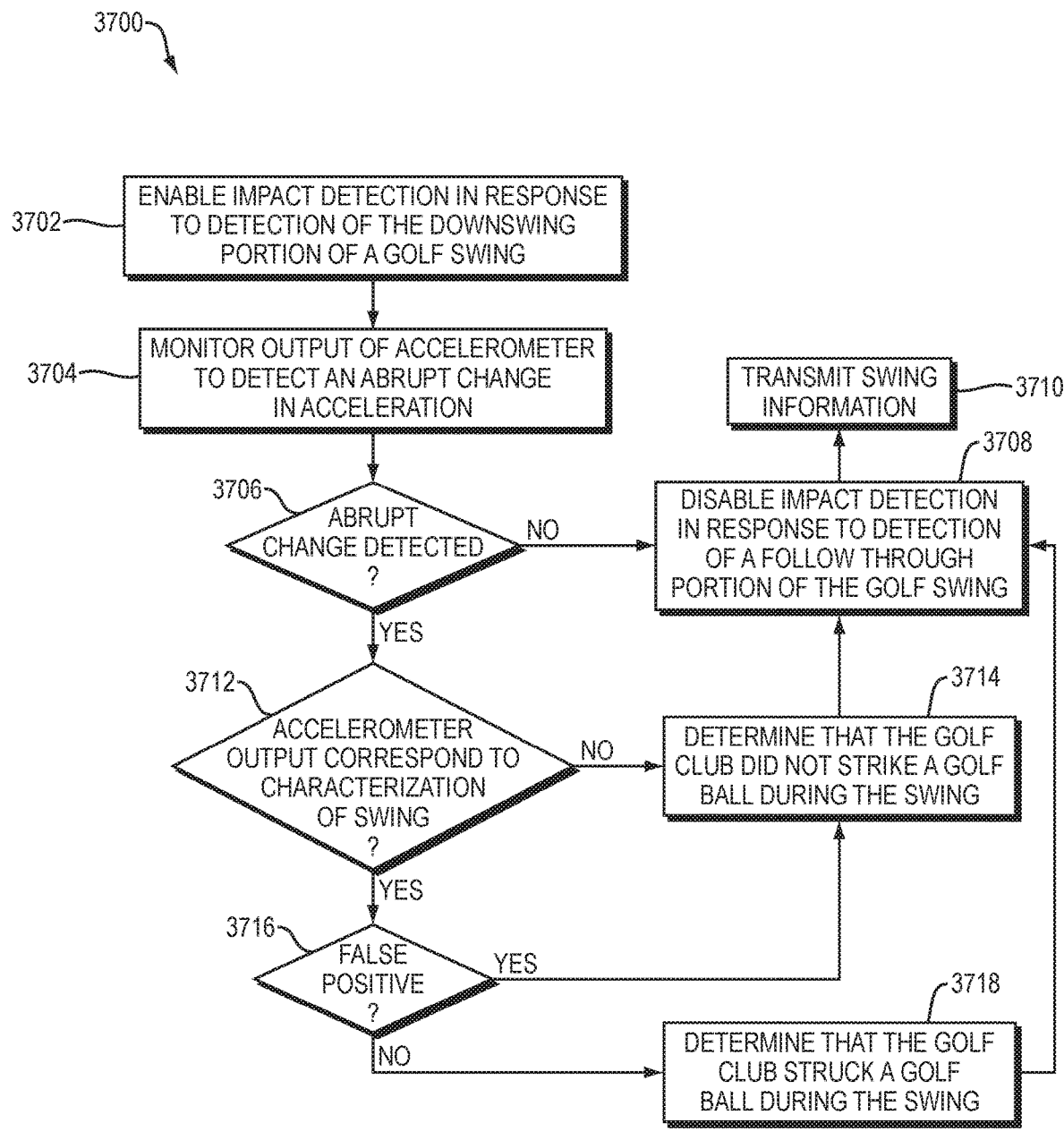
FIG. 37 is a flowchart of a process that can be implemented by exemplary embodiments of the sensor module circuitry to detect an impact during a golf swing.

FIG. 37 is a flowchart of a process 3700 that can be implemented by exemplary embodiments of the sensor module circuitry 212 to detect an impact during a golf swing. At step 3702, the sensor module circuitry can enable impact detection in response to detection of a downswing portion of the golf swing and at step 3704, the sensor module circuitry can monitor the accelerometer for an abrupt change in acceleration. At step 3706, the sensor module circuitry can determine whether an impact occurred based on an abrupt change in acceleration. If no abrupt change is detected, the sensor module circuitry disables impact detection in response to detection of a follow-through portion of the golf swing at step 3708 and transmits swing information to the user's electronic device at step 3710. If an abrupt change in acceleration is detected, the sensor module circuitry can determine whether the impact is the result of a golf swing by analysing the output of the accelerometer immediately prior to and immediately after an impact is detected to determine whether the accelerometer output corresponds to characterized swing information at step 3712. If not, the sensor module circuitry determines that the golf club did not strike a golf ball during the swing at step 3714 and the process proceeds to step 3708. If it is determined by the circuitry that the accelerometer output corresponds to characterized swing information, the sensor module circuitry determines whether the impact is a false positive using techniques and criteria described herein. If it is determined by the circuitry that the impact is a false positive, the process proceeds to step 3716. If not, the circuitry determines that the golf club struck a golf ball during a swing at step 3718 and the process proceeds to step 3708.

Figure 38:
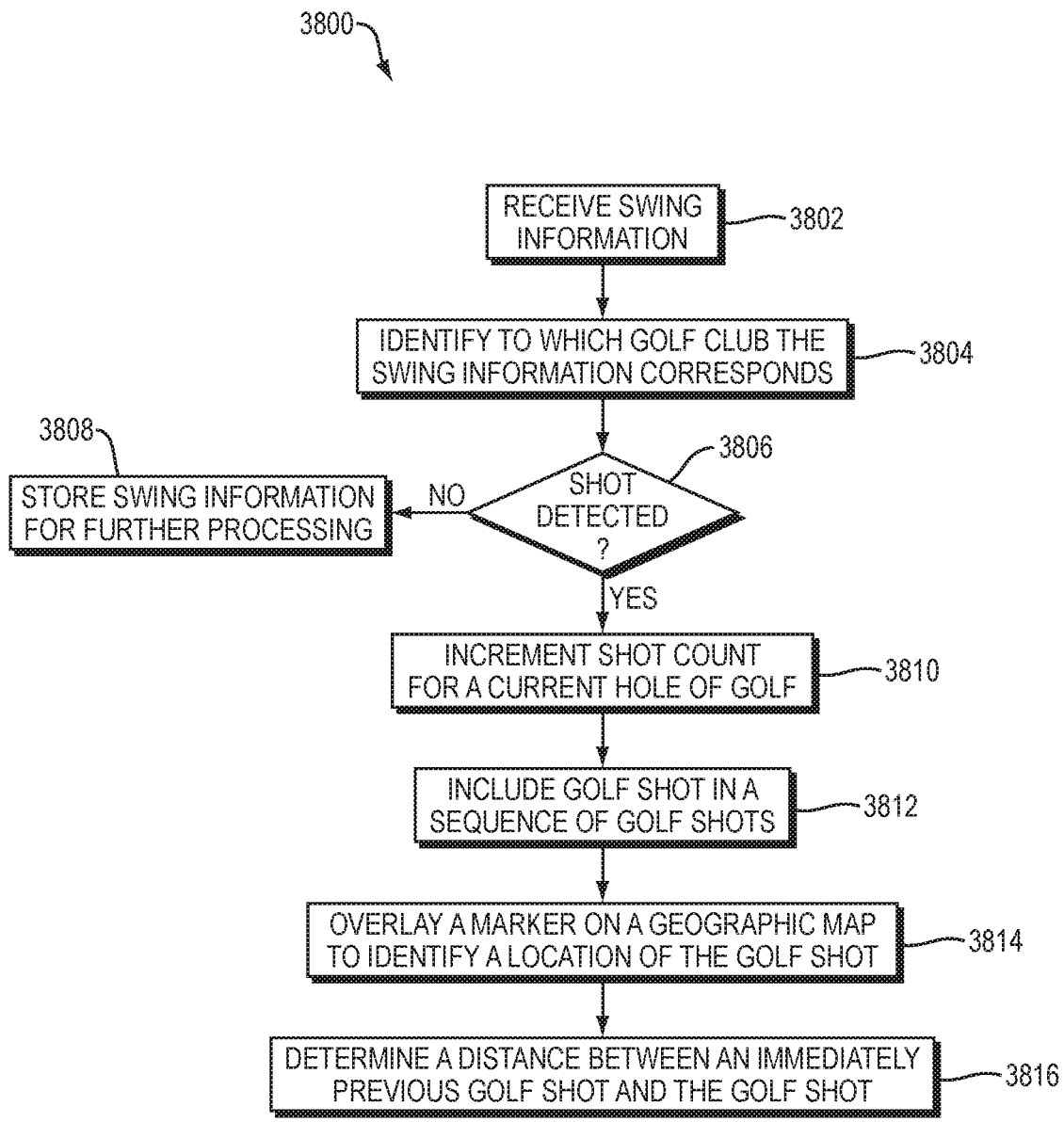
FIG. 38 is a flowchart illustrating a process that can be implemented by an electronic device executing an exemplary embodiment of the monitoring and/or tracking environment.

FIG. 38 is a flowchart illustrating a process 3800 that can be implemented by an electronic device executing an exemplary embodiment of the monitoring and/or tracking environment 805. At step 3802, the electronic device can receive swing information transmitted by a sensor module affixed to a golf club. At step 3804, the electronic device can execute the environment 805 to identify to which golf club the swing information corresponds based on a unique identifier received with the swing information that uniquely identifies the sensor module from which the swing information was transmitted. For example, an association process may have been executed previously to associate a golf club to the sensor module in the environment 805 and the electronic device can execute the environment 805 to search and/or look-up the association corresponding the unique identifier. At step 3806, the electronic device can execute the environment 805 to determine whether the swing information includes a golf shot (e.g., based on the swing information and false positive detection techniques and criteria described herein). If not, the electronic device can store the swing information for further processing at step 3808. If the swing information includes a golf shot, the electronic device can execute the environment 805 to register the swing information as a golf shot and can increment a shot counter for a current hole of golf being monitored and/or tracked using the environment 805 at step 3810. At step 3812, the golf shot can be included in a sequence of golf shots for the current hole and at step 3814, a marker can be overlaid on a geographic map to identify a location of the golf shot. At step 3816, a distance between an immediately previous golf shot and the present golf shot can be determined (e.g., based on a location of the user's GPS enabled electronic device for the previous shot and the present shot.)

Figure 39:
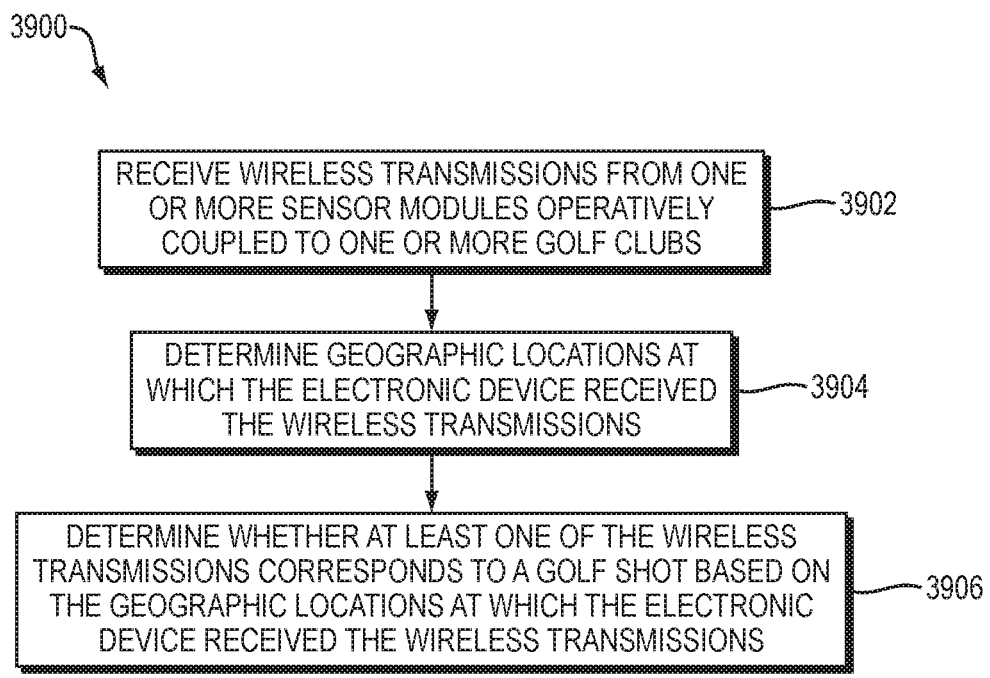
FIG. 39 is a flowchart illustrating a process that can be implemented in accordance with exemplary embodiments of the present disclosure to determine whether a golf shot occurred during a round of golf based on geographic location data.

FIG. 39 is a flowchart illustrating a process 3900 that can be implemented by an electronic device executing an exemplary embodiment of the monitoring and/or tracking environment 805 to determine whether a golf shot occurred during a round of golf based on geographic location data. At step 3902, the receiver of the RF transceiver in the electronic device can receive wireless transmissions from one or more sensor modules operatively coupled to one or more golf clubs. The wireless transmissions can include information associated with an acceleration of the golf clubs to which the one or more sensor modules are secured. As one example, the wireless transmissions can include acceleration information output by the accelerometer, which can be received by the receiver portion of the RF transceiver of the electronic device, and can be processed by the electronic device upon execution of the environment 805 to determine whether the acceleration data corresponds to an impact between the corresponding golf club and an object (e.g., the earth, a golf ball, etc.). As another example, the wireless transmission can include an indication that the sensor module detected an impact between the corresponding golf club and an object. At step 3904, the electronic device can determine geographic locations at which the electronic device received the wireless transmissions. For example, the GPS receiver of the electronic device can receive GPS data in broadcasts from the GPS satellite and the electronic device can use the GPS data in the broadcasts to determine a geographic location (e.g., longitude and latitude) of the electronic device at the time each transmission is received (or before or after each transmission is received) by the electronic device.

At step 3906 the processing device of the electronic device can determine whether at least one of the wireless transmissions corresponds to a golf shot based on the geographic locations at which the electronic device received the wireless transmissions. In some embodiments, a geographic boundary can be established by the electronic device based on a geographic location at which the electronic device receives a specified transmission (e.g., the geographic location can form a center point of the geographic boundary). For example, the specified one of the wireless transmissions corresponds to a first one of the transmissions received by the electronic device after a previous golf shot is identified as counting towards a golf score as described herein. The electronic device can set a radius of the geographic boundary from the center point such that the geographic boundary encircles the center point. In some embodiments, the radius of the geographic boundary can be set based on the golf club type associated with the specified one of the transmissions use to generate the center point of the geographic boundary and/or based on a distance between the center point of the geographic boundary and a specified location of the golf course. For example, each type of golf club can be associated with multiple radius values, e.g., a first radius value when the center point of the geographic boundary exceeds a threshold distance from a selected golf course location (e.g., the center of the green), and a second radius value when the center point of the geographic boundary is within the threshold distance from the selected golf course location (e.g., the center of the green). The type of golf club associated with the specified one of the transmissions can be determined by the electronic device based on, for example, a unique identifier included in the specified one of the transmissions that associates a particular sensor module with a corresponding golf club.

To determine whether at least one of the wireless transmissions corresponds to a golf shot, the electronic device can determine whether the other geographic locations at which the electronic device received the wireless transmissions are within the geographic boundary. Upon determining that one of the geographic location of one of the transmissions is outside of the geographic boundary, the electronic device can select one of the geographic locations of the electronic device within the geographic boundary as a golf shot location for the golf shot and can ignore the other geographic locations of the electronic device within the geographic boundary that were not selected as the golf shot location. For example, the electronic device can select the center point of the geographic boundary, the last geographic location at which the electronic device received a last one of the transmissions within the geographic boundary, and/or any of the other geographic locations at which the electronic device received a transmission within the geographic boundary.

In some embodiments, the electronic device determine whether at least one of the wireless transmissions corresponds to a golf shot based on the geographic locations at which the electronic device received the transmission and a temporal relationship of the transmissions received by the electronic device. As one example, the temporal relationship can correspond to a time between reception of the transmissions by the electronic device such that at least one transmission is ignored when consecutive transmission are received within a specified time period. As another example, the temporal relationship corresponds to a specified time period, and the electronic device can determine whether at least one of the wireless transmissions corresponds to a golf shot by determining whether the electronic device received the wireless transmissions within specified time period.

Figure 40:
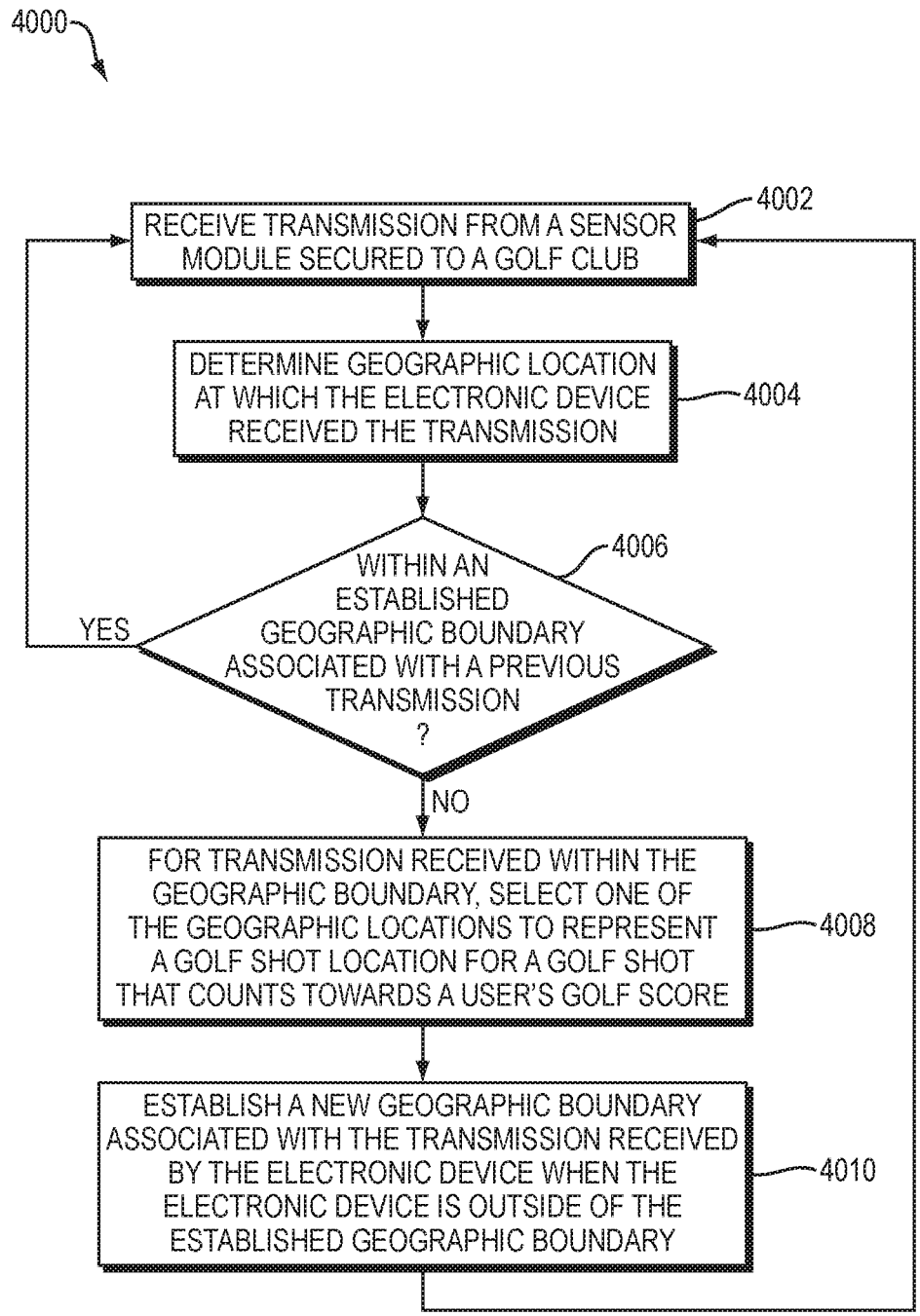
FIG. 40 is a flowchart illustrating another process that can be implemented in accordance with exemplary embodiments of the present disclosure to determine whether a golf shot occurred during a round of golf based on geographic location data.

FIG. 40 is a flowchart illustrating a process 4000 that can be implemented by an electronic device executing an exemplary embodiment of the monitoring and/or tracking environment 805 to determine whether a golf shot occurred during a round of golf. At step 4002, the receiver of the transceiver in the electronic device can receive a transmission from a sensor module secured to a golf club as described herein. At step 4004, the electronic device can determine a geographic location at which the electronic device received the transmission. For example, the electronic device can receive a GPS data from a GPS satellite via the GPS receiver and can determine the geographic coordinates (e.g., longitude and latitude) of the electronic device based on the received GPS data. At step 4006, the electronic device determines whether the geographical location (e.g., longitude and latitude) at which the electronic device received transmission is within an established geographic boundary. If so, the process 4000 repeats from step 4002. If not, at step 4008, for the transmissions received by the electronic device within the established geographic boundary, the processing device of electronic device can select one of the geographic locations (e.g., the geographic location associated with the first, intermediate, or last transmissions received while the electronic device was within the geographic boundary) to represent a golf shot location for a golf shot that counts towards a user's golf score. At step 4010, the processing device of the electronic device can establish a new geographic boundary based on a transmission received by the electronic device from a sensor module secured to a golf club at a geographic location outside of the established geographic boundary. For example, the electronic device can set a center point of the new geographic boundary to be the geographic location outside the established geographic boundary at which the electronic device received the transmission, and can set a radius of the geographic boundary to a radius value based on an identification of the golf club to which the sensor module that sent the transmission is secured and/or a distance of the center point to a select location on the golf course.

Figure 41:
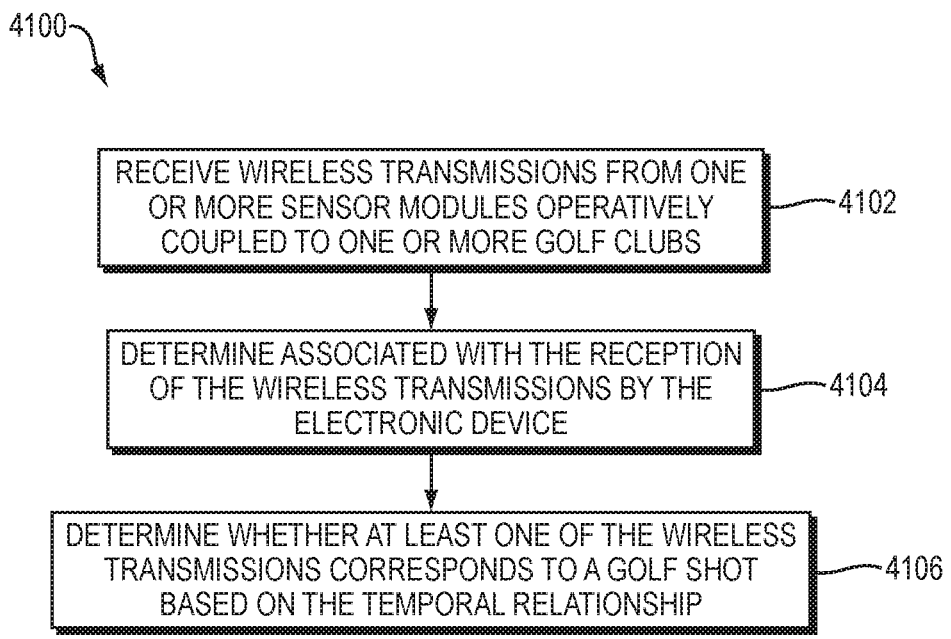
FIG. 41 is a flowchart illustrating a process that can be implemented in accordance with exemplary embodiments of the present disclosure to determine whether a golf shot occurred during a round of golf based on a temporal relationship of time-related reception data.

FIG. 41 is a flowchart illustrating a process 4100 that can be implemented by an electronic device executing an exemplary embodiment of the monitoring and/or tracking environment 805 to determine whether a golf shot occurred during a round of golf. At step 4102, wireless transmissions are received, by the receiver of the transceiver in the electronic device, from one or more sensor modules operatively coupled to one or more golf clubs as described herein. At step 4104, the processing device of the electronic device can determine a temporal relationship associated with the reception of the wireless transmissions by the electronic device. At step 4106, the processing device of the electronic device can determine whether at least one of the wireless transmissions corresponds to a golf shot based on the temporal relationship of reception of the wireless transmissions. For example, the processing device of the electronic device can determine whether at least one of the wireless transmissions corresponds to a golf shot based on a time between reception of the wireless transmissions and/or whether the electronic device received the wireless transmissions within specified time period. In some embodiments, if consecutive transmissions are received at within a specified time of each other, the processing device of the electronic device can ignore one or more of the transmissions when determining whether a golf shot occurred. In some embodiments, the processing device of the electronic device can define a time period that begins upon receipt of a first transmission. The first transmission and subsequent transmissions received with the time period can be analyzed with respect to locations at which the electronic device received the transmissions to determine whether one or more the transmission are associated with one or more golf shots.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A system comprising:
a module configured to be associated with a golf club and monitor usage of the golf club, the module programmed with a first false positive suppression process in which the module determines whether to selectively transmit a message indicating a possible golf shot was detected based on whether the module senses an impact between the golf club and an object; and
a portable electronic device programmed with a second false positive suppression process, the portable electronic device configured to:
receive the message from the module in response to the module sensing the impact; and
determine, using the second false positive suppression process, whether the possible golf shot is associated with an actual golf shot based at least in part on a relationship of the message to other messages received by the portable electronic device.

2. The system of claim 1, wherein the relationship of the message to the other messages corresponds to a quantity of time that has elapsed between receipt the message and receipt of at least one of the other messages.

3. The system of claim 1, wherein the relationship of the message to the other messages corresponds to locations at which the message is received and at least one of the other messages is received.

4. The system of claim 1, wherein the relationship of the message to the other messages corresponds to a combination of locations at which the message is received and at least one of the other messages is received and a quantity of time that has elapsed between receipt the message and receipt of at least one of the other messages.

5. The system of claim 1, wherein the relationship of the message to the other messages corresponds to a type of golf club from which the module sensed the impact and other types of golf clubs from which other modules sensed other impacts.

6. The system of claim 1, wherein the module includes an accelerometer and the impact is sensed by the accelerometer.

7. The system of claim 1, wherein the portable electronic device is programmed to determine the message is associated with a sequence of messages and the electronic device is programmed to select the message or one of the other messages as the actual golf shot and ignores a remainder of the messages.

8. The system of claim 2, wherein a location of the golf shot is determined based at least in part on a location of the portable electronic device when the portable electronic device receives the message or one of the other messages.

9. A method comprising:
determining, by a first false positive suppression process executed by a module associated with a golf club, whether to selectively transmit a message indicating a possible golf shot was detected based on whether the module senses an impact between the golf club and an object;
transmitting, by the module, the message to the portable electronic device in response to sensing the impact; and
programming a portable electronic device with a second false positive suppression process to determine whether the possible golf shot is associated with an actual golf shot based at least in part on a relationship of the message to other messages received by the portable electronic device.

10. The method of claim 9, wherein the relationship of the message to the other messages corresponds to a quantity of time that has elapsed between receipt the message and receipt of at least one of the other messages.

11. The method of claim 9, wherein the relationship of the message to the other messages corresponds to locations at which the message is received and at least one of the other messages is received.

12. The method of claim 9, wherein the relationship of the message to the other messages corresponds to a combination of locations at which the message is received and at least one of the other messages is received and a quantity of time that has elapsed between receipt the message and receipt of at least one of the other messages.

13. The method of claim 9, wherein the relationship of the message to the other messages corresponds to a type of golf club from which the module sensed the impact and other types of golf clubs from which other modules sensed other impacts.

14. The method of claim 9, wherein the module includes an accelerometer and the impact is sensed by the accelerometer.

15. The method of claim 9, further comprising:
programming the portable electronic device based on the second false positive suppression process to determine the message is associated with a sequence of messages and the electronic device is programmed to select the message or one of the other messages as the actual golf shot and ignores a remainder of the messages.

16. The method of claim 9, further comprising determining a location of the golf shot based at least in part on a location of the portable electronic device when the portable electronic device receives the message or one of the other messages.

17. A plurality of non-transitory computer-readable media comprising instructions, wherein the instructions are executable by a plurality of processors to:

determine, by a first false positive suppression process executable by a module associated with a golf club, whether to selectively transmit a message indicating a possible golf shot was detected based on whether the module senses an impact between the golf club and an object;

transmit, by the module, the message to the portable electronic device in response to sensing the impact; and program a portable electronic device with a second false positive suppression process to determine whether the possible golf shot is associated with an actual golf shot based at least in part on a relationship of the message to other messages received by the portable electronic device.

18. The non-transitory computer-readable media of claim 17, wherein the relationship of the message to the other messages corresponds to a quantity of time that has elapsed between receipt the message and receipt of at least one of the other messages.

19. The non-transitory computer-readable media of claim 17, wherein the relationship of the message to the other messages corresponds to locations at which the message is received and at least one of the other messages is received.

20. The non-transitory computer-readable media of claim 17, wherein the relationship of the message to the other messages corresponds to a combination of locations at which the message is received and at least one of the other messages is received and a quantity of time that has elapsed between receipt the message and receipt of at least one of the other messages.

* * * * *